(12) United States Patent
Shimizu et al.

(10) Patent No.: US 7,149,696 B2
(45) Date of Patent: Dec. 12, 2006

(54) SYSTEM AND METHOD FOR ACCEPTING INFORMATION FROM INFORMATION PROVIDERS, MEDIATING THE RECEIVED INFORMATION, AND PROVIDING MEDIATED INFORMATION TO INFORMATION BENEFICIARIES

(75) Inventors: Atsushi Shimizu, Kyoto-fu (JP);
Kiyoshi Masuda, Kyoto-fu (JP);
Masaki Yamato, Kyoto-fu (JP);
Tanichi Ando, Kyoto-fu (JP);
Masayuki Oyagi, Kyoto-fu (JP)

(73) Assignee: Omron Corporation (JP)

( * ) Notice: Subject to any disclaimer, the term of this patent is extended or adjusted under 35 U.S.C. 154(b) by 610 days.

(21) Appl. No.: 09/967,994

(22) Filed: Oct. 2, 2001

(65) Prior Publication Data
US 2002/0111822 A1 Aug. 15, 2002

(30) Foreign Application Priority Data

| Oct. 2, 2000 | (JP) | 2000-302961 |
| May 25, 2001 | (JP) | 2001-157957 |
| Aug. 29, 2001 | (JP) | 2001-260391 |

(51) Int. Cl.
*G06Q 99/00* (2006.01)

(52) U.S. Cl. .......................................... 705/1
(58) Field of Classification Search ............... None
See application file for complete search history.

(56) References Cited

U.S. PATENT DOCUMENTS 5,694,323 A * 12/1997 Koropitzer et al. ......... 705/400
5,893,091 A * 4/1999 Hunt et al. .................. 707/3

(Continued)

FOREIGN PATENT DOCUMENTS

EP 0 989 503 A1 3/2000

(Continued)

OTHER PUBLICATIONS

Corona A G, "Multimedia Broker project: a tool for electronic information publishers," Computer Networks and ISDN Systems, North Holland Publishing, Amsterdam, NL, vol. 30, No. 13, Aug. 3, 1998, pp. 1233-1236.

(Continued)

*Primary Examiner*—Thomas A. Dixon
(74) *Attorney, Agent, or Firm*—Dickstein Shapiro, LLP

(57) ABSTRACT

The object of this invention is to offer an information mediating system which can mediate the specific information out of the received information from an information provider. The specific information is information which fulfills the objective specification. This system charges a service fee to the information beneficiary, and pays a compensation to the information provider. The service fee and the compensation are offset for each terminal. The information beneficiary and provider are selected each time according to the objective specification. An information mediating system provided with a plurality of terminals which have both information sending and receiving functions, or either an information sending or a receiving function through a network, and provided with an information mediator which has an information mediating function to mediate an received information through the network. The information mediating function comprises 1) a grouping function to select an information provider and an information beneficiary out of the plurality of terminals according to an objective specification to specify a specific information to be obtained; and 2) a data transmission function to transmit the specific information obtained from the selected information provider, which fulfills the objective specification, to the selected information beneficiary through the network.

15 Claims, 81 Drawing Sheets

U.S. PATENT DOCUMENTS

| | | |
|---|---|---|
| 6,012,012 A | 1/2000 | Fleck et al. |
| 6,112,181 A * | 8/2000 | Shear et al. .................... 705/1 |
| 6,339,736 B1 * | 1/2002 | Moskowitz et al. .......... 701/29 |
| 2001/0037319 A1 | 11/2001 | Edwards et al. |
| 2001/0044806 A1 | 11/2001 | Ichiki et al. |
| 2001/0051898 A1 | 12/2001 | Nishikiori et al. |
| 2002/0178106 A1 | 11/2002 | Dobeli |
| 2003/0018692 A1 | 1/2003 | Ebling et al. |
| 2003/0028469 A1 | 2/2003 | Bergman et al. |

FOREIGN PATENT DOCUMENTS

| | | |
|---|---|---|
| JP | 06-052250 | 2/1994 |
| JP | 07-302244 | 11/1995 |
| JP | 09-179910 | 7/1997 |
| JP | 11-066168 | 3/1999 |
| JP | 11-120478 | 4/1999 |
| JP | 11-184873 | 7/1999 |
| JP | 11-219388 | 8/1999 |
| JP | 2000123036 A | 4/2000 |
| JP | 2002041563 A | 2/2002 |
| JP | 2002049786 A | 2/2002 |
| JP | 02002259404 A | 9/2002 |
| WO | WO 99/65192 | 12/1999 |
| WO | WO99/66436 | 12/1999 |
| WO | WO 00/17021 | 3/2000 |
| WO | WO00/31705 | 6/2000 |
| WO | WO 00/41359 | 7/2000 |
| WO | WO00/50967 | 8/2000 |

OTHER PUBLICATIONS

Andreoli J M et al., "Constraint Agents for the Information Age," IICM, Dec. 1995.

* cited by examiner

SYSTEM AND METHOD FOR ACCEPTING INFORMATION FROM INFORMATION PROVIDERS, MEDIATING THE RECEIVED INFORMATION, AND PROVIDING MEDIATED INFORMATION TO INFORMATION BENEFICIARIES

FIELD OF THE INVENTION

This invention concerns an information mediating system and method for mediating information in which numerous information provider terminals which are capable of outputting data, an information mediator with a server to extract a specified type of useful data from these output data, and information beneficiaries who can derive some benefit from these useful data are connected through a network. The useful information is mediated between the providers and the beneficiaries by the server. In other words, this invention concerns an information mediation system and method to control the exchange of value-added information between two machines and to set a price on this mediation service.

BACKGROUND OF THE INVENTION

As high-speed information networks have been developed in recent years, large numbers of terminals with a communication function have come to be connected to each other through information networks. Information mediation systems which obtain specified information from many terminals through this sort of information network have developed methods whereby a beneficiary initially records with the mediator what categories or types of information he desires. The mediator then extracts from the extensive data sent by the many providers only that information which matches the categories or types selected by the beneficiary and sends that information to him. In other words, when the beneficiary records with the mediator which categories or types of information he wishes to be sent to him, he enables the mediation to occur. However, in prior art information mediation systems, the portions of the expenses to be borne by the persons providing the information and the persons using the information were fixed. The mediator was not free to reassign providers or beneficiaries according to the categories and types of information selected. Thus separate information mediation systems had to be constructed at great expense for each category or type of information. In addition, everyone who purchased information mediation had to pay the same fixed charge.

FIG. 32 illustrates problems that will occur in the future as more and more information terminals are connected to a network. The item labeled "networked terminal 3210" in the drawing is a prior art terminal connected to a network. Typically, this would be a personal computer or a portable communication device (i.e., a cell phone or a mobile communication terminal). These are devices which the person himself directly operates. Despite much discussion of the "net society" of the future, the total number of such devices will not exceed several times the figure for the population.

The item labeled "networked sensing device" 3201 is a device with a sensing function which is connected to a network. The term "equipment" in "equipment data sensor" 2302, which is one of the devices under this rubric, refers to an apparatus which is fixed in place (i.e., permanently installed) to achieve a given objective. For example, this might be an automatic vending machine, a machine in a factory, or a machine installed outdoors, on a street or bridge. The "equipment data sensor" is a device which acquires data concerning these types of equipment. Such an equipment data sensor may in some cases itself be connected to a network. The item labeled "home data sensor" 3203 is a device which can acquire sensor data concerning a home. Such sensors might be used on what are sometimes called "information" home electronics (which are connected to a network): the TV, the radio, the refrigerator, the air conditioner, etc., or on home equipment which responds to commands transmitted through a network: doors, windows, ventilation fans, the gas, the water, etc. The item referred to as "automotive data sensor" 3204 is any device which collects data from a sensor in a car. In some cases it may refer to the car itself which is connected to the network. So when we compare the potential number of these devices with that of networked terminals 3210, whose potential number does not exceed several times that of the population, we see that there is a vast potential for many more networked sensing devices 3201 to be used in the future. Since such sensors can be used without wiring in all kinds of systems, machines and equipment, their potential number has no relationship with population figures.

It is already possible to use individual communication devices on each of the various sensors and components that are used in many systems. For example, it is already possible to put a communication device on each of the various sensors in a vending machine. To monitor the state of the machine, the signals from the various sensors are sent to a control center via a dedicated line or a PHS.

The salient point here is that in the future, when the current network to which networked terminals 3210 are connected gives way to a network to which various sensing devices 3201 are connected, the number of devices referred to as networked sensing devices 3201 will be vastly greater than the number of devices connected to networked terminals 3210. To put it another way, although it is true that there are many, many networked terminals, their potential number (because they are used by individuals) cannot exceed several for each person; hence the total would be several times the number of people in the population. In contrast, networked sensing devices are not used directly by individuals, so their potential number is arguably much greater. (It has been estimated to be at the very least ten or more times the population.) If individual sensors are connected to the network, their potential number will in fact be unlimited.

In the near future, then, when large numbers of these networked sensing devices 3201 come into use, there will be a need for some sort of traffic control to manage and make use of their data. One actual scheme to deal with this problem is the "information mediation" which is the main point of this invention. How to manage a fee system for the various data obtained by data devices, including networked sensing devices, will be complicated as the numbers of such devices explode in the future, as was discussed above. Many believe that a number of different fee systems will be needed. There can be no doubt that the current relationship, in which one terminal furnishes data and another terminal uses it, will give way to one in which the same terminal can be the provider or the beneficiary. Thus managing payment for data will also require traffic control. One actual scheme to deal with this is the "fee mediation" which is another of the main objectives of this invention.

FIG. 5 illustrates the problem areas which arise in transferring information between providers and beneficiaries. When, as has been discussed, more and more terminals with a communication capability are connected to each other through a network, there will be a problem 0501 of lack of awareness of beneficiaries who would recognize the value of the information. In other words, the provider does not know who the people (or, in this invention, the equipment or devices) are who see the information he is providing as valuable (recognizing the value of the information is equivalent to being willing to pay for it) and desire to have it. There is also a problem 0502 of the provider being in the dark as to what the beneficiary regards as valuable. Even if the provider knows who the people who want information are, he still hasn't a clue as to what they value or what they want.

Problem 0503 is the intermixture of valuable and worthless information. This refers to providing information to a customer without realizing its value (although the customer does), or to the provider not knowing that the same information can have a different value (either higher or lower) to different customers. Problem 0504 is the lack of established rules to compensate providers. This means that because the seller, as was discussed above, does not understand the value of the information for which he is supposed to compensate providers according to the value it has for the customers, he cannot determine what an appropriate compensation (i.e., compensation to the providers) would be. The problem does not disappear if the providers and beneficiaries are linked through a network, which is, after all, merely a means or tool to transmit information. The question which is central for this invention is: what is the principle or concept that will determine how the links between providers and beneficiaries will be made use of?

As was explained in the aforesaid FIG. 32, the society of the future will have networked sensing devices in numbers so vast that there can be no comparison with the number of networked terminals that exist today. In this future society, there will be a need for traffic control to organize the information from all these networked sensors and make the maximum use of it. The information mediation system according to this invention is a system to control the traffic of this information and by so doing impart an added value to it and set the charge for that added value.

SUMMARY OF THE INVENTION

In this invention, the servers owned by the provider and the mediator of the information, which are linked to each other through an information network such as the Internet, are on one side. On the other are the servers for the mediator and the beneficiary, linked in the same way through a network. The first objective of this invention is to provide a system and method to mediate information whereby a person who activates the system inputs a given objective specification to the mediator's server, and the server mediates and transmits to the beneficiary out of the mass of information sent by providers just such information as conforms to that objective specification, so that a provider and beneficiary for the information are put together flexibly each time the need arises and the information traffic is thereby controlled.

With this invention, as was discussed above, each time an interaction takes place, a combination of information provider and beneficiary is assembled anew according to the objective specification. Thus the same terminal may receive compensation as a provider at one time and be charged a fee as a beneficiary under a different objective specification at another time. The second objective of this invention is to mediate the charges to each terminal by keeping a running total of the payments and fees which accrue to each customer as an information provider and beneficiary in the information mediation system according to this invention.

This invention discloses an information mediating system provided with a plurality of terminals which have both information sending and receiving functions, or either an information sending or a receiving function through a network, and provided with an information mediator which has an information mediating function to mediate a received information through said network. The information mediating function is distinguished by the configuration comprising, 1) a grouping function to select an information provider and an information beneficiary out of the plurality of terminals according to an objective specification to specify a specific information to be obtained, and 2) a data transmission function to transmit the specific information obtained from the selected information provider, which fulfills the objective specification, to the selected information beneficiary through the network. Let us use the example of a given area in which a number of cars are traveling which can remotely output as sensor data the operating state of their windshield wipers. The sensor data representing the operating state of the windshield wipers are equivalent to data indicating whether it is currently raining in the given area. The sensor data transmitted to a weather data center which is the information mediator is stored in the server as rainfall data. A driver who wishes to know what the weather is in a given area could, for example, connect to the information mediator's server through the Internet. In this case, the information mediation system according to this invention will use the objective specification of wanting to know what the weather is in a given area as its basis for determining that every car is a provider and the driver described above is the beneficiary.

The information is evaluated according to the objective specification, and the fee processing is processed according to this evaluation. In this invention, the fee processing includes the payment of a fee for obtaining the information, and receiving a compensation for providing the information.

In this invention, the specific information to be transmitted to the selected information beneficiary is obtained based on a specific state information of said selected information provider to represent specific states of the terminal of the selected information provider. The specific information means the specific state information, for example, if the windshield wipers are working or not, or if the car door is locked or not. The specific state information of the selected information provider can be a sensing information.

According to this invention, the information mediating function has a data processing function which processes the sensing information detected at the selected information provider to fulfill the objective specification, then the data transmission function transmits the processed sensing information to the selected information beneficiary through the network. In other words, the information mediating system, according to this invention, can transmit the sensing information as it is to the information beneficiary, or it can transmit the processed sensing information processed by the data processing function. For example, there are a plurality of fire alarm sensors to detect fire in a factory. If only one sensor detects the fire, and the information is transmitted to the information mediating system, then data processing function will judge that the sensor should be tested by a maintenance agent, but will not judge that the fire is occurring. If a plurality of fire sensors detects the fire at the same time, the data processing function will notify the fire department without contacting the maintenance agent. In this case, the data processing function can be expressed by If-Then style, or it can have a self-learning function.

The information mediating function is further provided with a data search function to search an outer data base to obtain additional information to fulfill the objective specification. The data processing function provided in the information mediating function processes the sensing information and the additional information obtained from the outer data base to fulfill the objective specification, then the data transmission function transmits the processed sensing information and additional information to the selected information beneficiary through the network. In order words, the specific information needed for the information beneficiary is obtained not only from the internal data base, but also from the disclosed corporate information in the home page, etc. through an internet portal site or a direct search. For example, if the sensing information is about the car troubles of a specific automobile company, then the information mediating system, according to this invention, will identify the location of the car in trouble by GPS, and show the direction to the garage on the car navigation display for the information beneficiary. The location of the nearest garage will be obtained by searching the home page of the garages who can handle the car in trouble. The access to the home page can be done through the internet portal sides sites which are the specific information sources.

In the information mediating system according to this invention, the information mediating function has a secondary use function, which stores the obtained specific information in the information mediator, searches a secondary specific information out of the stored specific information according to a secondary objective specification, and then transmits to a secondary information beneficiary. The data processing in the data processing function mentioned above means that the plurality of information obtained from the information providers are selected or added together in order to fulfill the objective specification. The value added information means that more information is added to the plurality of information obtained.

The information mediating system according to this invention, further comprises a verification function to verify the plurality of terminals before the data transmission. This verification is necessary to verify the data is sent only from the verified terminals. This is also necessary to verify the data is sent only to the verified terminals. This verification is done prior to the transmission of the data. The verification function can identify a type of the received information based on a verification data assigned to each terminal.

The information mediating function, according to this invention, further comprises an objective modification function to create a modified objective specification which is broken down into a plurality of understandable detailed conditions for the information mediator, and the information mediating function mediates the received information based on the modified objective specification. The plurality of understandable detailed conditions are, for example, location condition defining the location by dividing the entire country of Japan into 10 Km squares, the machine condition defining the running automobile, the providers condition defined by the windshield wipers in switched-on state, the determination condition how to make a conclusion it is now raining based on a predetermined percentage of switched-on windshield wipers, mapping condition to display the result on a map, output condition to promptly output the process information.

The information mediating system according to this invention, the information mediating function ignores the received information which does not fulfill the objective specification. This function is necessary to select the information to fulfill the objective specification.

The objective specification has a plurality of terminal classification data to classify the plurality of terminals based on a layered address of each terminal. The terminal classification data is, form example, a terminal address for each type of machine, sensor, and event of transmission. The information mediating system can select the terminal based on this terminal classification data. The grouping function selects the information provider and the information beneficiary out of the plurality of terminals according to the objective specification The information mediator can be connected with the plurality of terminals of the information provider and the information beneficiary through a single or plurality of networks, or through a same or different network.

This invention discloses an information mediating system provided with a plurality of terminals which have both information sending and receiving functions, or either an information sending or a receiving function through a network, and provided with an information mediator which has an information mediating function to mediate a received information through said network. The information mediating function is distinguished by the configuration comprising, 1) a grouping function to select an information provider and an information beneficiary out of the plurality of terminals according to an objective specification to specify a specific information to be obtained, 2) a data transmission function to transmit the specific information obtained from the selected information provider, which fulfills the objective specification, to the selected information beneficiary through the network, and 3) a fee mediation function to pay a compensation to the information provider, and charge a fee to the information beneficiary, based on a value of the specific information.

The fee mediation function switches the information provider and the information beneficiary, and reverses a fee charge direction to the switched information beneficiary, based on a value of the mediated specific information in response to different objective specifications. The fee mediation function is also provided with an information value evaluation function to evaluate the mediated specific information which is processed and value added information by the information mediator, then the data transmission function transmits the mediated specific information to the selected information beneficiary through the network. "To switch or reverse" mentioned above means that, for example, a terminal can be an information provider until a certain specific time, then the same terminal becomes an information beneficiary after the specific time.

The fee mediation function is provided with a fee calculation function to calculate total fee for each selected information beneficiary, an information provider extraction function to identify the selected information provider, a percentage calculation function to calculate a weight of contribution toward achieving the specific information, a compensation calculation function to calculate total compensation for each selected information provider, and a grand totaling function to offset a total fee to pay as the information beneficiary and a total compensation to receive as the information provider, and obtain a grand total for each terminal.

The fee mediation function is provided with different fee tables depending on the objective specification. The tables can be fluctuated according to an economy, how many information providers and information beneficiaries are selected, or a usage purpose of the specific information and a number of usage at the information beneficiary. The tables can be also fluctuated according to a processing level of the specific information, or a sales amount, a profit, and an expected growth of a business which is related to the specific information.

The compensation to be paid to the information provider, and a fee to be paid to the information beneficiary, are recorded in a memory device provided in each terminal. The memory device is, for example, IC card, etc.

In the information mediating system according to this invention, the information mediating function selects a transmission type of information providers according to the objective specification, out of monitored transmission which requires monitoring by the information mediating function, independent transmission which controls a timing of data transmissions to the information mediator by itself, and event transmission which transmits data only when an unforeseen accident or breakdown occurred, and the information from the information providers are sent to the information mediator according to the selected transmission type.

This invention discloses an information mediating system provided with a plurality of terminals which have both information sending and receiving functions, or either an information sending or a receiving function through a network, and provided with an information mediator which has an information mediating function to mediate a received information through said network. The information mediating function is distinguished by the configuration comprising, 1) a grouping function to select an information provider and an information beneficiary out of the plurality of terminals according to an objective specification to specify a specific information to be obtained, 2) a data transmission function to transmit the specific information obtained from the selected information provider, which fulfills the objective specification, to the selected information beneficiary through the network. The selected information beneficiary has a maintenance order function to automatically order a maintenance service to a maintenance agency based on the received specific information in order to conduct the maintenance service for a specific terminal of the information provider. The maintenance service means, for example, to supply the coins for change in an automated vending machine if the remaining amount becomes low.

According to this invention, the selected information beneficiary has a security order function to automatically order a security service to a security agency based on the received specific information in order to conduct the security service for a specific terminal of the information provider when the specific information contains an abnormal or malfunction information. The security service means, for example, to notify the security company if an abnormal vibration is detected in the vending machine.

The detailed explanation for the information mediating method used in the information mediating system is disclosed in the following sections.

DETAILED DESCRIPTION OF THE INVENTION

Comprehensive Block Diagrams of Providers, Beneficiaries, Mediator and Objective The providers, beneficiaries, mediator and objective specification discussed above in regard to the information mediation system relating to the aforesaid invention are shown in block diagram in FIGS. 1 through 12 and shall be disclosed in detail in the following section.

Figure 1:
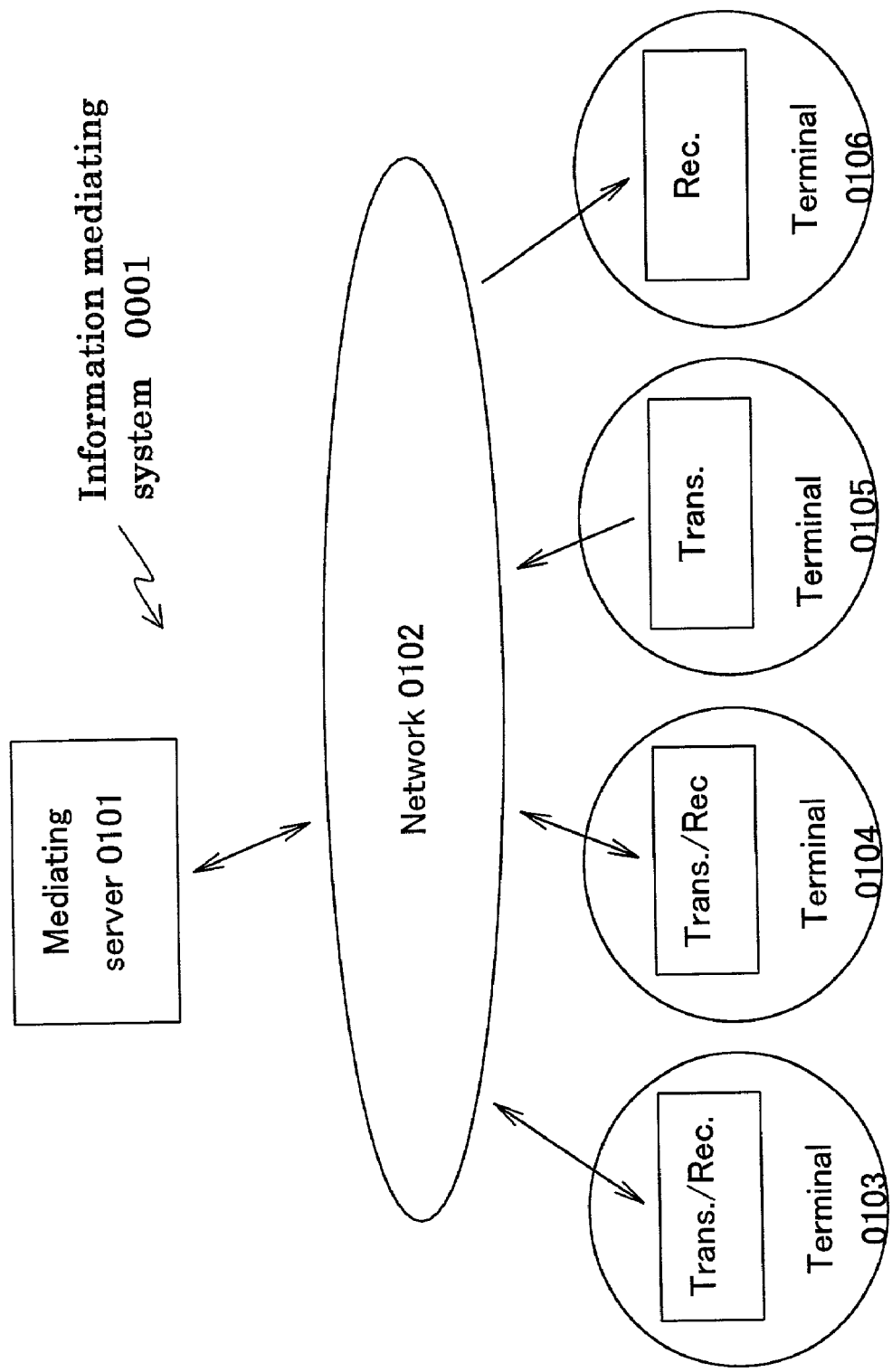
FIG. 1 is a block diagram showing the entire system according to this invention.

FIG. 1 is a block diagram showing the entire system according to this invention. It is a comprehensive diagram of information mediation system 0001 to mediate information through its server 0101 between equipment or devices 0103 to 0106, which are all connected to network 0102.

The function (or method) of receiving and transmitting data which inheres in the equipment or devices 0103 to 0106 here described may be implemented remotely or by wire. As long as they are connected to a network, the type and arrangement of these devices is of no importance. Equipment or devices 0103 to 0106, which are connected through network 0102 to the mediator's server 0101, are divided into three classes. 0103 and 0104 can both send and receive data; 1015 can only send data; and 0106 can only receive data.

The role of the information mediator's server 0101 in this configuration is to acquire information from equipment or devices selected from its options according to the objective it receives, and then to transfer some of this information, selected according to the objective, to equipment or devices selected from its options. This transfer of information which fulfills an objective is what we refer to as "information mediation." The entity which is capable of mediating information (in the example, the server which performs the information mediation) is what we refer to as the "information mediator."

Figure 2:
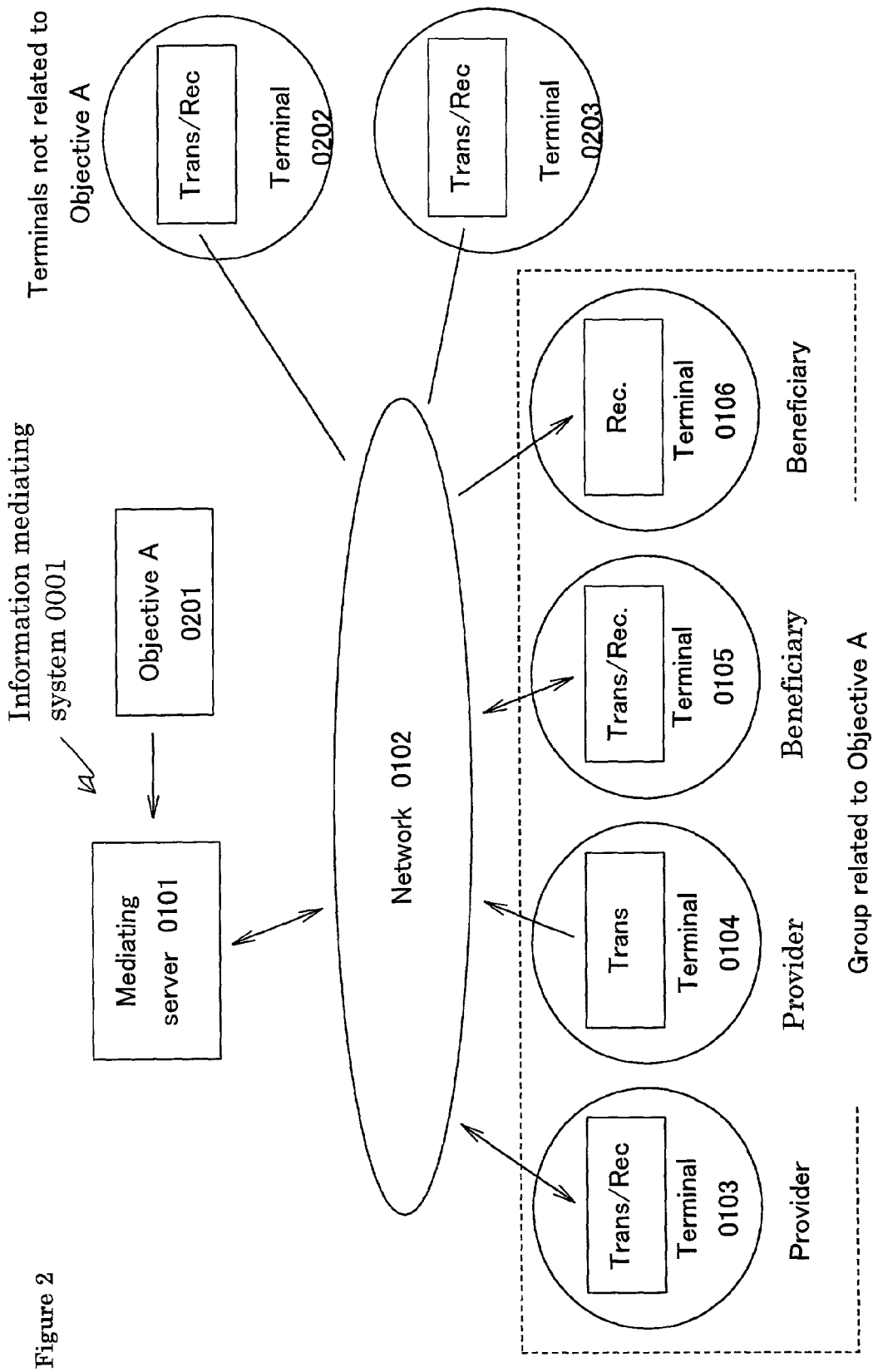
FIG. 2 is a block diagram showing the entire system according to this invention.

FIG. 2 is a comprehensive diagram of a system which illustrates how information is mediated for a particular objective (in the drawing, objective A 0201). By connecting to the information mediator's server 0101 for objective 0201, the equipment or devices 0103 to 0106 that are within the dotted lines, namely the same equipment and devices pictured in FIG. 1, begin to participate in the system. In this case, devices 0202 and 0203 do not share objective 0201, but are connected to the network. These devices, however, may be participating in the system with objectives other than objective A. A single device is not restricted to a single objective, but may participate in the system with a number of different objectives. A crucial consideration for this invention is that a device which participates with a number of different objectives may at some times be a provider and at other times a beneficiary. Even with the same objective, a single device may play both roles at different times. The circumstances under which a device becomes a provider or beneficiary will be explained later in another diagram.

Figure 3:
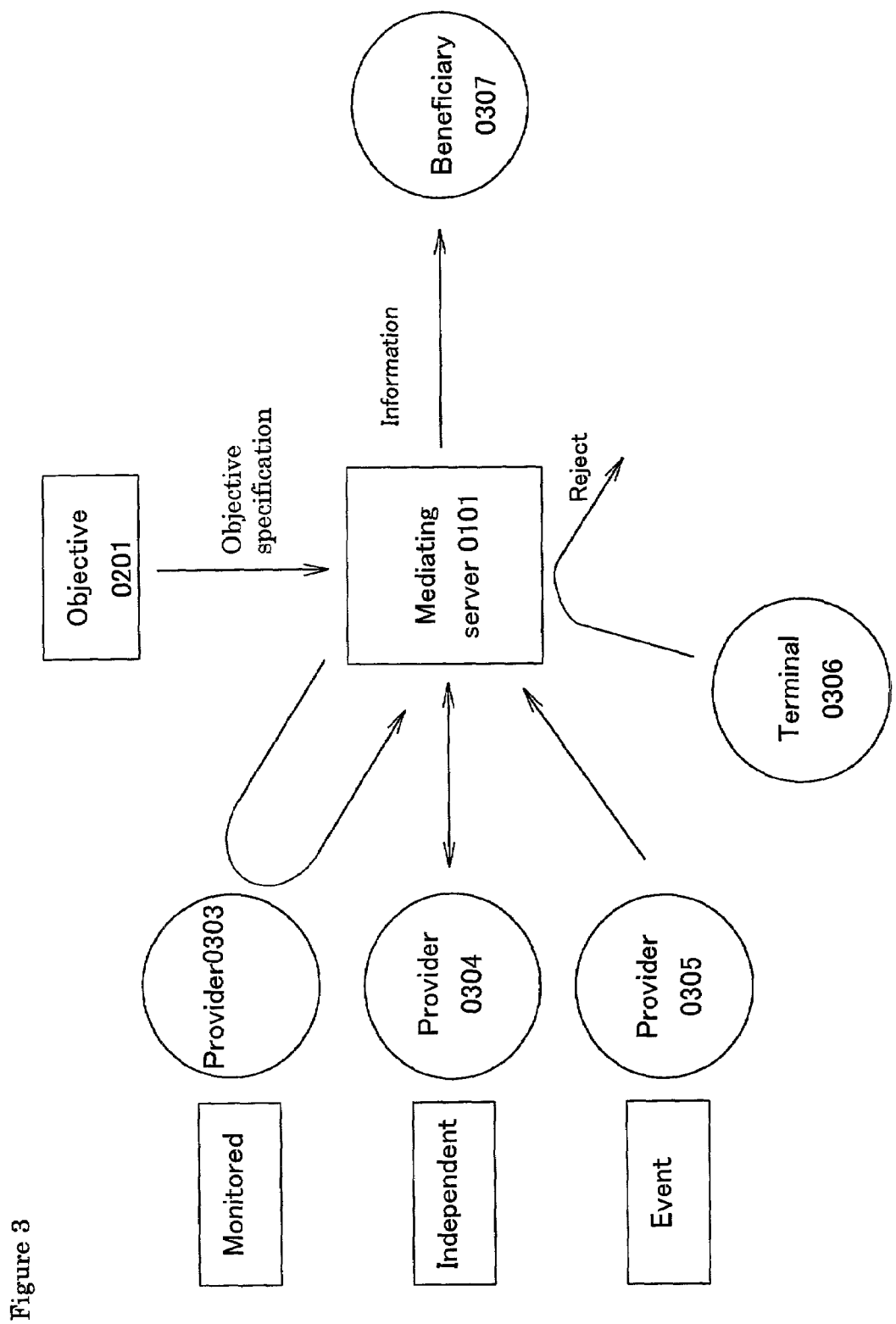
FIG. 3 is a block diagram showing the entire system according to this invention.

FIG. 3 is a comprehensive diagram in which FIG. 2 has been visualized in another way. This diagram illustrates the different types of providers. The mediation capability of information mediator 0101 consists of determining what role each device will play according to the objective 0201 which it receives in order to achieve the image shown in the diagram. The interaction in which mediator server 0101 receives objective 0201 is what we refer to as "objective specification." Normally, objective specification will be initiated by a beneficiary 0307 who wants to obtain some specific information. However, it need not be limited to the beneficiary. A third party may also specify an objective. When specifying an objective to mediator server 0101, the beneficiary may input to server 0101 a number of objectives of various types which define what sort of information he needs.

The information providers may be divided into three classes: monitored providers 0303, which require monitoring by the information mediator; independent providers 0304, which themselves control the timing of their data transmissions to the mediator; and event providers 0305. What we refer to as "independent providers" are providers which transmit data to the mediator constantly or at fixed intervals. For example, they would include providers which transmit data detected by sensors at regular intervals. Event providers transmit data in the event of a previously specified occurrence. For example, they would transmit data when an unforeseen accident or breakdown occurred.

Data transmitted by equipment or device 0306, which does not contribute to fulfilling this objective, are ignored by the mediator. It is of course possible that this device may be participating with some other objective, and so may be a provider or beneficiary in terms of that objective, a situation not pictured in this diagram. For the sake of convenience, let us assume that the devices in the diagram have no other objectives. In the information mediation system according to this invention, different providers will participate for each objective 0201.

Figure 4:
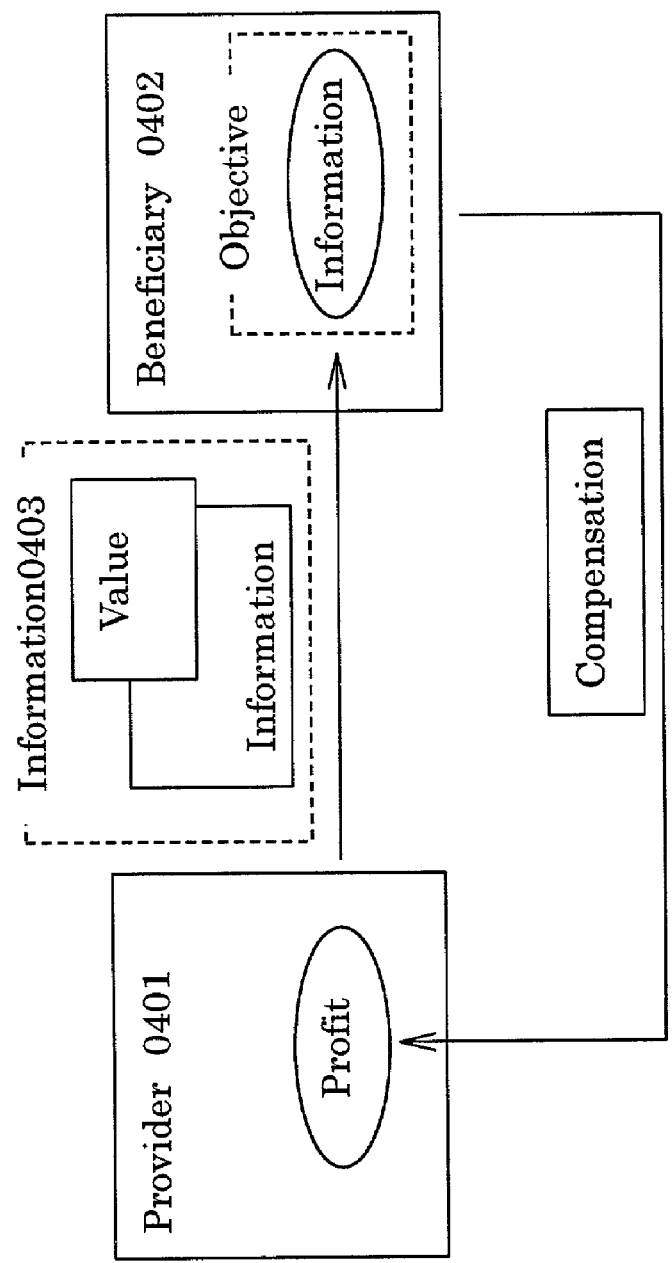
FIG. 4 is a conceptual diagram which illustrates the meaning of a provider, a beneficiary and information which has a value.

FIG. 4 is a conceptual diagram which illustrates the meaning of a provider 0401, a beneficiary 0402 and information which has a value. In this diagram, the information which has a value is valued information 0403. This term refers to information which the information-using party (here, beneficiary 0402) is willing to pay fee 0404 to obtain, or to valued information 0403 which is yet to be acquired. The provider and beneficiary are defined as provider 0401 and beneficiary 0402 in relation to the valued information. The value here is that perceived by the recipient, beneficiary 0402. It is set according to the subjective evaluation of the recipient, the party who will use the information. Thus the value of the information as perceived only by provider 0401 has no effect on this value.

Since the entity we have been calling "information beneficiary 0402" is in actuality a machine or device, the "subjective evaluation" will depend on whether the information increases the usefulness of the machine or device. To put it another way, "information which will add value," i.e., information which increases the usefulness of the machine or device, is any information which the beneficiary values to the extent that he is willing to pay for it. Fee 0404, which beneficiary 0402 pays to obtain the information, becomes profit for the provider. Accordingly, there will come to be an industry of providing information for a fee. We might consider the relationship between this information and its value to be an equivalence, i.e., the information itself can be considered to be equivalent to a value: it is a value-equivalent item. Or we might consider that there is a value which is inherent within the information (or with which the information has been vested): it is information which possesses an inherent value. The "objective" which has been discussed in the drawings up to this point is defined as the acquisition of information of value to the beneficiary, i.e., information which he values.

Figure 5:
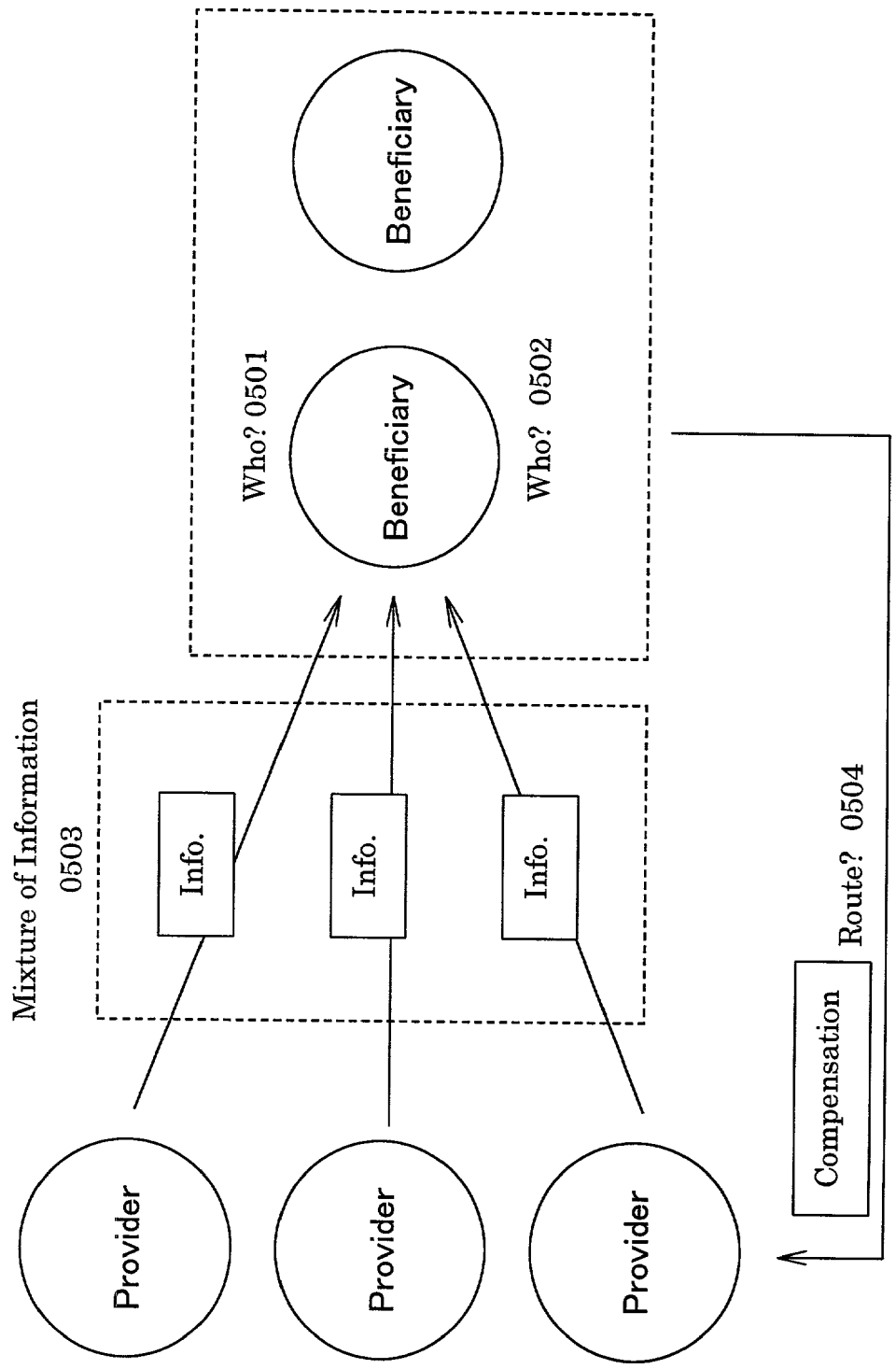
FIG. 5 is a conceptual diagram setting forth the problem areas regarding the information transmitted between providers and beneficiaries.

We have already explained that this invention concerns an information mediation system which brokers information between providers and beneficiaries, and that this information mediation system imparts an added value to the information as it controls its traffic. In the absence of an information mediation system such as that provided by this invention, the transmitters and receivers of the information would both experience great confusion in trying to deal with it, as will be described shortly. FIG. 5 is a conceptual diagram setting forth the problem areas regarding the information transmitted between providers and beneficiaries as explained in FIG. 4.

The information provider possesses information which he has generated, procured or accumulated; yet in the absence of an appropriate means to control its traffic, he will be unable to identify potential beneficiaries who will recognize its value, he will have no knowledge about beneficiaries who do recognize its value, and he will have no rules governing how fees are to be assessed. Thus his "information" will not be information in the true meaning of the word. Being unable to identify potential beneficiaries means that the provider of the information has no idea who the customers (with this invention, machines or devices) are who will recognize the value of the information he wants to provide and so will want it. (Recognizing the value of the information is synonymous with being willing to pay a fee.) Having no knowledge about the beneficiaries who do recognize the value of the information means that even when the provider knows who the customers who want the information are, he is still in the dark as to what exactly they value and what it is they want. Having valuable and worthless information intermixed means providing information to a customer without determining its value (as perceived by that customer), or not being aware that the same information can have a different value (either higher or lower) when provided to a different customer. Not having rules to govern fee assessment means that because the seller, as was discussed above, does not understand the value of the information for which he is supposed to compensate providers according to the value it has for the customers, he cannot determine what an appropriate compensation (i.e., compensation to the providers) would be. The problem does not disappear if the providers and beneficiaries are linked through a network, which is, after all, merely a means or tool to transmit information. The fact that a potential provider who has information and a potential beneficiary who needs that information are linked through a network does not translate into a profitable relationship in the absence of appropriate traffic control.

The Mediator

Figure 6:
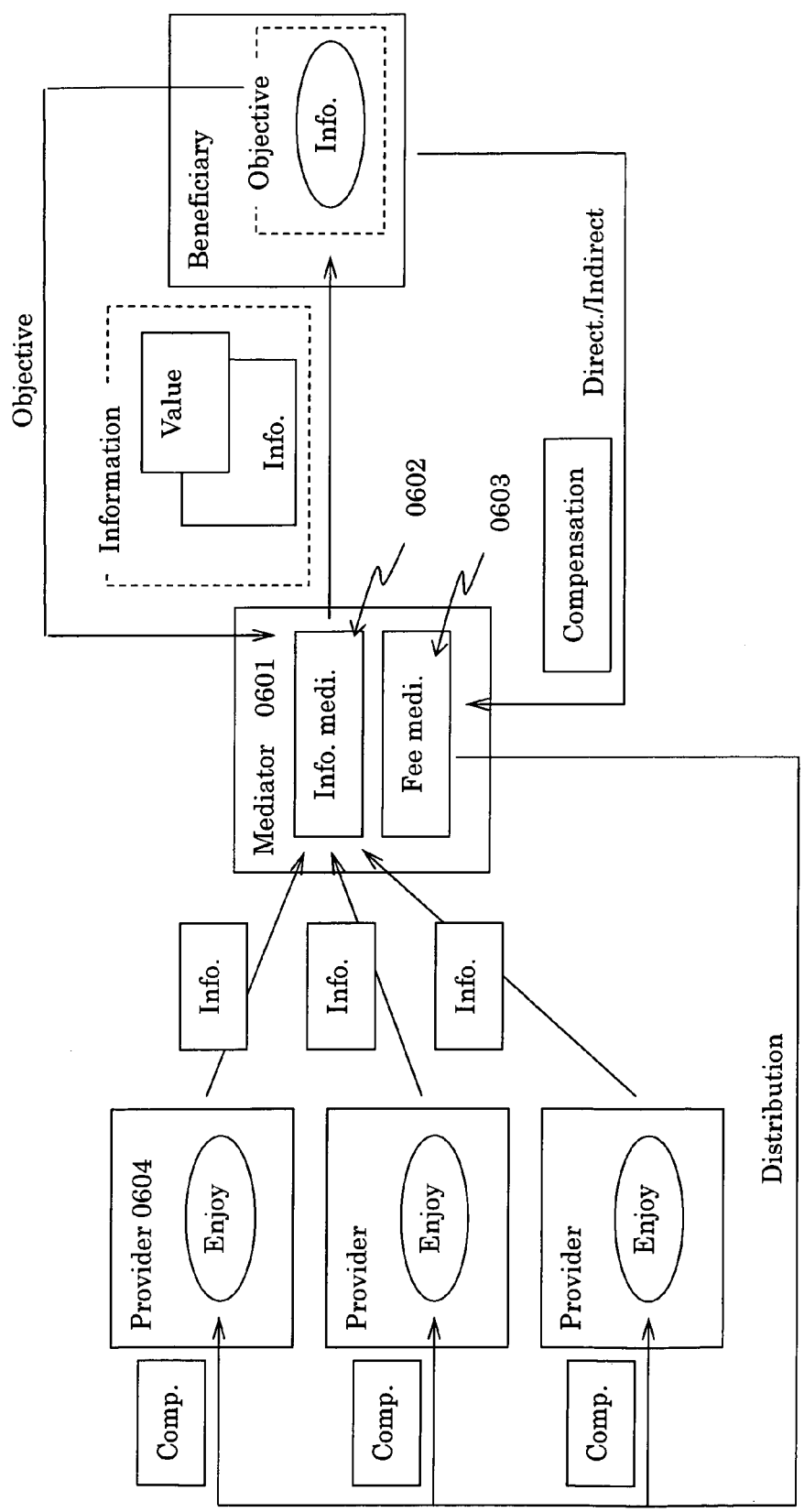
FIG. 6 is a conceptual diagram to illustrate the mediation performed by information mediator.

We have been discussing the chaotic situation which occurs when there is no mediator, as illustrated in FIG. 5. FIG. 6 is a conceptual diagram to illustrate the mediation performed by information mediator 0601, which is the main objective of this invention. The mediation performed by the mediator has two functions: function 0602, information mediation, and function 0603, fee mediation. We shall generally use "mediation" to refer to both functions together. However, we will at times for the sake of convenience use "mediation" with its narrow meaning of information mediation. In discussing FIG. 6, we shall expand our explanation and add details with reference to FIGS. 7 through 12.

The Mediator and the Information Mediation Function

In FIG. 6, mediation function 0602 refers to selecting information obtained from provider 0604 according to the objective obtained either directly or indirectly from beneficiary 0605 and transmitting only that information which provider 0604 regards as valuable. In other words, this function consists of selecting and transmitting information. In some cases, the mediator may collect information before it is classified according to an objective. Mediation function 0603 refers to distributing to the providers, according to the value of the information provided, the fees paid either directly or indirectly by the beneficiaries. Beneficiary 0605 in this case may also refer to many beneficiaries. In other words, all machines or devices which pay a fee to obtain the information, even if it is the same information, may be considered beneficiaries.

Figure 7:
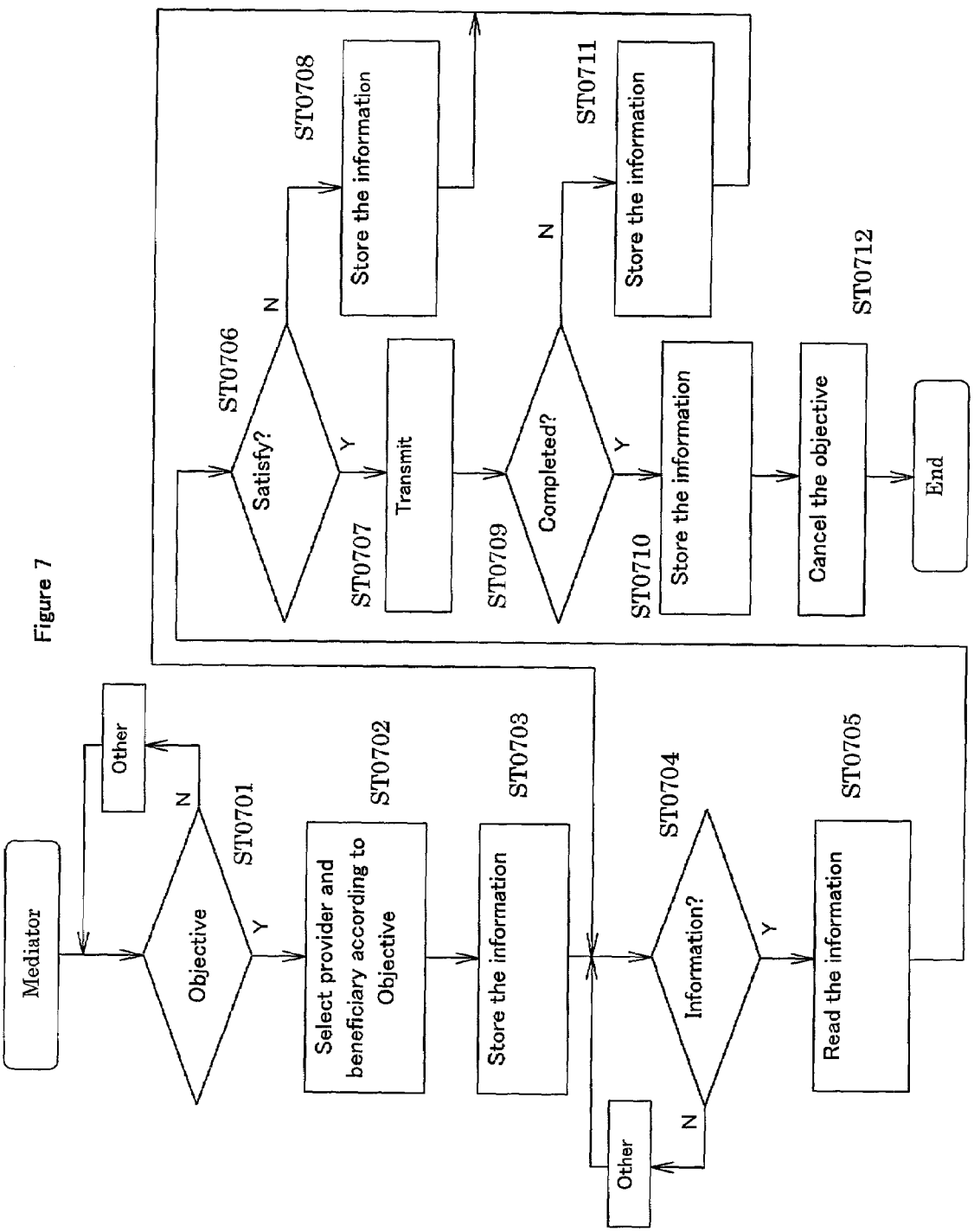
FIG. 7 is a flow chart which illustrates the basic role played by the aforementioned mediator.

FIG. 7 is a flow chart which illustrates the basic role played by the aforementioned mediator. We shall begin by discussing, with reference to the flow chart, the basic steps in the mediation function 0602 performed by the mediator illustrated in FIG. 6. This mediation function consists of the following.

1) Receiving the objective.
2) Selecting providers and beneficiaries according to that objective.
3) Acquiring information from the providers.
4) Determining whether that information conforms to the objective.
5) Storing the information together with the objective.
6) Transmitting the information which conforms to the objective to the beneficiaries.

In other words, the information mediation function is put into play when an objective is specified (i.e., when objective specification occurs). The objective here is what the beneficiary (a machine or device) specifies for the mediator to use. It is the purpose for which the information will be used as seen by the beneficiary. We shall next discuss mediation function 0602.

The objective in the first function, "Receiving the objective," may be conveyed directly by the beneficiary or indirectly by a third party. The third function, "Acquiring information from the providers," corresponds to the step in the flow chart where it is determined whether information has been provided by the providers. Note that although the mediator's server is receiving various kinds of information from all the machines and devices connected to the network, it will determine that information it receives from devices other than those selected as providers in function 2 does not serve the purpose, and it will not mediate it. In other words, the server ignores information which does not conform to the objective. The providers are those machines and devices which absolutely conform to the objective. We might say that the providers are those devices which the mediator sees as absolutely certain to be related to the objective.

In function 6, "Transmitting the information which conforms to the objective to the beneficiaries," the mediator determines, when it receives information from a provider, whether that information conforms to the objective it has received. It then transmits to the beneficiaries (as information conforming to the objective) only that information which it judges to conform to the objective.

We shall next discuss the flow of the actual mediation function 0602 as illustrated in the flow chart in FIG. 7. In the first step, information mediator 0601 in FIG. 6 determines in FIG. 7 whether objective specification has occurred (0701). If it has, the mediator selects providers and beneficiaries from the available machines and devices connected to the network according to the objective it has received (0702). It then stores in its memory unit a set of objective data containing the objective and the results of the selection (0703). In a separate procedure, the mediator checks whether information has been provided by any providers (0704). It reads out of the memory unit any potential target information from a provider who has sent information (0705), and it determines whether the information provided conforms with the stated objective (0706). If it does conform with the objective, the mediator transmits the target information to the beneficiaries (0707). If in (0706) the information does not conform with the objective, the mediator stores it in the memory unit along with the target information as "acquired information" (0708) and stands by until more information is provided (0704).

The mediator checks to see whether the stated objective has been completely fulfilled (0709). If it has, the mediator stores the information it has transmitted in the memory unit along with the target information as "objective fulfilled" information (0710). It cancels the completed objective and stores the result in the memory unit (0712). The mediation processing is now completed. If in 0709 the objective has not been completely fulfilled, the mediator stores the information it has transmitted in the memory unit along with the target information as "transmitted information" (0711) and stands by for more information from providers (0704).

The Mediator and the Fee Mediation Function

Figure 8:
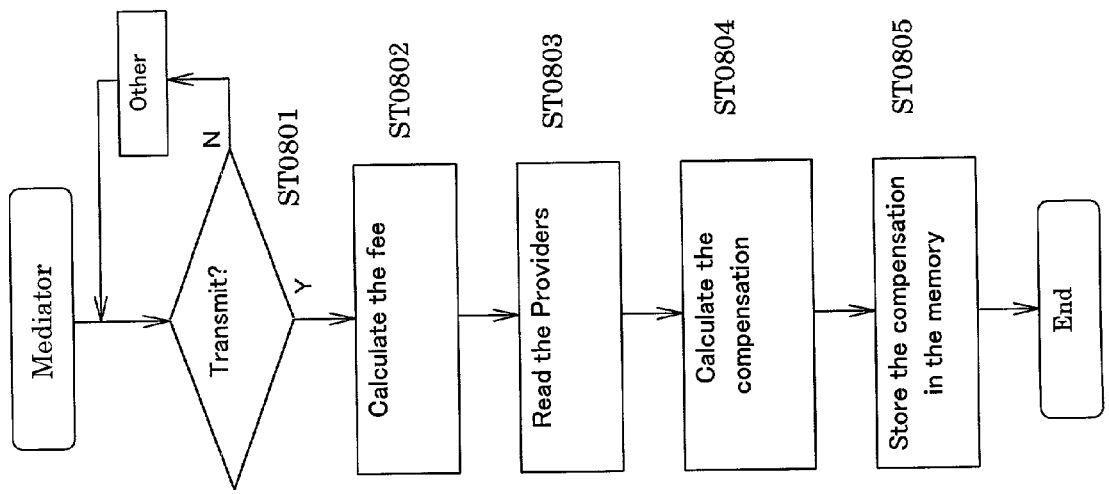
FIG. 8 is a flow chart which illustrates the basic role played by the aforementioned mediator.

In the above discussion, we explained the information mediation function (0602) shown in FIG. 6. We shall next explain the fee mediation function (0603) in the same way. FIG. 8 is a flow chart illustrating the basic role played by the mediator. We shall begin by discussing the fundamental aspects of this fee mediation function with reference to the flow chart.

The fee mediation function can be broken down into the following functions.

1) Determining, from the value of the target information which was transmitted, what fee to assess the beneficiary.
2) Calculating what percentage of the fee should go to the provider according to the value of the information acquired.
3) Determining the appropriate compensation from the percentage which was calculated.
4) Calculating the total compensation to be paid to each machine or device based on the fees and compensation that were determined.
5) Storing the total compensation in the memory unit.

The fee mediation function 0603 in FIG. 6, then, is the final step in the process instigated when a customer specifies an objective (i.e., when objective specification occurs). The "value" referred to above is related to the objective agreed upon by the beneficiary (a machine or device) and the mediator.

When the fee to be charged to the beneficiary is determined in function 1 above from the value of the information transmitted, its value for a given objective is already known. If there are multiple beneficiaries, the value of the information to each will be determined from factors both intrinsic and external to the machine or device which specifies the objective (these factors will be explained in a separate diagram) with reference to the various objectives to which the information is tied. The total charge calculated for each beneficiary from the value assigned to each objective becomes the beneficiary fee for that beneficiary. The fee charged for using the mediation service is not included here.

When the percentage of the fee to go to the provider is calculated in function 2 above according to the value of the information acquired, the percentage is determined from the value. A provider who supplies more valuable information will be given a greater percentage of the fee.

When the compensation is determined in function 3 from the percentage that was decided on, the beneficiary fee and the compensation are not necessarily equal. In general, the compensation will equal the beneficiary fees minus the mediator's expenses (viz, operating cost and profit).

To determine the total compensation for each machine or device in function 4 based on the fees and compensation that were decided on, the mediator has to offset the compensation against the beneficiary fees (internal processing executed by the mediator). This is necessary because the same machine or device may, for different objectives, function at different times as both a provider and a beneficiary.

When the compensation which was determined is stored in the memory unit in function 5, it becomes the data which serves as a basis for processing fee assessment. Actually, since both the providers and beneficiaries are machines, there will be many cases in which human operators take part in the information mediation system. These operators will specify (i.e., input) objectives to the information mediator's server and settle the charges (i.e., they will pay any shortfall or receive any excess). The "operators" may be humans, or they may be terminals (machines or devices) which convey a human's wishes.

The block diagram in FIG. 8 explains each step of the aforesaid fee mediation function 0603, which was discussed in detail in the aforesaid functions 1 through 5. In Step 0801, the mediator checks whether information has been sent to the beneficiary (as in 0707 or 0710 in FIG. 7). It calculates the beneficiary fee for each beneficiary based on the value of the information which was sent, in this way determining all the beneficiary fees.

In Step 0803, the mediator extracts from the memory unit all the providers who have furnished information which was sent to beneficiaries. In Step 0804, it determines the compensation to be paid to each provider by calculating his percentage based on the value of the information he has provided.

In Step 0805, the mediator calculates the total charge and compensation which has been decided for each machine or device, and stores these in the memory unit. This completes the fee mediation processing. The last step constitutes the aforesaid functions 4 and 5.

Block Diagram of Mediator and Information Mediation Function

Figure 9:
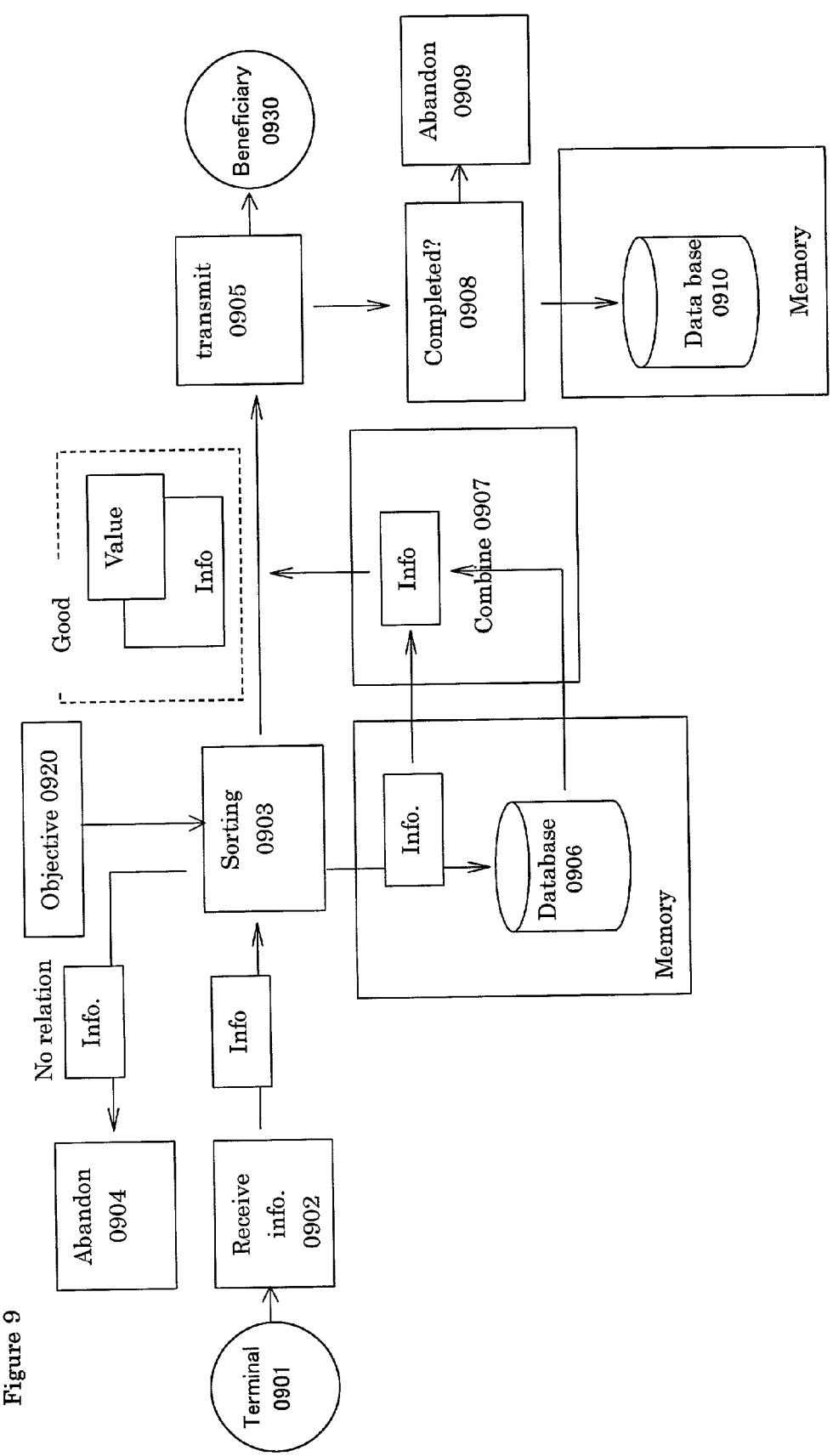
FIG. 9 is a block diagram illustrating the actual process by which the mediator mediates information.

FIG. 9 is a block diagram illustrating the actual process by which the mediator mediates information in the aforesaid FIG. 6. Each block corresponds to a portion of the flow in FIG. 7. This diagram covers what happens from the time the information is input until it is output. The portion of FIG. 9 which is enclosed within dotted lines represents information mediation function 0602 and corresponds to function 0602 in FIG. 6.

First, some specified sensing data from a sensor installed on a machine or device 0901 are input via an information network to mediation function 0602 in the information mediation system according to this invention. The information from machine or device 0901 is not limited to sensing data only. It includes all input data concerning specific states which can occur in that device or machine. These input data are first sent to function 0902, the processing of acquired data. This function consists of receiving data from a device or machine. The input data are then sent to function 0903, the sorting process. This process consists of comparing the data received in the acquisition function with a previously stored objective 0920 and sorting them accordingly. Data which do not conform to the objective are sent to function 0904, cancellation processing, where they are cancelled. Data which are judged in the sorting process to fulfill the objective are sent without further processing via function 0905, data transmission, to beneficiaries for whom they have a value. Data which in the sorting process are judged not to fulfill the objective are stored in memory unit 0906, which serves as a data base. They may be combined in function 0907, combination processing, with other data received in the future to form a data group, which will be sent via function 0905, data transmission, to beneficiaries 0930 for whom these data have a value. Function 0907, combination processing, refers to combining newly received data with data stored in the data base to create information which has a value. "Creating information which has a value" is equivalent to creating information which conforms to an objective. In some cases, data which did conform to an objective may be combined with other data to increase their value. In such cases, we could say that the data are being given a new value.

When the data which match the objective specification are sent to beneficiaries 0930, they are also sent in parallel to function 0908, which determines that a single objective has been achieved or an entire set of objectives is completed. Function 0908 consists of determining whether the objective which was specified has been achieved and whether the process is now completed. The result of this processing is used in the fee mediation function, which will be discussed shortly. Objectives which are judged to have been fulfilled are communicated to function 0909, cancellation processing, where they are cancelled.

Function 0910, storing the data for objectives that are achieved and completed, consists of storing data for objectives 0920 judged in function 0908 to have been achieved or completed, together with the provider, viz., the machine or device 0901 which furnished the data, and beneficiary 0930, the machine or device which will use the data.

Figure 10:
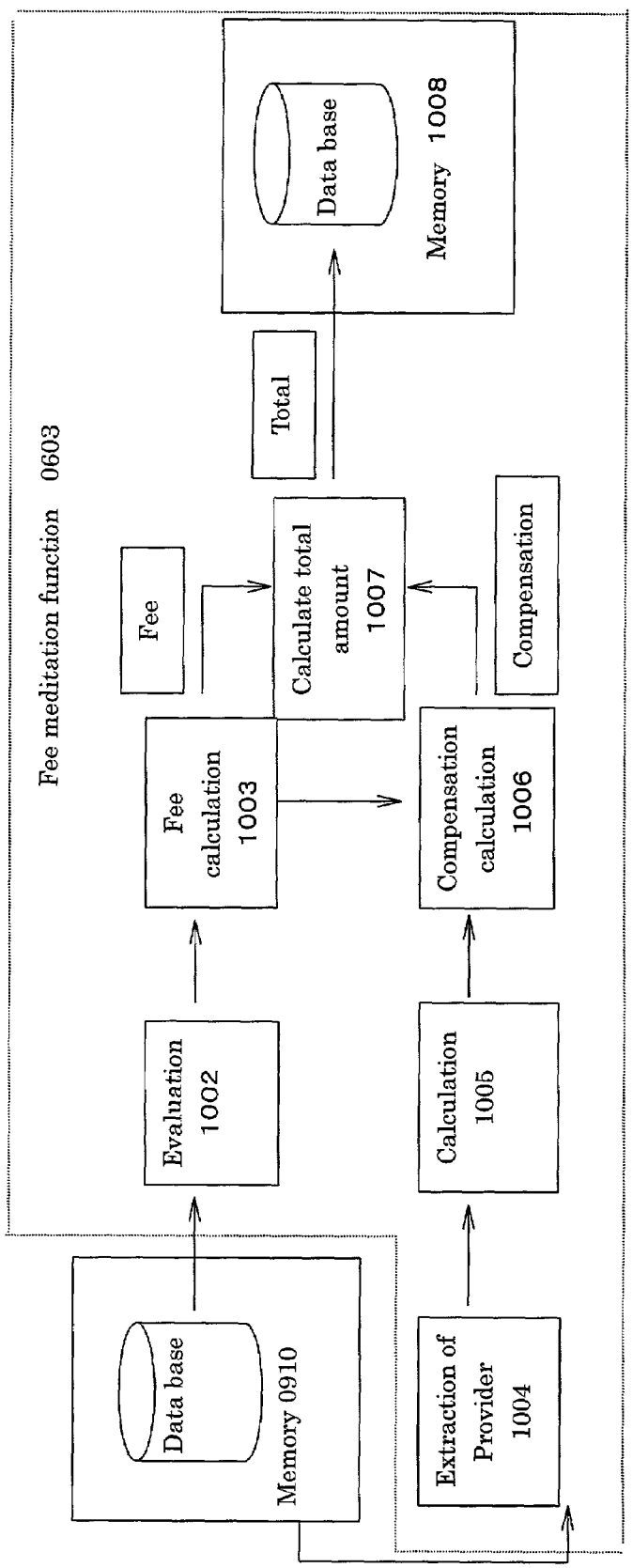
FIG. 10 is a conceptual diagram to illustrate in a more concrete manner the fee mediation function performed by the mediator.

FIG. 10 is a conceptual diagram to illustrate in a more concrete manner the fee mediation function 0603 performed by the mediator in FIG. 6. FIG. 10 corresponds to the flow in FIG. 8, which means that it covers what happens from the time the objective is achieved until the compensation is processed. The functions enclosed within dotted lines represent fee mediation function 0603.

In the final stage of the mediation processing shown in FIG. 9, the mediator stores the data for which mediation processing has been completed in function 0910, which is part of the mediation function. First, the value of these stored data is judged by function 1002, value determination processing, which is a component of fee mediation function 0603. Function 1001 (sic; in diagram, 1002) consists of determining the value of the data for achieved or completed objectives which have been sent to beneficiaries. The actual compensation or fee is computed by function 1003, calculating the fee and compensation, which consists of calculating the fee for each objective and, if there are multiple beneficiaries, totaling the fees to obtain the fee to be charged.

To extract data concerning the party which has furnished the data when the mediation processing is completed, we move to the processing in function 1004, the extraction of the provider. This function consists of extracting from the data stored by the mediation function (see FIG. 9) in data base 0906 the name of the provider who furnished the data for which a fee is assessed. In function 1005, processing is executed to calculate the percentage for compensation purposes. This function consists of obtaining, for each provider (i.e., each machine or device) extracted by function 1004, a percent rating to indicate the weight of the contribution made by the data it provided toward achieving or completing the objective.

The compensation and fee, i.e., the payment based on the cost price that is made to the provider in the commercial transaction known as mediation and the fee for providing the information which the beneficiary is charged are processed by function 1006, calculating the charges. This function consists of calculating the amount each provider is to be charged from the total fees calculated by the fee calculation function (in reality, the total fees after the mediator's profit margin is subtracted) and the compensation percentage calculated for each provider by the percentage calculation function. Function 1007 is the final calculation of the charge. It consists of executing the processing to compute a total charge (including offsetting fees and compensation) for each machine or device for which a fee was calculated by the fee calculation function and compensation was calculated by calculation function 1006 (since the same device can at different times be both a provider and a beneficiary). The result is transmitted to function 1007, storing the total charge. This function consists of storing the total charge calculated for each machine or device by the charge totaling function.

Figure 11:
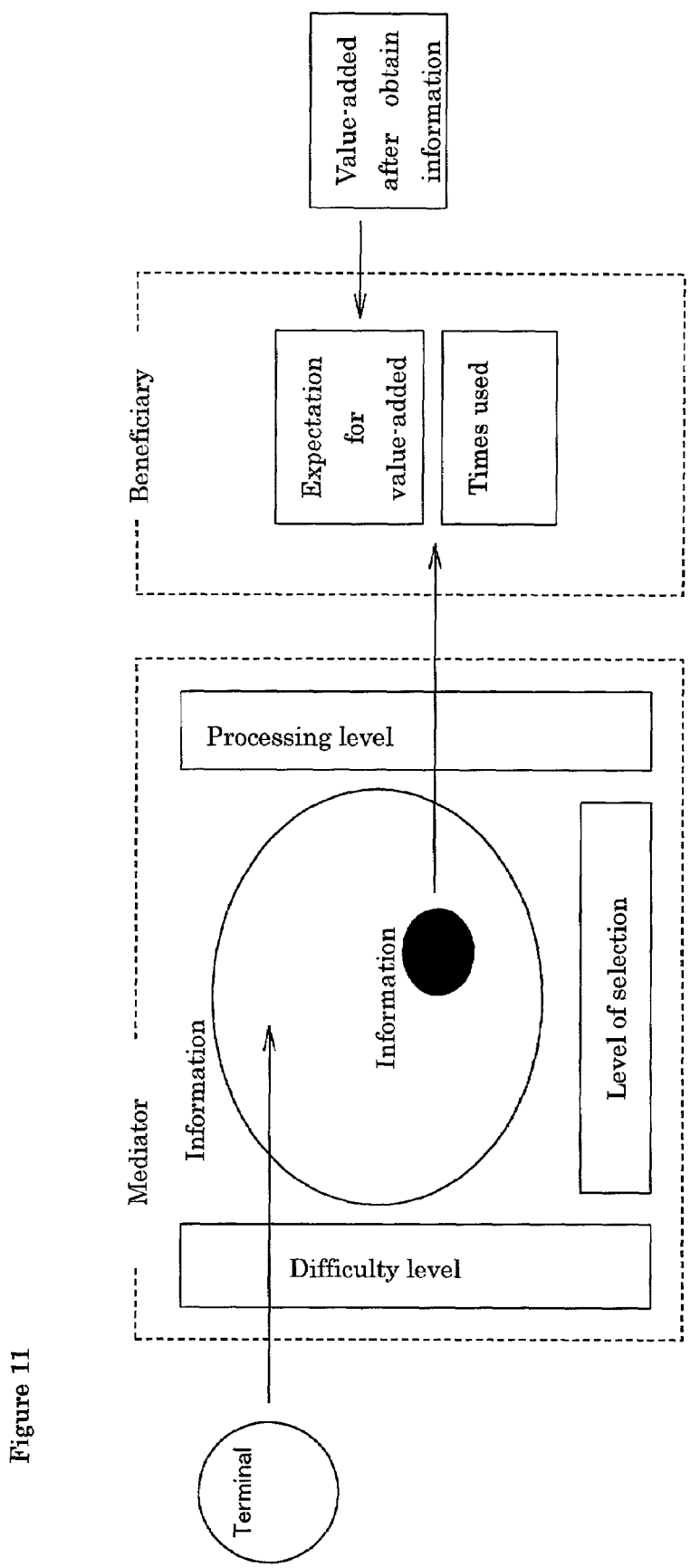
FIG. 11 gives a conceptual diagram illustrating the standard by which the value of information is judged.
Figure 12:
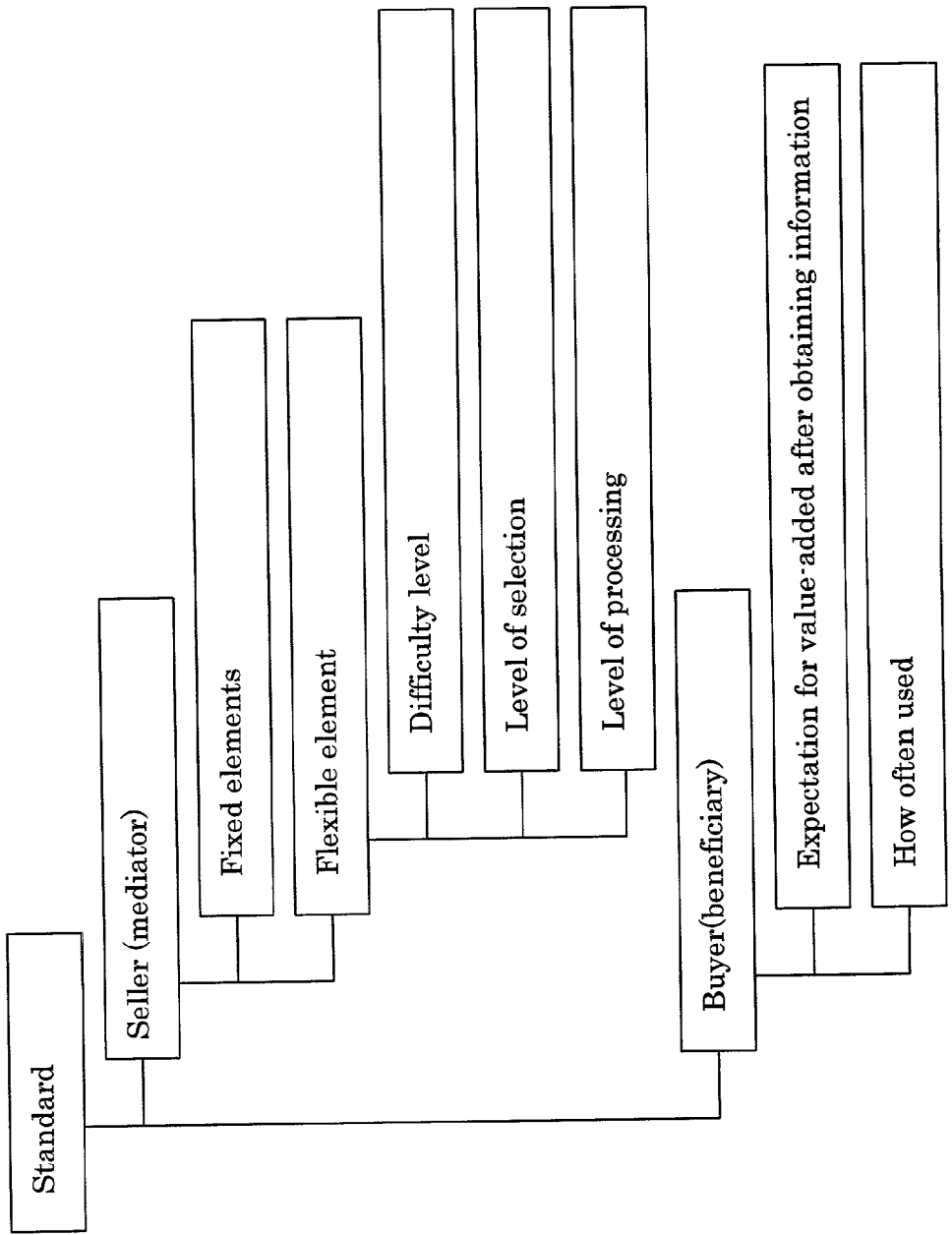
FIG. 12 gives a conceptual diagram illustrating the standard by which the value of information is judged.

FIG. 11 gives a conceptual diagram illustrating the standard by which the value of information is judged. This is an example of a standard which might be used when function 1002 in FIG. 10, the evaluation function, determines the value of the information. The standard for determining value can be divided into two questions: "How much labor was required on the seller's part to provide this information?" and "How attractive is this information to the buyer?"

Since information is deemed valuable insofar as it fulfills an objective (See FIGS. 7 and 9), its assumed value is determined when that objective is specified. The value determined at the time the objective is specified is called its "fixed component." Different information will be valued differently depending on how difficult it was for the providers selected by the mediator for a given objective to acquire it, how carefully the mediator selected information from the total data set he acquired, and how much the information was processed to enhance its value. The portion of the value which varies depending on how the objective is achieved is called its "variable component." There may be cases in which the charge is discounted for a frequent beneficiary in order to reduce the beneficiary fee which would ordinarily increase with frequency of use. The beneficiary might also anticipate that by using the information he will increase its value. (This translates into the beneficiary feeling that what he is being charged for the information provided might not be appropriate or reasonable.) All of these factors are diagrammed in FIG. 12. The factors which go into determining the value of information are divided into two classes: factors which pertain to the seller (i.e., the mediator), and factors which pertain to the buyer (i.e., the beneficiary). In this regard, information is no different from any other product. The factors pertaining to the seller may be divided into factors which yield a fixed value, which is determined when the objective is specified; and factors which govern the variable aspect of the value, which may be revised when the objective is fulfilled. This aspect of the information's value varies depending on how difficult it turned out to be for the providers to acquire it, how carefully the mediator selects information to match the objective, and how much the information is processed to enhance its value. Factors on the buyer's side which cause the value of the information to vary include his belief that the value of the information will be enhanced by the fact that he is using it; and his frequency of use, which if high can result in a discount. The value of the information is thus determined in function 1002 in FIG. 10 by taking all of these factors into consideration.

Reversing the Flow of Information by Changing Objectives

The information mediation system relating to this invention is distinguished by the fact that the role played by any of the aforesaid terminals can switch from that of provider to that of beneficiary in response to different objectives. For example, when a given event occurs, the party which until that point had been the provider can become the beneficiary. Let us given an example in which the aforesaid terminal is a vending machine. Normally, the vending machine is a provider, transmitting data to the mediator's server at regular intervals to report sales figures. When event data are generated reporting that the machine is out of change or that the stock of soda cans is low (a sudden change of state), these sensing data are transmitted to the mediator's server as an event so that the change or the soft drinks can be restocked. The event transforms the vending machine, which until that point had been a provider, into a beneficiary.

To given another example of this invention, the mediator, in addition to selecting terminals according to the objective which is specified, creates a timetable for connecting to the said terminals which varies with the objective. It can change the priority it assigns to connecting to a given terminal to accord with the urgency or the frequency which an objective requires. For information which is more urgently needed, the mediator may schedule connection on demand. For information which is less urgent, it may collect information from the terminal when free time is available so as to accommodate the load on the network.

The aforesaid timetable according to this invention may also permit interrupts for certain kinds of specified objectives or certain kinds of signals input by terminals. In other words, information from a provider which is very urgent or important to the beneficiary, as was explained above, can be assigned a high priority by giving it a schedule that allows interrupt processing.

The aforesaid timetable may be revised if the value of the data input by a terminal changes. For example, the timetable which schedules connecting to a terminal may be changed after an event occurs. For some objectives, the aforesaid mediator, who is aware of the characteristic profile of each terminal, may select a timetable which permits interrupts so that it can conduct a poll based on those characteristics.

ACTUAL EXAMPLE 1

We shall next give a detailed disclosure of the distinctive features of the objective and objective specification in the information mediation system related to the aforesaid invention, with reference to the examples in FIGS. 13 through 18.

Figure 13:
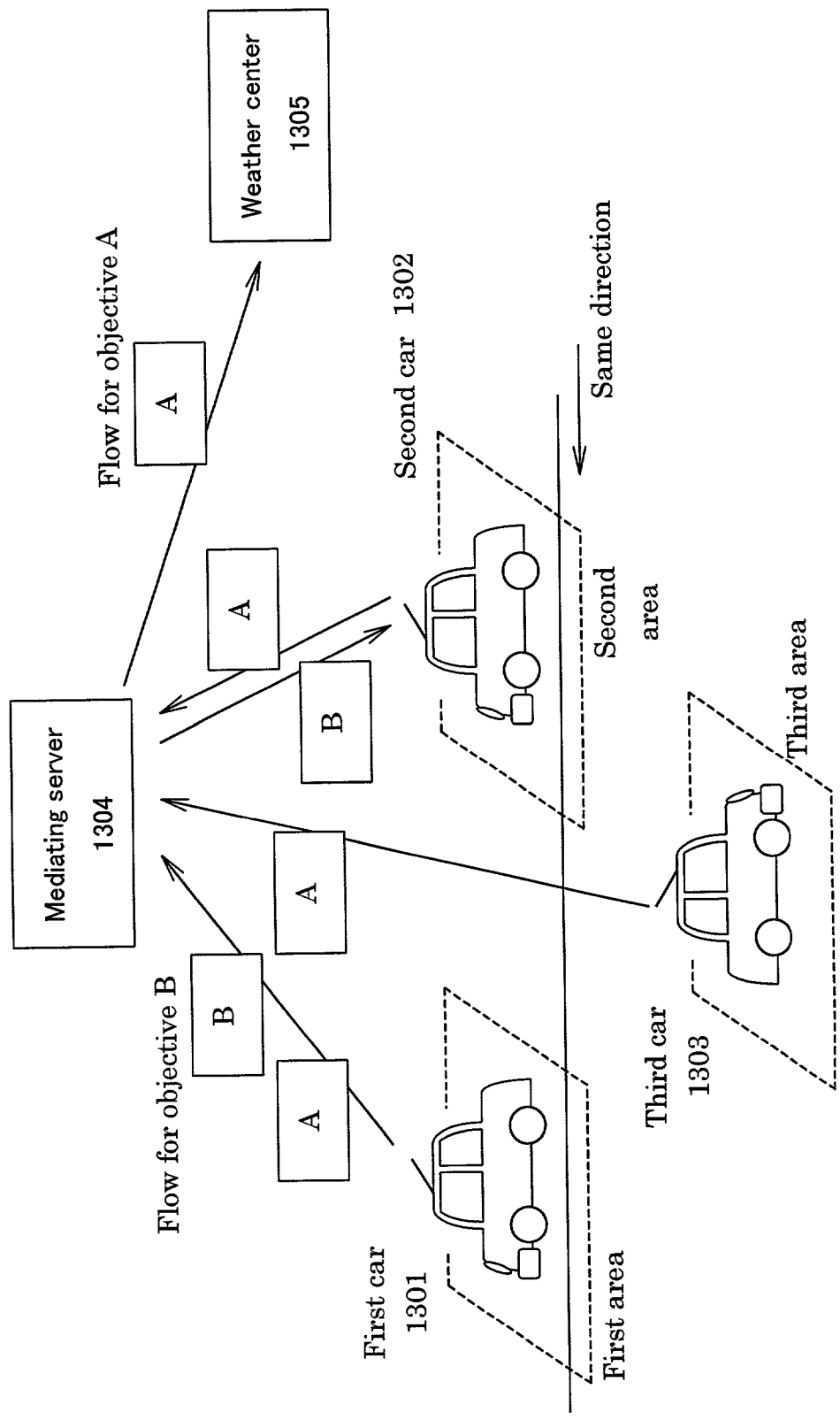
FIG. 13 is a realistic example which illustrates the distinctive features of the information mediation system related to this invention, in which the same machine or device may be both a provider and a beneficiary, depending on the objective.

FIG. 13 is a realistic example which illustrates the distinctive features of the information mediation system related to this invention, in which the same machine or device may be both a provider and a beneficiary, depending on the objective. In this example, there are three cars, car 1301, car 1302 and car 1303, on a highway. Each car has a sensor built into its windshield wipers to detect whether the current state of the wipers is "on" or "off." These on-off states are transmitted remotely, for example via the internet, to mediator server 1304. If we look at car 2, for example, we see that its role varies depending on the objective. (It is a provider with respect to objective A but a beneficiary with respect to objective B.) The arrows in the drawing indicate in which direction the information is flowing to the mediator's server with respect to each objective. Let us call one of the cars which are traveling (i.e., which are now on the road) in area 1 "car 1," and let us assume that car 1 and car 2 are going in the same direction.

Objective A could, for example, be "Find out where it is raining right now in Japan," and the beneficiary could be the server for a weather information center. Objective B could be "Find out if traffic is backed up," and the beneficiary could be car 2. When the mediator's server receives objective A, it might extract a given number of cars, say one to several, from a ten-mile-square area. The sensors in, say, cars 1 through 3 would detect whether or not their wipers were turned on (because it was raining), and the area where it was raining would be transmitted to the server at the weather information center. The information transmitted might then be mapped. (This is an example of the processing mentioned in FIG. 11.) In this case all three cars are providers.

When it receives objective B, the information mediator's server might extract a given number of cars, say one to several, from all the cars going the same direction as car 2. It would measure their average speed (and in some cases determine whether traffic was backed up) and transmit the result of the measurement to car 2. Thus in the example shown here, the mediator obtains the speed sensor data from car 1, which is ahead of car 2, and uses these data as a basis to determine whether the traffic is backed up, which is objective B. Here car 1 is the provider, just as it was for objective A; but car 2 has changed roles and is now the beneficiary. For the aforesaid objective B, we can imagine various kinds of value-added information which might be transmitted. The average speed on an alternative route could be measured (from cars on that route) and a recommendation could be made. (I.e., the quickest route could be calculated from the average speed and the distance.) The fee might also be increased so that the beneficiary pays according to how useful the value-added information is. The machines or devices that are the providers and beneficiaries, then, simply exchange information with the information mediator's server, while the server is responsible for everything involved in the information (and the fee).

Figure 14:
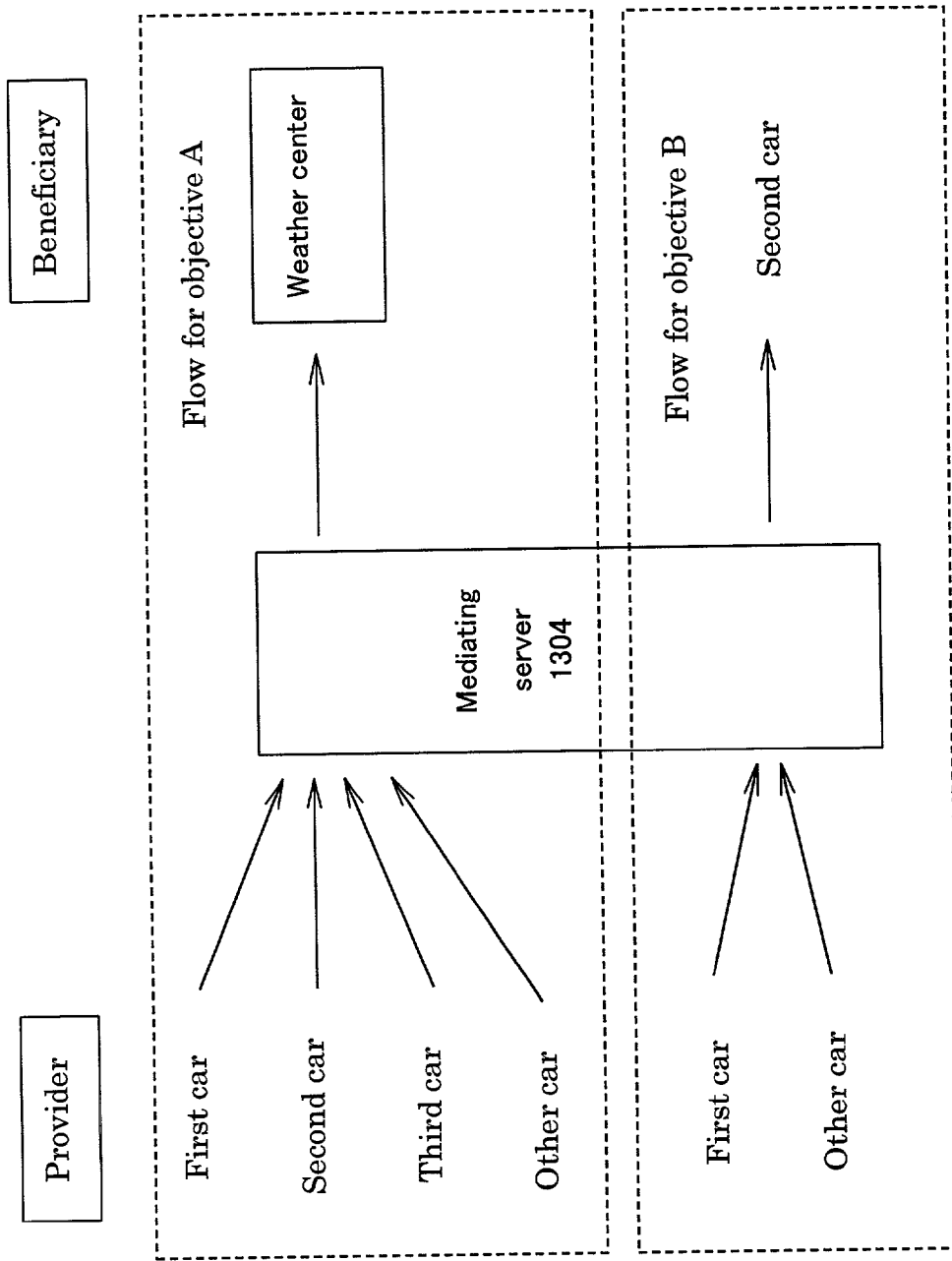
FIG. 14 is a chart showing how the flow of information is organized when there are two different objectives.

FIG. 14 is a chart showing how the flow of information is organized when there are two different objectives, as was discussed above, and the same terminal (here, a car) can be a provider with respect to one objective and a beneficiary with respect to the other. For objective A in FIG. 13, cars 1, 2 and 3 and all the other cars in the target area are providers, and only the weather center is the beneficiary. For objective B, car 1 and the other cars in the target area are the providers and car 2 is the beneficiary. In this way the same device, like car 2, can go from being a provider to being a beneficiary depending on the objective.

Figure 15:
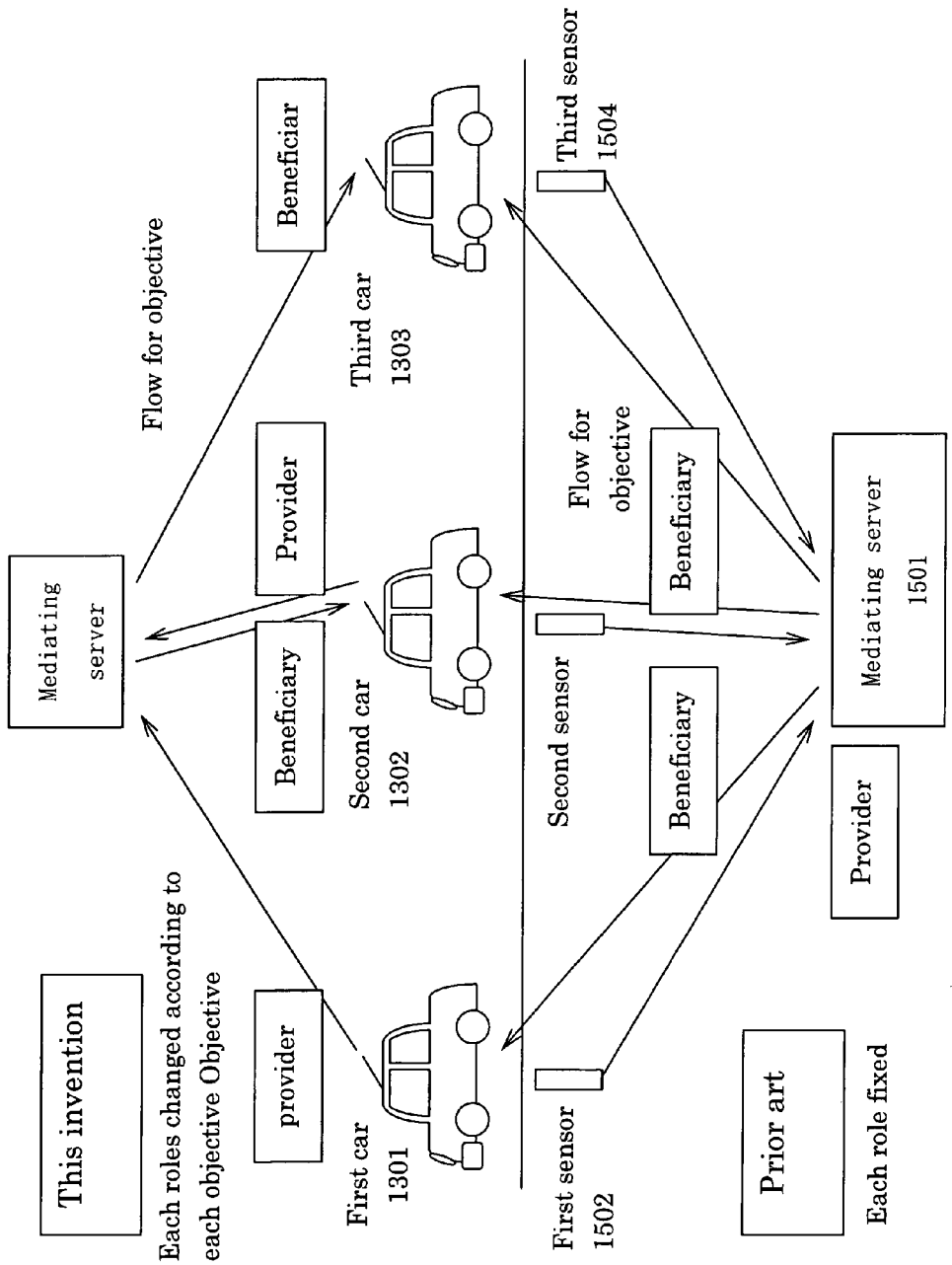
FIG. 15 compares the information mediation system according to the current invention, which achieves the aforesaid objective, with the scheme used in the prior art.

FIG. 15 compares the information mediation system according to the current invention, which achieves the aforesaid objective, with the scheme used in the prior art. The bottom half of the drawing represents the existing scheme. For the providers, dedicated sensors 1502 through 1504 were installed in place in various locations to obtain the desired data for the information provider's server 1501. This scheme required a system which did nothing but collect information, and it required beneficiaries 1301 through 1303 to go to some lengths to access the information. The beneficiary himself had to surf the net and search a number of data bases to obtain the information he needed. In this example, the providing sensors 1502 through 1504 would be dedicated sensors installed before the system was operational, which might include a speed sensor, a raindrop sensor and a road surface sensor. The data obtained from these stationary data sources would generally be processed and organized before they were provided to the beneficiaries. In other words, in the existing information mediation system, the role of provider or beneficiary, once assigned, cannot be changed.

The information mediation system related to this invention is pictured in the upper half of the drawing. Each machine (piece of equipment or device: here, cars 1301 through 1303) is connected to a network and has in it various sensors as well as output devices to transmit the information. These onboard sensors and output devices exchange information with the server 1304 for the information mediation system constantly or as needed. Each machine is assigned a role for each objective so that it can obtain or use the information it or someone else needs. The actual server 1304 for information mediation corresponds to mediator's server 0101 in FIGS. 1 through 3. We shall give examples of how these devices might be realized in later diagrams.

ACTUAL EXAMPLE 2

Figure 16:
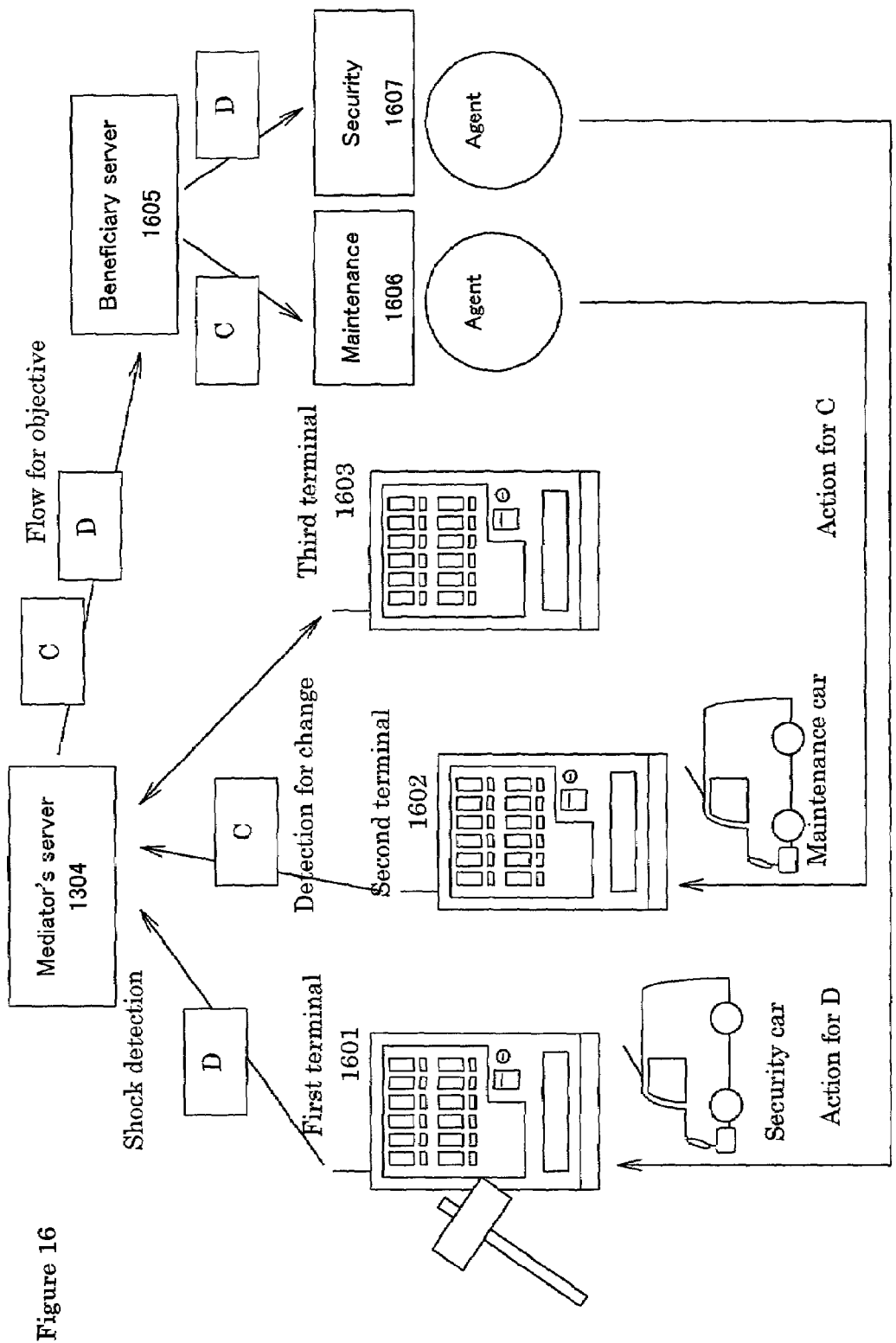
FIG. 16 gives an example of one machine or device which is pursuing a number of objectives.

In the discussion above each beneficiary had a single objective. However, the information mediation system according to this invention is not limited in this way. It is possible to imagine a single beneficiary with numerous objectives. FIG. 16 gives an example of one machine or device which is pursuing a number of objectives. Machines 1601 through 1603 in the drawing are vending machines. Each machine contains various sensors to monitor its internal state. The data detected by these sensors are transmitted to the information mediator's server, 1304, by a built-in transmitting function. There are a number of objectives which are agreed upon by the mediator's server and the controller's server. For example, objective C might be to detect when the machine is out of change or to detect how much is left (when there is only a small amount left). When the supply of change falls below a given amount, the server is contacted. Objective D might be to detect an external shock (as a deterrent to theft or other crime).

Since objectives C and D differ in both how frequently they will be met and how urgent they are (naturally objective D is extremely urgent), the charge for each of them (according to the concept explained in FIG. 12) will be different. When it receives the data representing the state of the machine, the role of controlling server 1605, the beneficiary in this case, is to inform or notify the human who stocks the machine or the security guard. When the information is transmitted accurately (swiftly and correctly), its value (i.e., the meaning it has) is enhanced. Accordingly, the controlling server recognizes the value in the information being transmitted accurately (swiftly and correctly), and a payment schedule is established to set the fee to be paid to server 1304.

ACTUAL EXAMPLE 3

Figure 17:
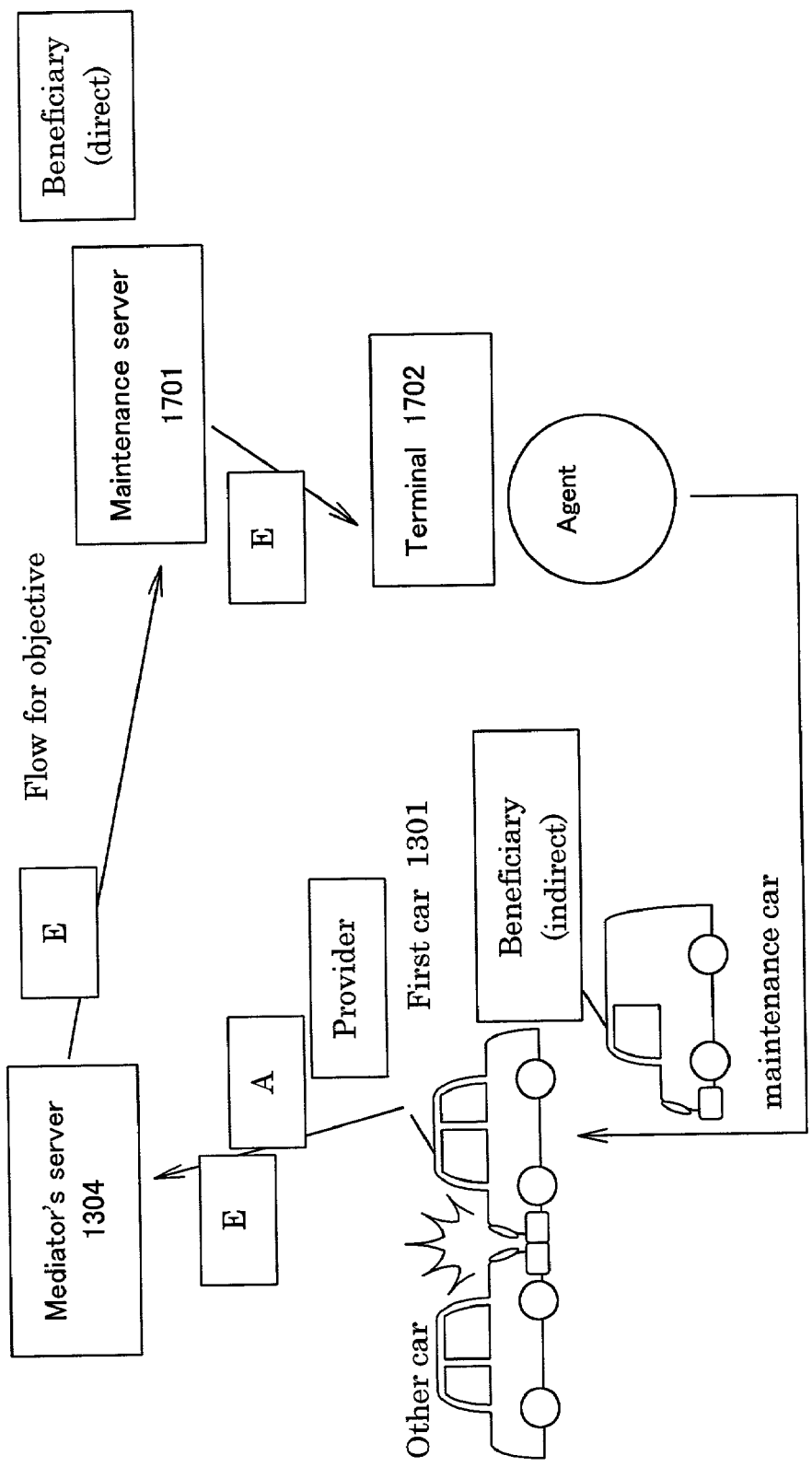
FIG. 17 shows an example in which a single machine or device can, in the information mediation system related to this invention, change its role when an event occurs.

FIG. 17 shows an example in which a single machine or device can, in the information mediation system related to this invention, change its role when an event occurs (i.e., when its state changes). In that figure, car 1301 is normally (i.e., until an event occurs) a provider for another objective, objective C. When an event occurs (in the example, a collision with another car), it becomes an indirect beneficiary who receives a service (objective E) from the auto club. Since its normal objective A is to report what the weather is wherever it goes, as is shown in FIG. 13, car 1301 normally acts as a provider by continuously transmitting the on-off state of its windshield wipers to the information mediation system, as was explained above. Objective E in this example is invoked only in the event of an accident. If car 1301 is involved in an accident, the information mediator's server 1304 contacts the server 1701 for the direct beneficiary, a service agency, to inform them about the accident. The premise of objective E is that car 1301 has been involved in an accident with another car. At the moment when the information that an unexpected event has occurred (i.e., the event data) is transmitted to the information mediator's server 1304 and help is obtained, car 1301 is transformed from a provider (reporting the on-off state of its windshield wipers) to an indirect beneficiary who receives rescue service from the direct beneficiary, the service agency. Here the term "service agency" is used to mean the party who responds to the provider's change of state: an emergency highway crew, the police, the paramedics (or an ambulance). In this example, when the service agency's server 1701 receives word that an accident has occurred in line which fits the criteria of objective E, it communicates with its terminal 1702, and a service vehicle is dispatched to car 1301. In the example in FIG. 13, car 1302 went from provider to beneficiary by changing its objective. In FIG. 17, the car changes roles because of circumstances.

Figure 18:
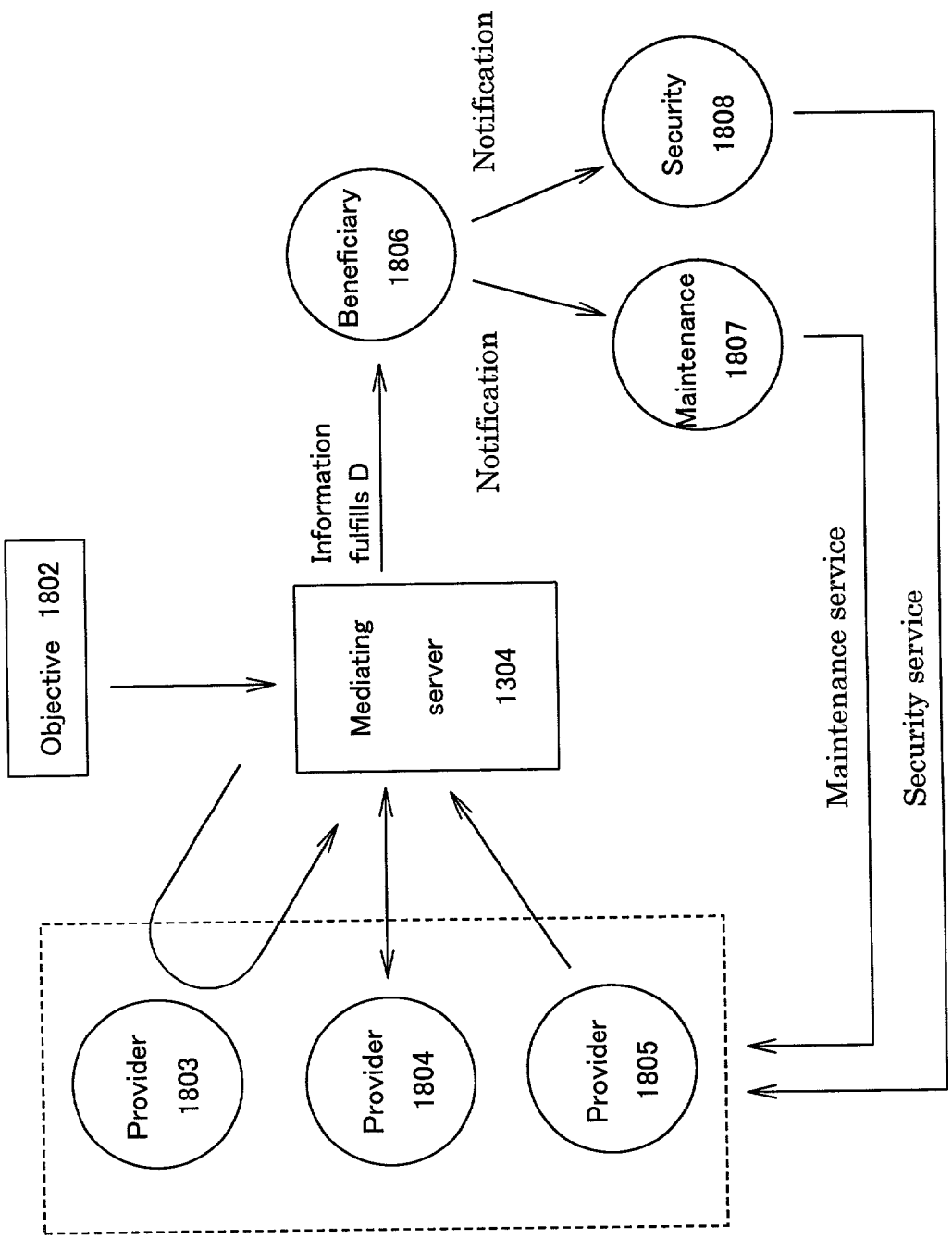
FIG. 18 is a block diagram illustrating the information mediation system according to this invention.

FIG. 18 is a block diagram illustrating another scheme to realize the aforesaid information mediation system according to this invention. This configuration corresponds to the example shown in FIG. 16. When specified objective 1802 is input or communicated to the mediator's server 1304, the server begins to receive information from the providers which conforms to that objective. Objective 1802 would be either of objectives C and D in FIG. 16. The mediator selects the means by which information is to be obtained from providers. He may, for example, obtain information from provider 1803 by polling it; from provider 1804 on the basis of demand; and from provider 1805 on the basis of an event occurring. Only the information which conforms closely to the stated objective 1802 will be sent to beneficiary 1806. In FIG. 16, beneficiary 1806 is the owner of controlling server 1605. Upon receiving the information, beneficiary 1806 instructs service agency 1807 and security agency 1808 to take a specific action. Here "service agency 1807" is the party which provides maintenance service. "Maintenance service" refers to overseeing and maintaining the machine in working condition and repairing it. For the vending machines in FIG. 16, the service agency would be the person who restocks the change or the juice, cigarettes or other product.

The "security agency" is the party who provides security service. "Security service" refers to protecting the safety of the machine or device from external threats and keeping the machine out of danger. (This includes the idea of prevention.) In the example in FIG. 16, the security agency would be the security company responsible for the safety of the machine. In some cases, the service and security agencies (i.e., their servers and terminals) may be the direct beneficiaries. FIG. 17 gives an example of the service agency's server being the beneficiary.

Enhancement of the Specific Information Fulfilling the Objective Specification/Generating a Value Added Information The specific information which fulfills the objective specification in example 1 through example 3 shown above are transmitted to the information beneficiaries after relatively low level information processing. The processing here means how much the information is processed to enhance the added value shown in FIG. 11. In example 1, mediator's server 1304 judges by itself if it is raining in the area based on the ON/OFF state information of windshield wipers of the cars running in the area. The mediated information obtained from the judgment is then transmitted to the weather center, or running other car which is an information beneficiary. On other words, mediator's server 1304 executes a relatively low level processing which guess the weather based on the On/OFF state information of the windshield wipers of the running cars. In example 2, mediator's server 1304 receives the sensor data for output from the vending machine shown in FIG. 16. Based on the received sensor data, the server judges theft or out of change state is occurring at the vending machine and judges if the server should notify the maintenance agent or the security agent. These judgments are relatively low level processing. In example 3, mediator's server 1304 only judges if an accident occurred based on the output data of the shock sensor provided in the running cars. If an accident has occurred, then the sever will notify the maintenance agent.

The information mediating system according to this invention is not limited in the relatively low level processing for the input data, but also it executes the relatively high level processing. In the relatively high level processing the mediator's server executes, there is an internal high level processing to process the received data internally, and an external high level processing to process the received data by searching the external data base through the internet. In the internal high level processing, mediator's server 1304 has enough software in the server which can mediate the received information according to the objective specification (for example, objective specifications A through E), and the optimal information which meets to the objective specification is transmitted to the information beneficiary. In the external high level processing, the mediator's sever searches the necessary information by accessing the portal site which makes it easy to access the information sources, and by accessing the home pages of the corporations. By accessing external data base, the external high level processing obtains the optimal information for the information beneficiary.

ACTUAL EXAMPLE 4

Figure 83:
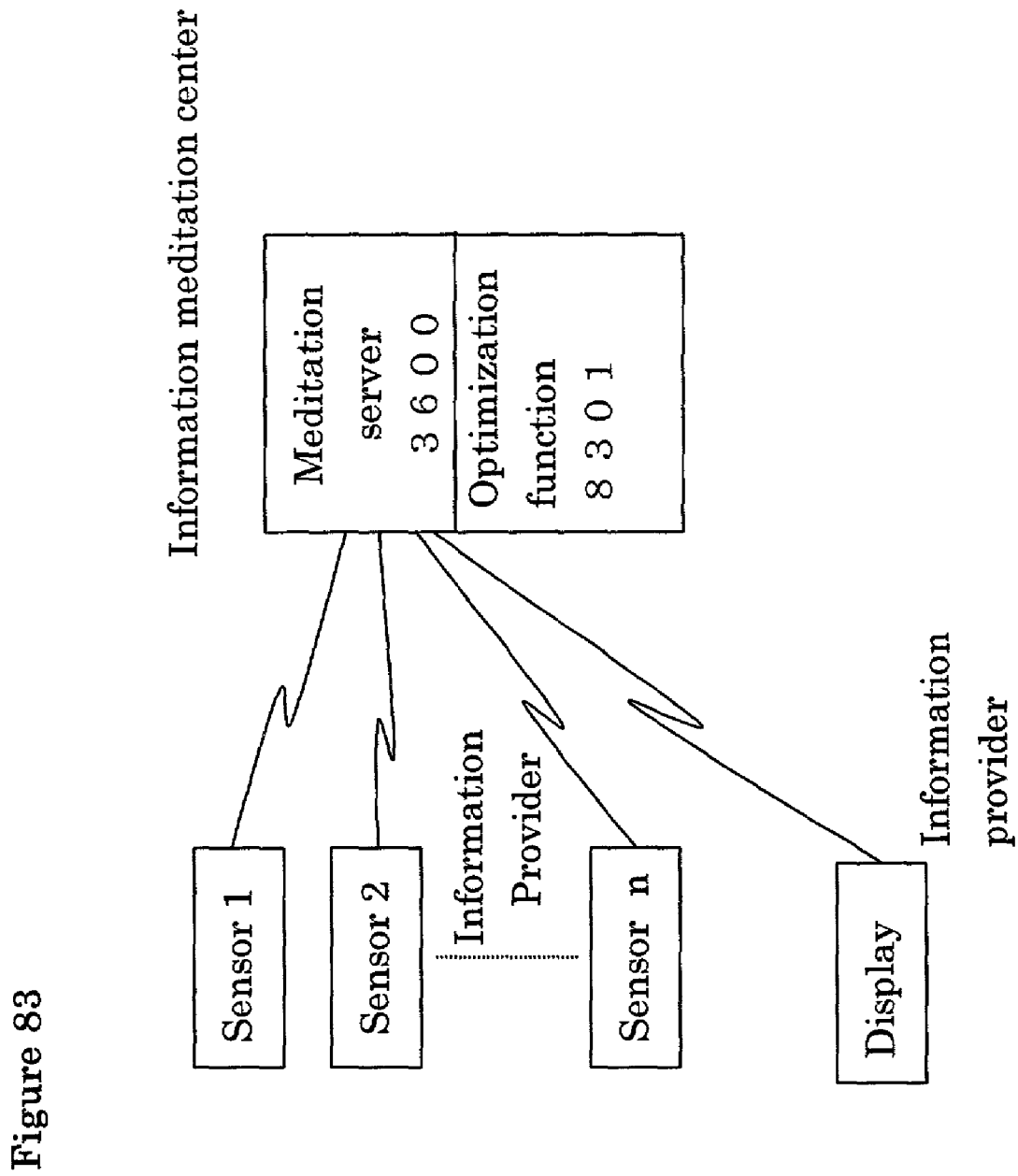
FIG. 83 is a block diagram for the internal high level processing.
Figure 84:
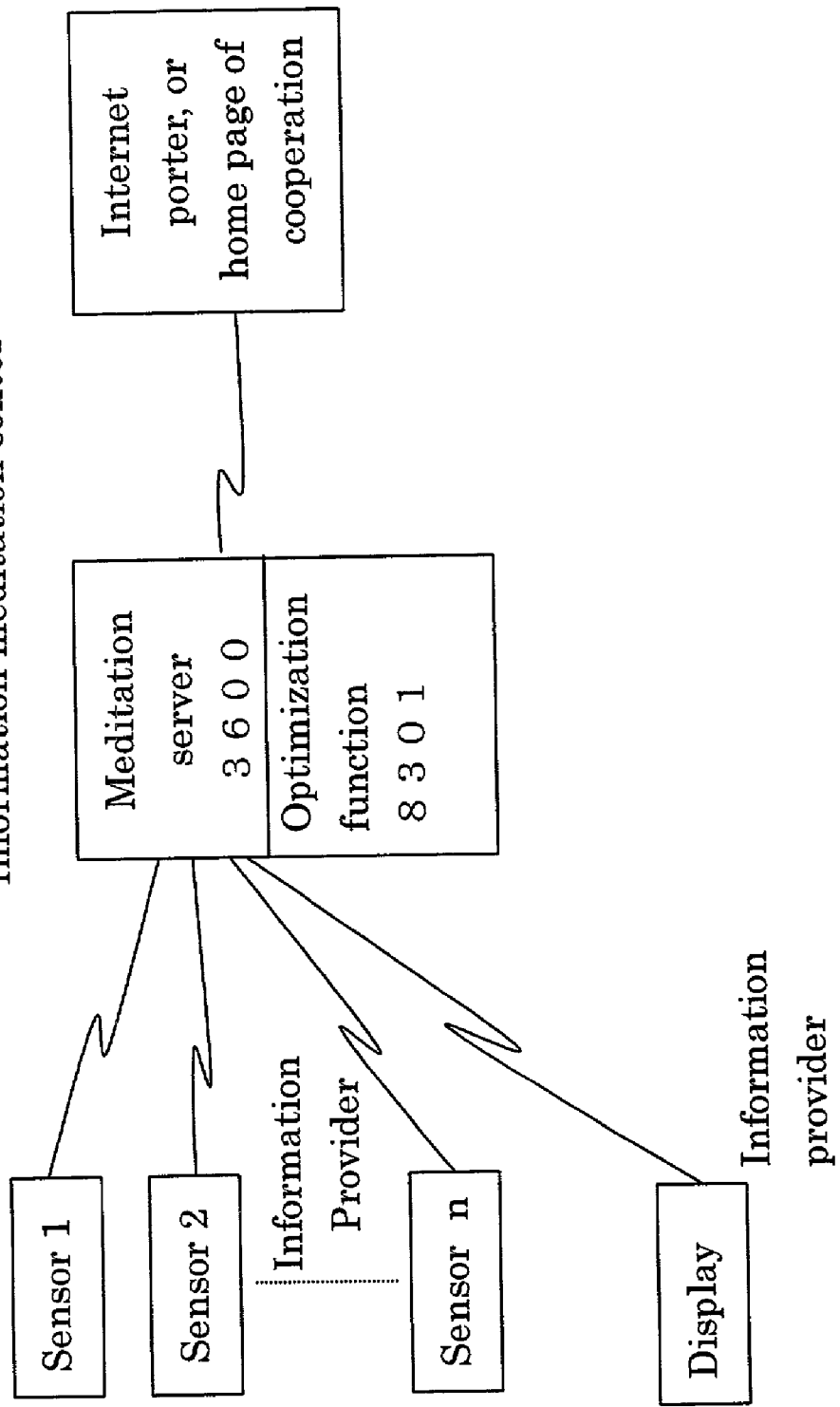
FIG. 84 is a block diagram for the external high level processing.

FIG. 83 and FIG. 84 are the block diagrams for the internal and external high level processing respectively. In this information meditating systems, sensor 1 through sensor n and a display device (for example, CRT) are connected to mediation server 3600. The direction of the information flow is reversed by changing the objective specification as mentioned above.

In the internal high level processing shown in FIG. 83, the mediation server 3600 receives a plurality of sensor outputs, for example, representing the state information within a factory. The server, then, can judge what is happening in the factory, and optimal information is obtained in optimal judging functional unit 8301 using the internal knowledge data base (DB 3604 in FIG. 36). The obtained optimal solution is displayed on the display unit for the information beneficiary. For the optimal solution, the different weights can be added to the output data from each sensor, and it can be expressed by If-Then still according to the optimization theory in the prior arts. The details of this theory are omitted. Self-learning functions can be added to the optimization theory in order for leveling up the mediating system.

ACTUAL EXAMPLE 5

In the external high level processing shown in FIG. 84, the mediation server 3600 receives a plurality of sensor outputs, for example, representing the state information within a factory. The server, then, can judge what is happening in the factory, and optimal information is obtained in optimal judging functional unit 8301 using the internal knowledge data base (DB 3604 in FIG. 36), and the external data base. The obtained optimal solution is displayed on the display unit for the information beneficiary. In this processing, the first judgment is obtained based on the internal knowledge data base, then the sever will access to the portal site and the home pages of the corporation specialized to the objective specification for the second judgment. This arrangement can make it possible to expand the closed information loop of the internal data base to the open information loop, and it will bring the more optimal information for the information beneficiary. The advantage of this external high level processing is that the sensors function as an information provider, and the mediating server expands the search area to the external data base through the external portal site, etc in order to obtain the optimal information which fulfills the objective specification. In such external high level processing, mediating server can have a business control to select the portal sites to be connected. Because many portal sites wish to be connected to the mediating server, the mediator may be able to charge a connection fee to the portal sites. This will create a new business chance for the information mediator.

The situation in which various services are provided based on information which conforms to an objective specification is equivalent to the generation of added value in FIG. 11. If high-end services are generated, this will result in higher fees being paid to the mediator's server. In the following section we shall discuss in detail how these fees are processed.

Fee Assessment

Figure 19:
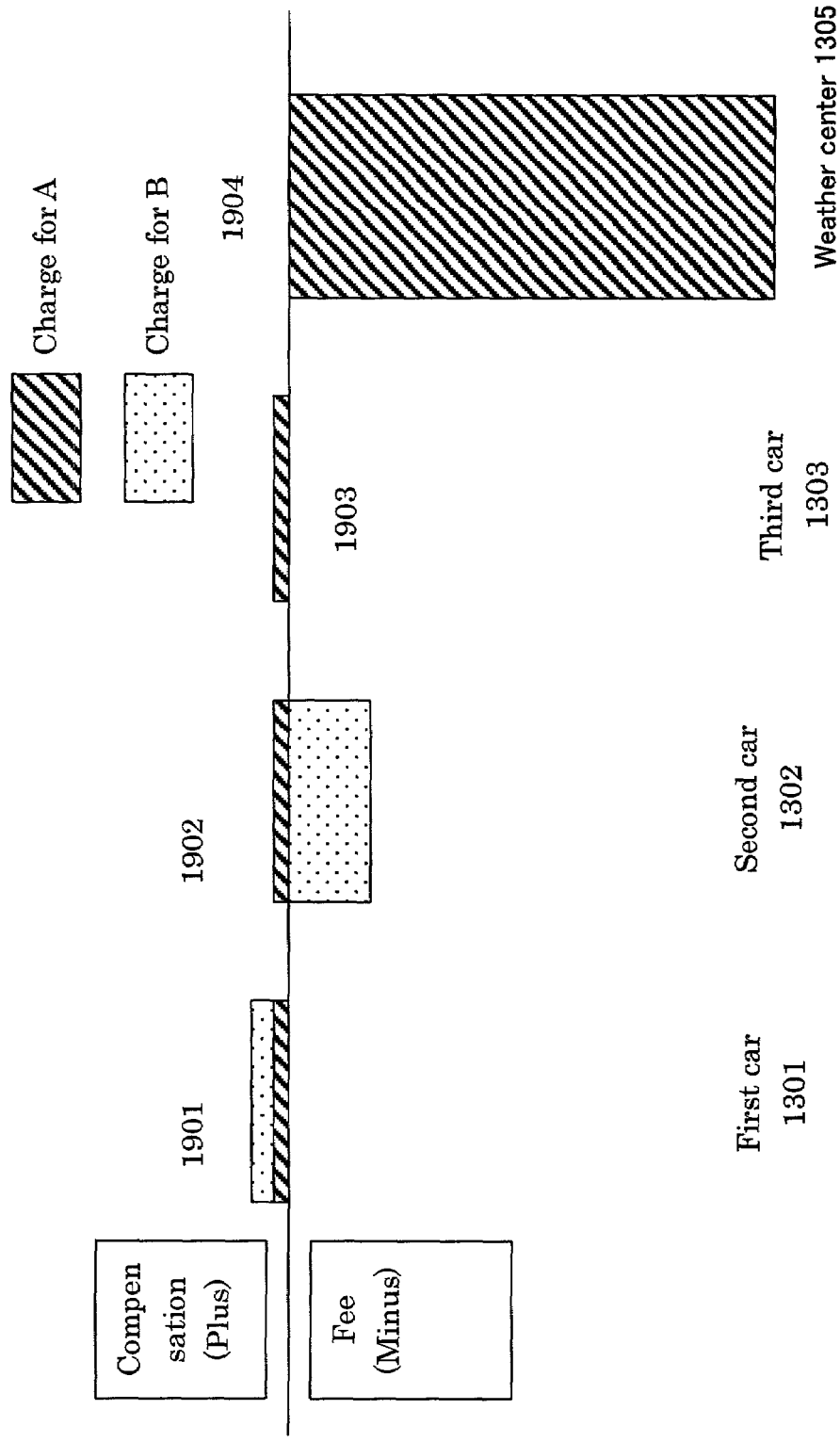
FIG. 19 is a block diagram giving an example of fees and compensation that might accrue in an information mediation system according to this invention.
Figure 20:
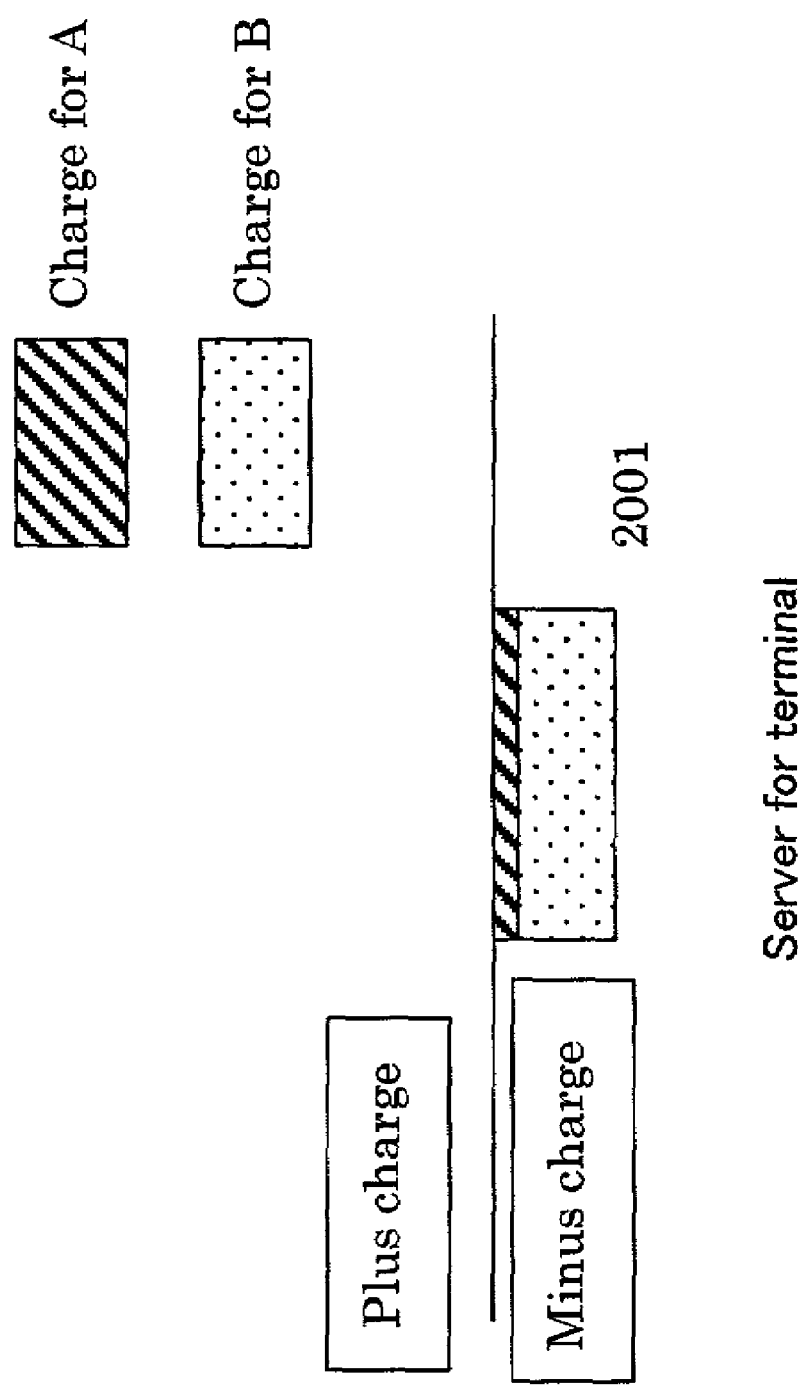
FIG. 20 is a block diagram giving an example of fees and compensation that might accrue in an information mediation system according to this invention.

We shall now explain in greater detail the distinguishing features of the charge or fee assessment performed by the information mediation system related to the aforesaid invention, with reference to FIGS. 19 and 20.

FIG. 19 is a block diagram giving an example of fees and compensation that might accrue in an information mediation system according to this invention. The graph shows the total charges for cars 1301, 1302 and 1303 and server 1305 for the weather information center in the aforesaid FIG. 13. Car 1301 is a provider with respect to both objective A and objective B. Since it contributed to fulfilling both objectives, it is credited with two payments 1901. These payments are the compensation for providers; they are referred to as "compensation" in FIG. 10. The "charge" is the fee assessed beneficiaries. It is referred to as a "fee" in FIG. 10.

In the same graph, car 1302 has earned a payment for providing the mediator's server with weather data but has incurred a fee with respect to objective B for obtaining data concerning the road conditions where car 1301 was then traveling. Its total charge is calculated as 1902. This charge is arrived at by offsetting the compensation against the fee. Car 1303 contributes only to fulfilling objective A, so it accrues a payment 1903. Server 1305 for the weather information center acts only as a beneficiary with respect to objective A, so it incurs a fee. These charges may also include the information mediator's fee, which would cover his expenses and profit margin.

FIG. 20 uses the same principle to graph the charges incurred by server 1605, which controls the devices in FIG. 16, the example with vending machines. The controlling server receives the benefits of being a double beneficiaries since it participates with respect to objectives C (service) and D (security). It therefore incurs two charges, which are totaled to arrive at fee 2001. We can see from the graph that different fees are assessed for the two objectives. In this example, the fact that "security" costs more than "service" is due to the beneficiary's different perceptions of their importance (because of urgency, the potential magnitude of the loss, etc.). To put it another way, the information that the vending machine has been shocked and is damaged is more valuable than the more usual information that it is out of change. The mediator therefore decides before entering into a contract with the beneficiary that he will have to pay more for it. In the example, the server which controls the machines charges a fee for the service; however, this fee may go toward the upkeep of the server. If at the same time this server incurs fees for services provided by other servers, it may end up being charged as a beneficiary.

The Scheme to Process Specifying the Objective

As was discussed above, in the information mediation system according to this invention, when the mediator specifies an objective its server vets and selects data from the data base contributed by all the providers. The actual means by which this selection is performed is described in detail in FIGS. 21 through 26. In a related process, the machine or device must also confirm the selection; this process will be discussed somewhat later with reference to FIGS. 27 through 31.

Figure 21:
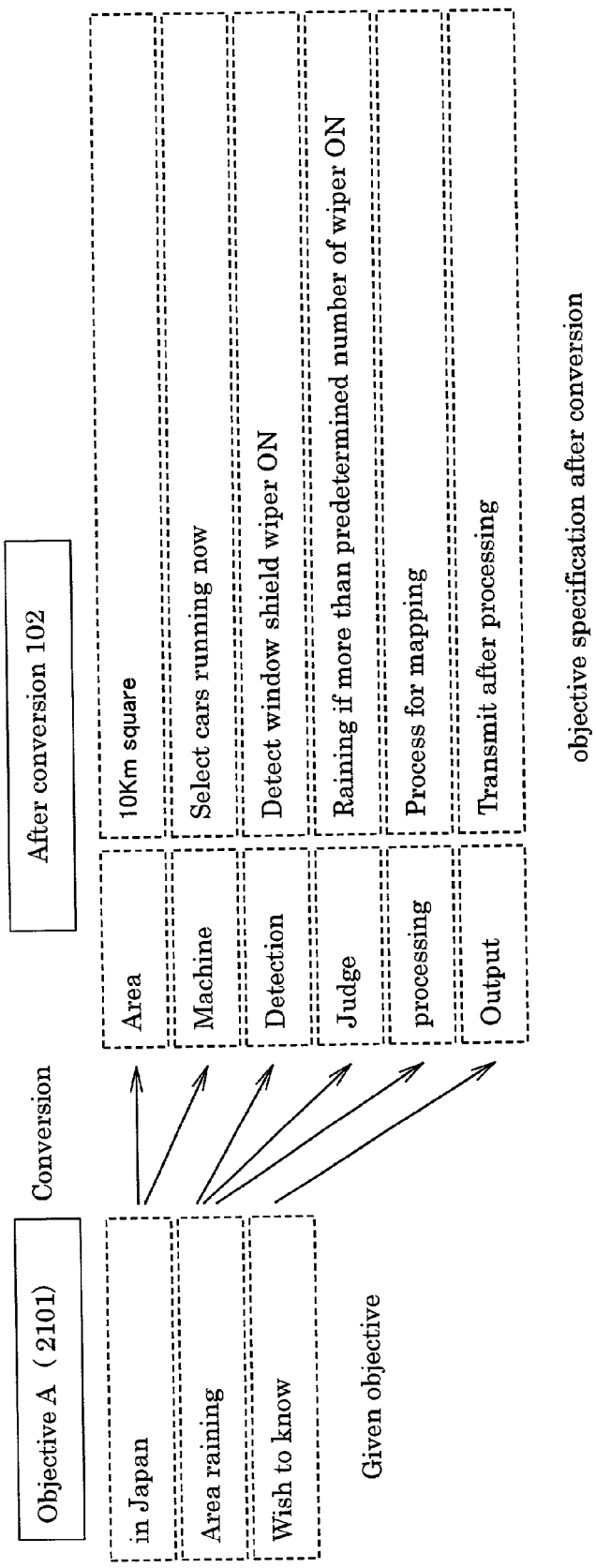
FIG. 21 is a block diagram which illustrates how the objective specification is processed in the information mediation system according to this invention.

FIG. 21 is a block diagram which illustrates how the language of the specification is processed in the information mediation system according to this invention using a data base of knowledge. We shall give a concrete example of "objective specification" (i.e., the specification of an objective to the mediator) using objective 0301, which was discussed in FIG. 3. Let us use objective A in FIG. 13 as a concrete example of objective 0301. Objective A consists of fulfilling the request to find out where it is raining right now in Japan.

In the diagram, the objective as specified is labeled "2101," and the objective which has been modified through the mediator's internal processing is labeled "2102." The modification consists of the specified objective being broken down, with the help of the knowledge data base, which will be discussed shortly, into conditions defining the location, the machines, the providers, how the determination is to be made, how the information is to be processed, and how the information is to be output. An example of the means by which these objectives might be realized is given in FIG. 22.

Figure 22:
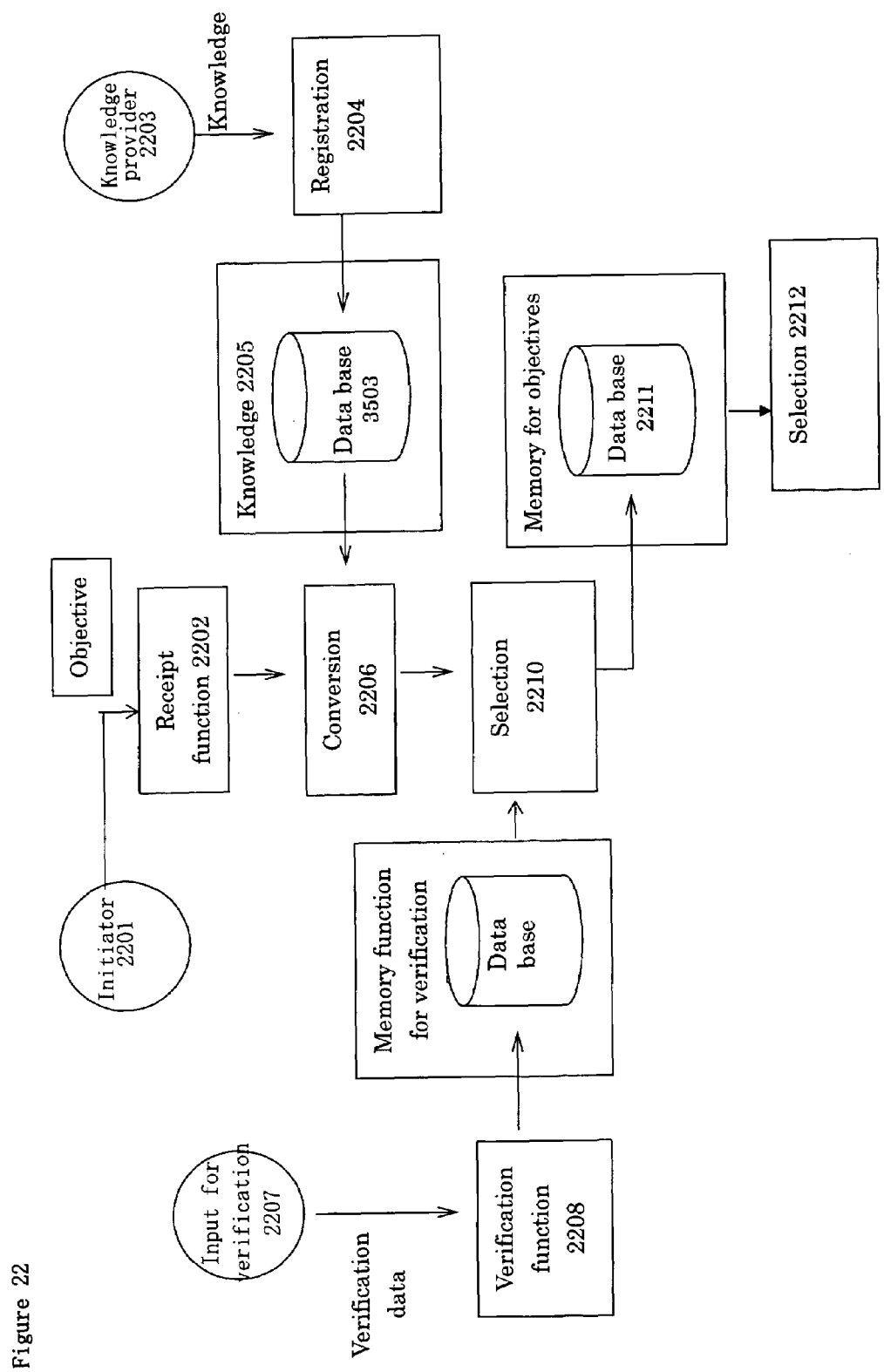
FIG. 22 is a block diagram of functions which represent the means by which the objective specification is broken down.

FIG. 22 is a block diagram of functions which represent the means by which the objective specified in the aforesaid FIG. 21 is broken down into a series of objectives for the mediator's convenience. This diagram represents a portion of the functions executed by the mediator's server 0302 according to this invention which is shown in FIG. 3.

Initiator 2201 is the party who gives the mediator, or more specifically, the mediator's server, an objective. The initiator may be either a device or a person. In some cases, the fee for the service may be charged not to the beneficiary, but to the initiator. The initiator and beneficiary may be the same person or device, or they may be different persons or devices. For example, a car maker may, as the initiator, wish to find out when a car made by them is broken down on a given highway; but the beneficiary may be a local towing business. Of course, the initiator and beneficiary may be the same person. For example, as is shown in FIG. 13, the driver of car 1302 in zone 2 on the highway may specify the objective of finding out what the weather is like ahead of him in zone. He is then both the initiator and the beneficiary.

Reception function 2202 consists of receiving the objective from initiator 2201. If the objective is to be received through a network, the system should have the capability to receive signals. Knowledge recorder 2203 is the party which stores the knowledge data necessary, for example, to modify the specified objective shown in FIG. 21 for the mediator's use. 2203 may be either a device or a person who provides knowledge data to the mediator. Knowledge processing function 2204 consists of storing the knowledge data provided by knowledge recorder 2203 in the knowledge data base. This function also entails determining whether a given item should or should not be stored.

Knowledge storing function 2205 consists of storing the knowledge data which recording function 2204 judged to be necessary. Objective modification function 2206 consists of processing the specified objective, using the knowledge stored in data base 2205, to create the modified objective. More specifically, it entails creating the conditions shown in FIG. 21.

Party 2207, the person or device that inputs the verification, inputs data that will allow the mediator to confirm that the connection is legal, which it needs to do even though the machine or device is connected to it through a network. The verification may be transmitted to the mediator by either a machine or a person. The verification function will be discussed in detail in a later section. Verification function 2208 consists of confirming that the connection is legal based on the verification data transmitted by party 2207. By "verification" is meant checking to make sure that the conditions are met which permit the mediator and the machine or device to be connected to each other through the network. This verification is necessary to insure that only those terminals which have permission are allowed to connect to the information mediation system according to this invention. Such terminals will be either providers or beneficiaries in the system.

Data storage function 2209 consists of storing the data confirming the identity of the machine or device which were processed by verification function 2208. Extraction function 2210 consists of extracting (as shown in FIG. 2) the machines or devices stored in data base 2209 of confirmed devices which are best suited to be providers and beneficiaries with respect to the objective modified by function 2206. Data storage function 2211 consists of storing the providers and beneficiaries extracted by function 2210 along with the objective modified by the modification function.

FIGS. 23 through 26 are block diagrams giving a specific example of how a specified objective is modified. These figures show the specification of objective B in FIG. 13. As was discussed earlier, "objective specification" refers to providing an objective to the mediator. The specified objective is broken down into a number of conditions, and the data transmitted by providers is matched against each one. Each condition is a unit of data stored in the objective data base by data storage function 2211. The conditions could also be considered the individual criteria by which information is judged. Let us say, for example, that the speed at which cars are traveling on a given highway is the information coming from the providers. The data provided in FIG. 23, then, are the speeds of the cars. These data are used to calculate the average speed. When the specified objective is modified, it is broken down into criteria which can be matched against data associated with the average speed.

The direction the beneficiary (a car) is going, which must be detected as the pre-processing condition, can be calculated from the point the car has moved to after a given period of time; however, if the car is parked the beneficiary can be asked directly to furnish the information (by transmitting the question, "Where do you want to go?"). In the example in FIG. 23, the specified objective, "I want to find out right now if the traffic is backed up in the direction I'm going," is divided into three parts: "I want to find out right now," "if the traffic is backed up," and "in the direction I'm going." These parts are broken down into a preprocessing condition, a location condition, a machine condition, a condition for the information to be provided, a condition for evaluation, and an output condition, all of which are stored as units in the data base for function 2205 in FIG. 22 and sent to selection function 2212 for the next stage of processing.

Figure 24:
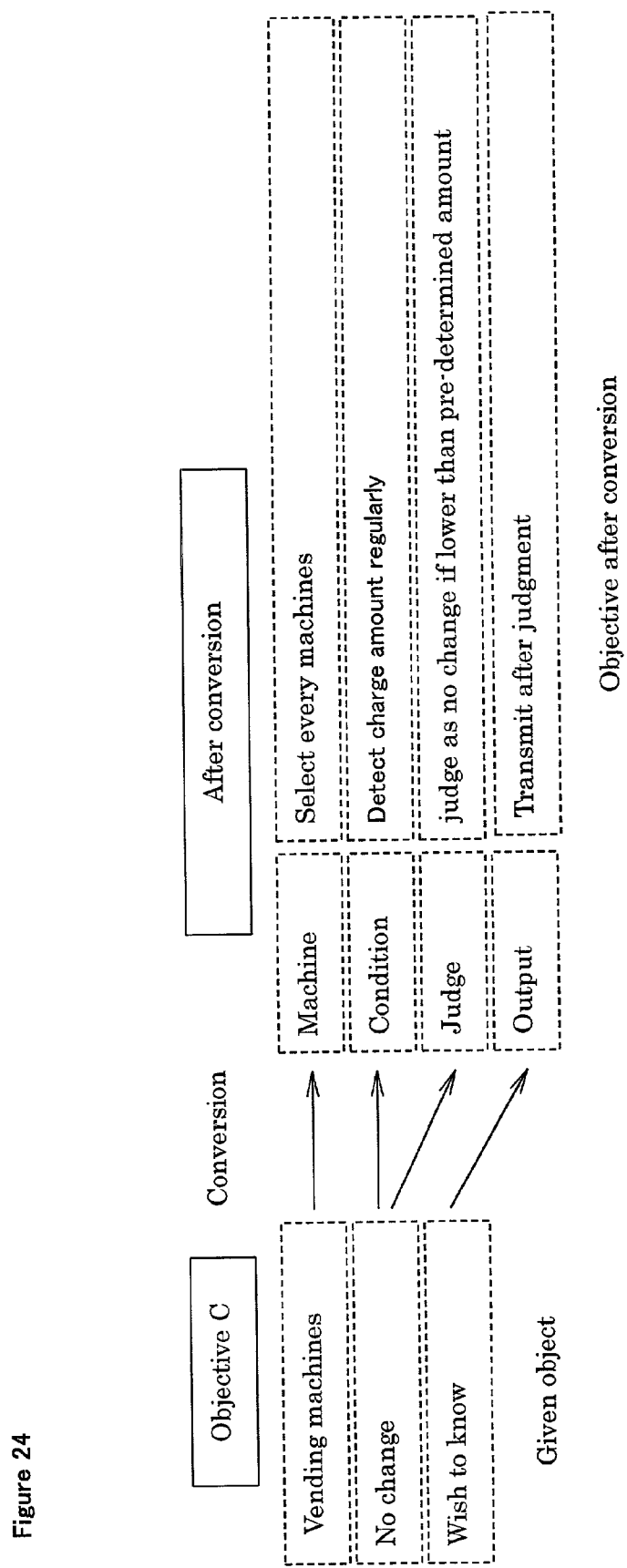
FIG. 24 is a block diagram which illustrates how the objective specification is processed in the information mediation system according to this invention.

FIG. 24 is a block diagram giving as a specific example the specification of objective C in FIG. 16. The specified objective here is to find out when the vending machine under the beneficiary's control is out of change.

Figure 25:
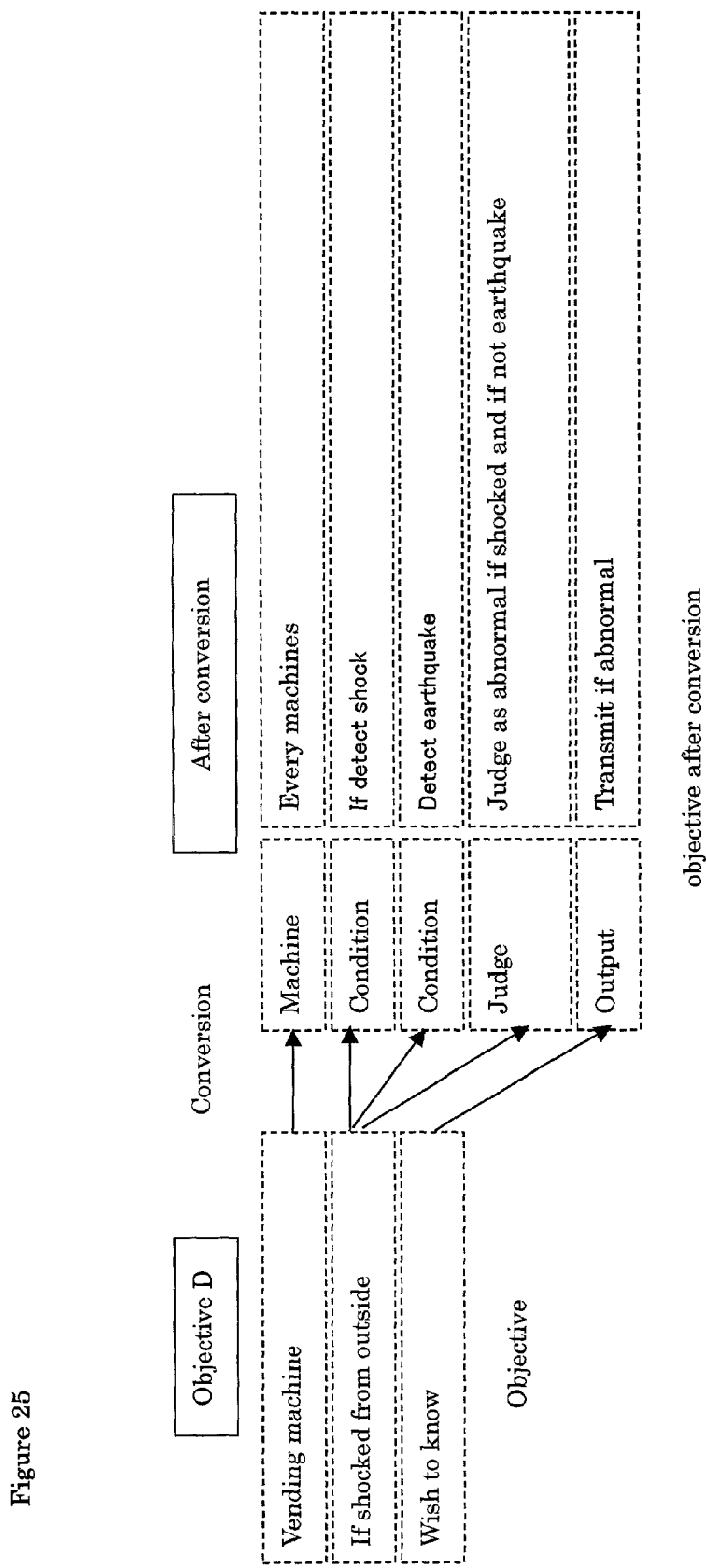
FIG. 25 is a block diagram which illustrates how the objective specification is processed in the information mediation system according to this invention.

By the same token, FIG. 25 is a block diagram giving as a specific example the specification of objective D in FIG. 16. The specified objective here is to find out when the vending machine under the beneficiary's control has received an unusual shock from the exterior. In this case, the vending machine is monitored for vibration and shock by being accessed by the provider's server; however, if the machine's vibration and shock sensors are event sensors (see FIG. 3), the mediator can stand by until it receives data from the sensors.

Figure 26:
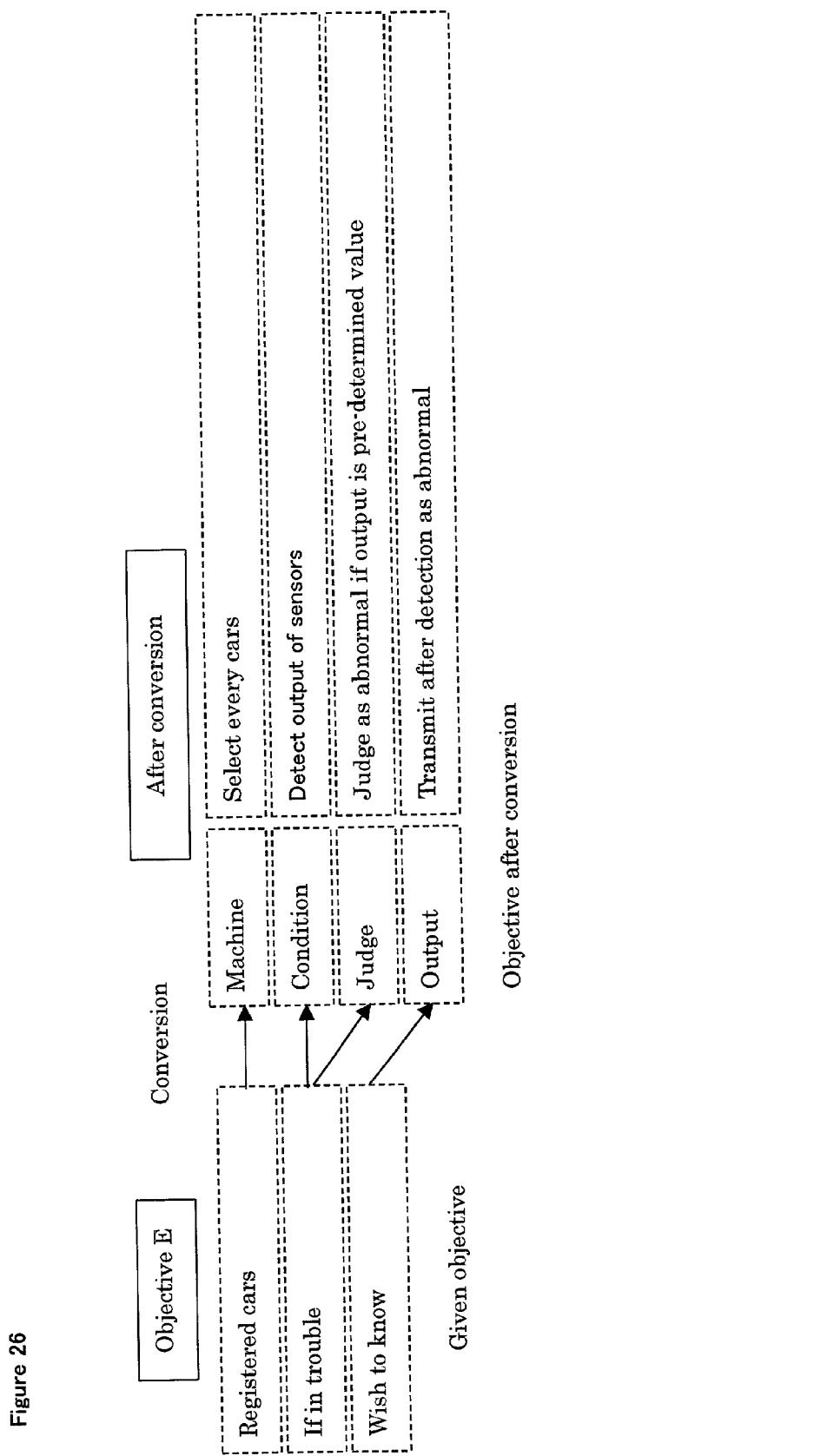
FIG. 26 is a block diagram which illustrates how the objective specification is processed in the information mediation system according to this invention.

FIG. 26 is a block diagram giving as an example the specification of objective E in FIG. 17. The specified objective here is to find out when participating cars have trouble (accidents or breakdowns). The process by which the mediator's server modifies the aforesaid specified objective which it receives has been disclosed by the concerned applicants in U.S. Pat. No. 3,151,951 and Patent Disclosure 7-160,514.

Confirming the Machine's Identity

Figure 27:
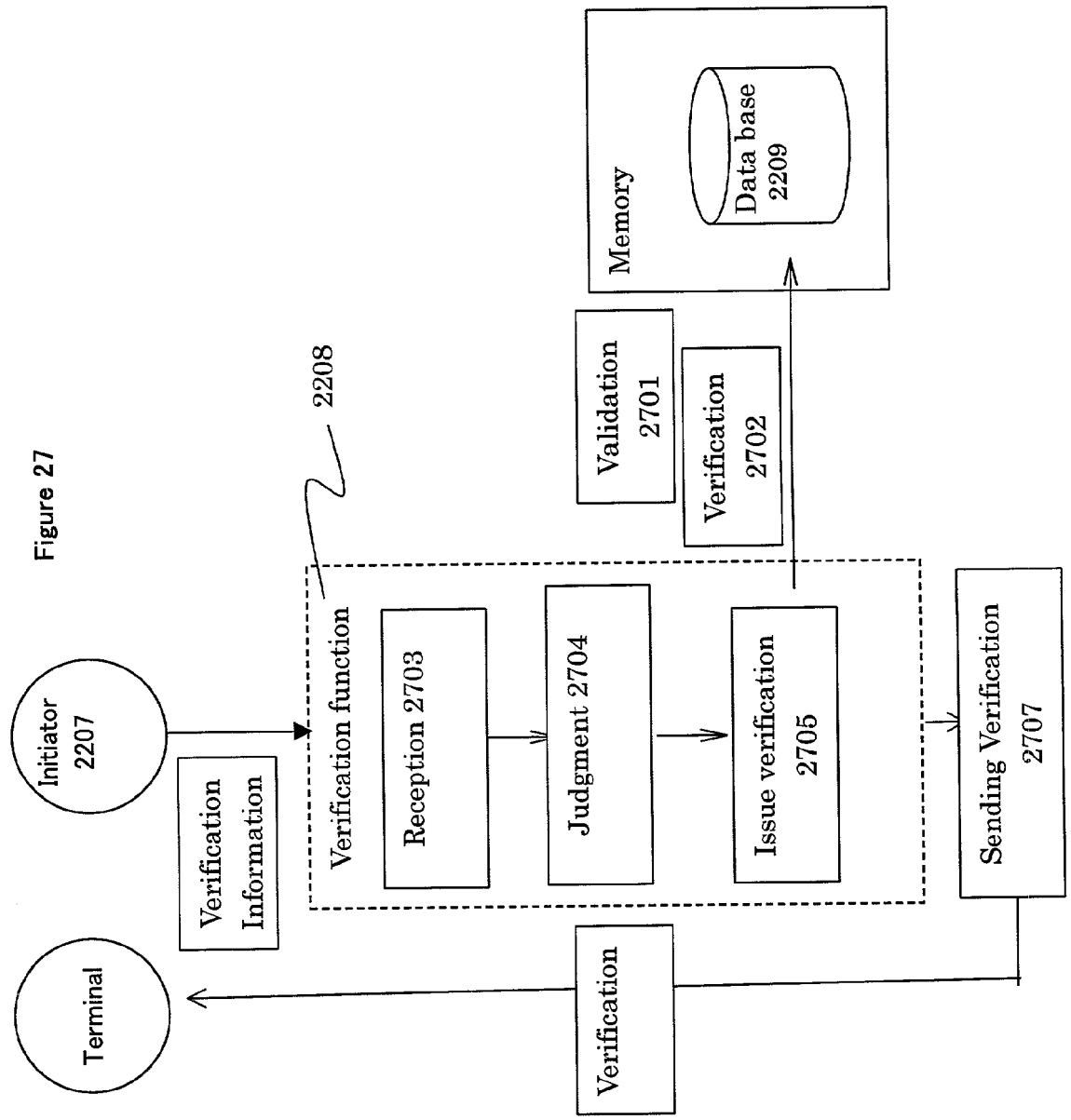
FIG. 27 is a block diagram illustrating the machine verification process.

FIG. 27 is a block diagram illustrating the machine verification process. This diagram represents a portion of the functions executed by the mediator's server 0302 according to this invention which is shown in FIG. 3. In the information mediation system according to this invention, the machine or device with a communication function actually exchanges data with the mediator via a network. As was already discussed in FIG. 22, identity verification entails recording the identity of the machine or device in a register in the mediator's server before the contract is in force. Identity verification allows the mediator to know whether a machine is a participant and prevents unauthorized machines from hacking the system. Identity verification, then, is executed as preprocessing (setup) before data can be exchanged with the mediator. In other words, the mediator issues validation (data) 2701 to the machine or device to which it is connected via a network before the contract is in effect. Based on these validation data, it can recognize which machine or device is communicating with it in the future. Validation data 2701 may consist of a recognition code, a string in machine code used to recognize a machine or device, or they may be a cryptographic key or some other encrypted code.

The various functions associated with the identity verification in this diagram may be executed separately by an identity check system such as an identity verification bureau (a server dedicated to verifying identity) which is independent of the mediator.

In FIG. 27, the verification data 2702 input by party 2207 are sent to verification function 2208 of the information mediation system. (See 2208 in FIG. 22.) To be more specific, verification function 2208 consists of function 2703, accepting the verification data; function 2704, determining whether the machine or device is a participant; and function 2705, issuing a validation.

Function 2704 consists of checking the machine's attributes based on the verification data 2702 that were received in function 2703. These attributes include what sort of machine or device this is, where it is (in the real world) if it is stationary, and what sort of information it can provide. If the data meet a given standard, a validation can be issued. (Actually, verification data 2702 are sent to validation function 2705.)

Validation function 2705 assigns (or issues) validation data 2701 to the validation data 2702 that it receives from evaluation function 2704. The original validation data, together with the data validating them, are sent to data storage function 2209 (see FIG. 22) to be stored in the data base. In order that validation data 2701 can be sent to the address of the machine or device which is contained within them, they are sent to forwarding function 2707. Validation data 2701, as was explained earlier, serve to enter the machine's name in a register. Once entered, they enable the machine to exchange data with the mediator.

Figure 28:
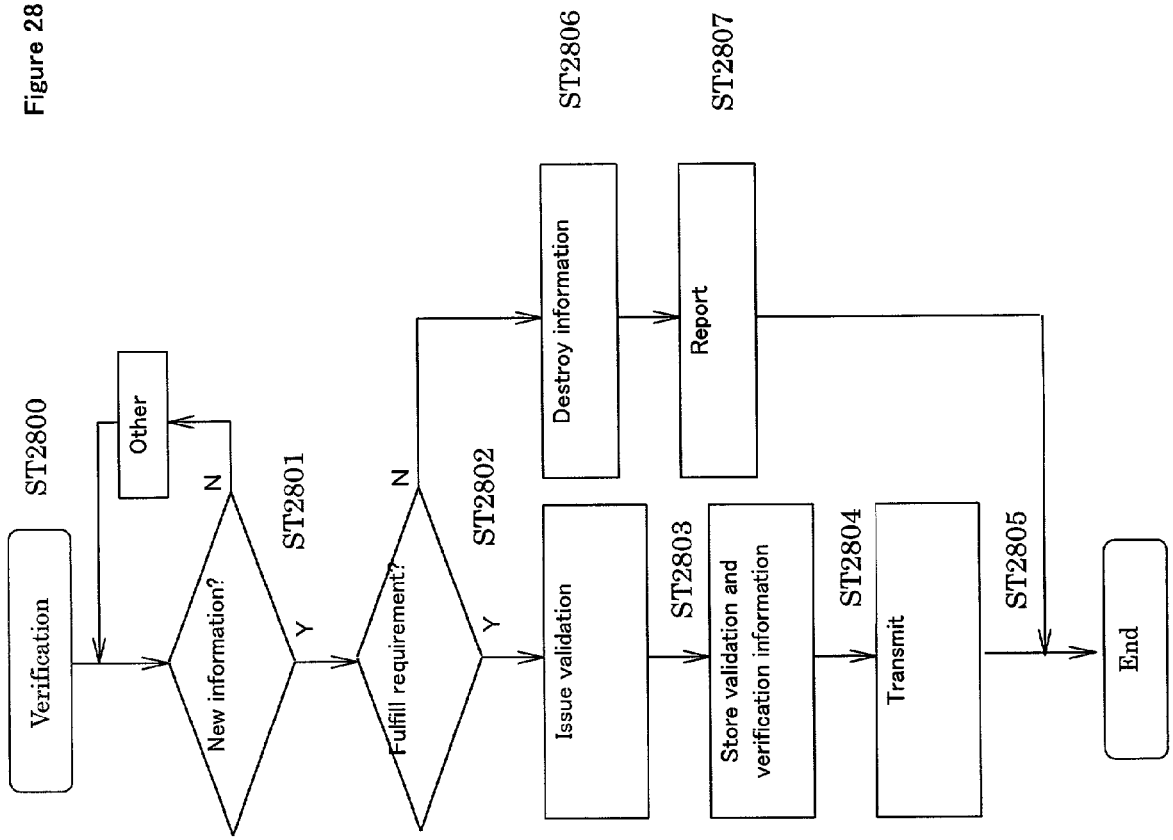
FIG. 28 is a block diagram illustrating the processing executed to confirm the identity of the machine.

FIG. 28 is a block diagram illustrating the processing 2800 executed to confirm the identity of the machine. This diagram corresponds to the block diagram in FIG. 27. In Step 2801, the mediator checks to see whether there are verification data 2702 from a new machine or device. In Step 2802, it checks whether the verification data it has received meet previously specified criteria. The "previously specified criteria" for the verification data are those data which the mediator needs to extract specific machines and devices as providers and beneficiaries according to the objective which has been specified. In other words, previously specified criteria are data used to prevent the input of unlawful or defective data. Validation data will not be issued for machines or devices which have a defect in their criteria. As a result, in Steps 2806 and 2807 the mediator sends the reply "Validation data not issued" to the person who input the verification data which it received.

If the criteria are met and the validation data can be issued, in Step 2803 the mediator issues validation data to the machine or device for which verification data 2702 were submitted. In Step 2804, the validation data 2701 that were issued are stored in the memory unit along with the verification data 2702 that the mediator received. In Step 2805, the validation data that were issued are sent to the address of the machine or device contained in those data, thus completing the verification processing. The machine or device which receives validation data 2701, i.e., the beneficiary or provider of information in the information mediation system related to this invention, can thereafter use data contained in the validation to exchange data with the mediator through the network.

Figure 29:
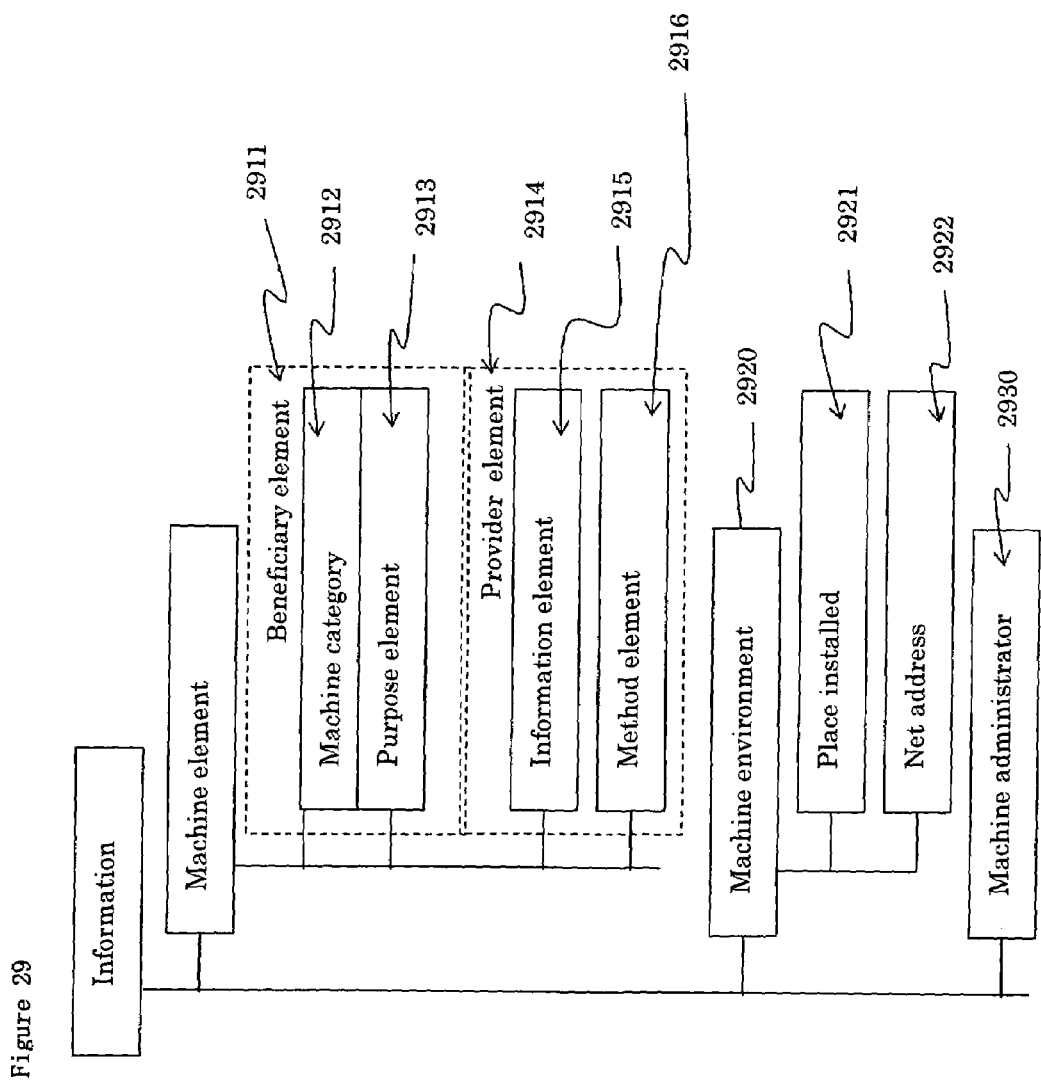
FIG. 29 gives an example of the verification data.

FIG. 29 gives an example of the content of the verification data 2702 shown in FIG. 27. Verification data, as was explained above, are registration or ID data used to determine whether a given terminal that attempts to be a beneficiary or provider is qualified to be legitimately connected to the information mediation system related to this invention. The verification data can be divided into three classes: data 2910 concerning the machine; data 2920 concerning the machine's environment; and data 2930 concerning the machine's controller (or beneficiary). Of course verification data need not be limited to these attributes only. Any data may be selected as long as they are appropriate for that information mediation system.

Data 2910 concern the characteristics of the machine or device. They can be divided into two types: beneficiary data 2911, which are needed when the machine is a beneficiary, and provider data 2914, which are needed when the machine is a provider. Beneficiary data 2911 may include category data 2912, which specify what kind of machine this is and what its attributes are; and purpose data 2913, which specify what the purpose of the machine is (i.e., what the machine is for). Provider data 2914 include potential information data 2915, which indicate what sort of information this machine can provide; and method of provision data 2916, which specify how the machine will provide these data. "Method of provision" refers to the three methods shown in FIG. 3: monitored, independent and event.

Environment data 2920 are data concerning the environment of the machine or device. They include location data 2921, which indicate where (in the real world) the machine or device is physically installed; and net address data 2922, which give the machine's net address. The location data are the data that the service and security agencies in FIG. 18 would actually need in order to find the machine or device. These data are unnecessary if the machine or device is movable. After a movable machine's identity has been verified (and the validation data stored in the data base), its current location can be written in and used. The net address is needed for the mediator to be able to exchange data with the machine via the network. Controller (beneficiary) data 2930 are needed for billing purposes. They indicate who is to be charged for the service in FIG. 10. Alternatively, these data may indicate the machine or device which is verified.

Figure 30:
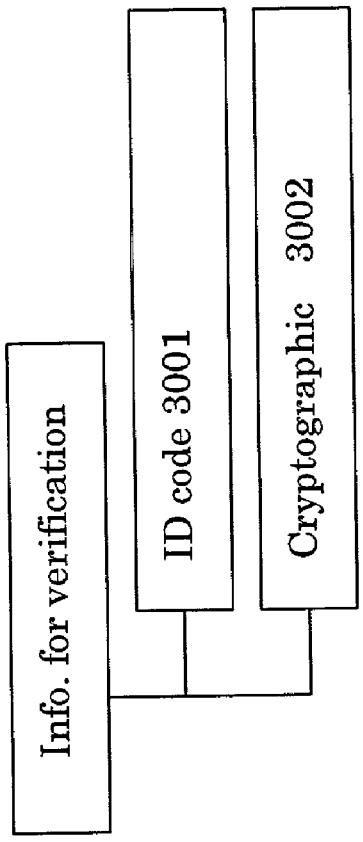
FIG. 30 gives an example of the verification data.

FIG. 30 gives an example of the verification data 2701 in FIG. 27. Data 2701 consist of recognition code (machine code) 3001, which is assigned for the convenience of the mediator in controlling the machine or device; and cryptographic key data 3002, which are stored as a set with the recognition code and used to confirm, at the time data are transferred, that this is without doubt the same machine or device whose identity was verified. The validation data are needed whenever the machine or device connects to the mediator through the network. Any message which that machine or device transmits will necessarily contain these validation data so that it can prove it is a provider or beneficiary.

Figure 31:
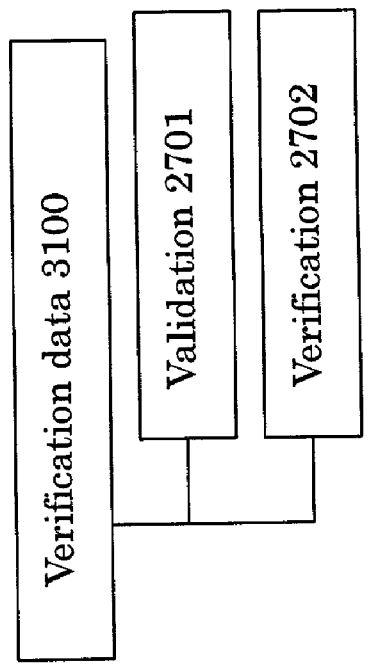
FIG. 31 shows a sample configuration for the verification data.
Figure 32:
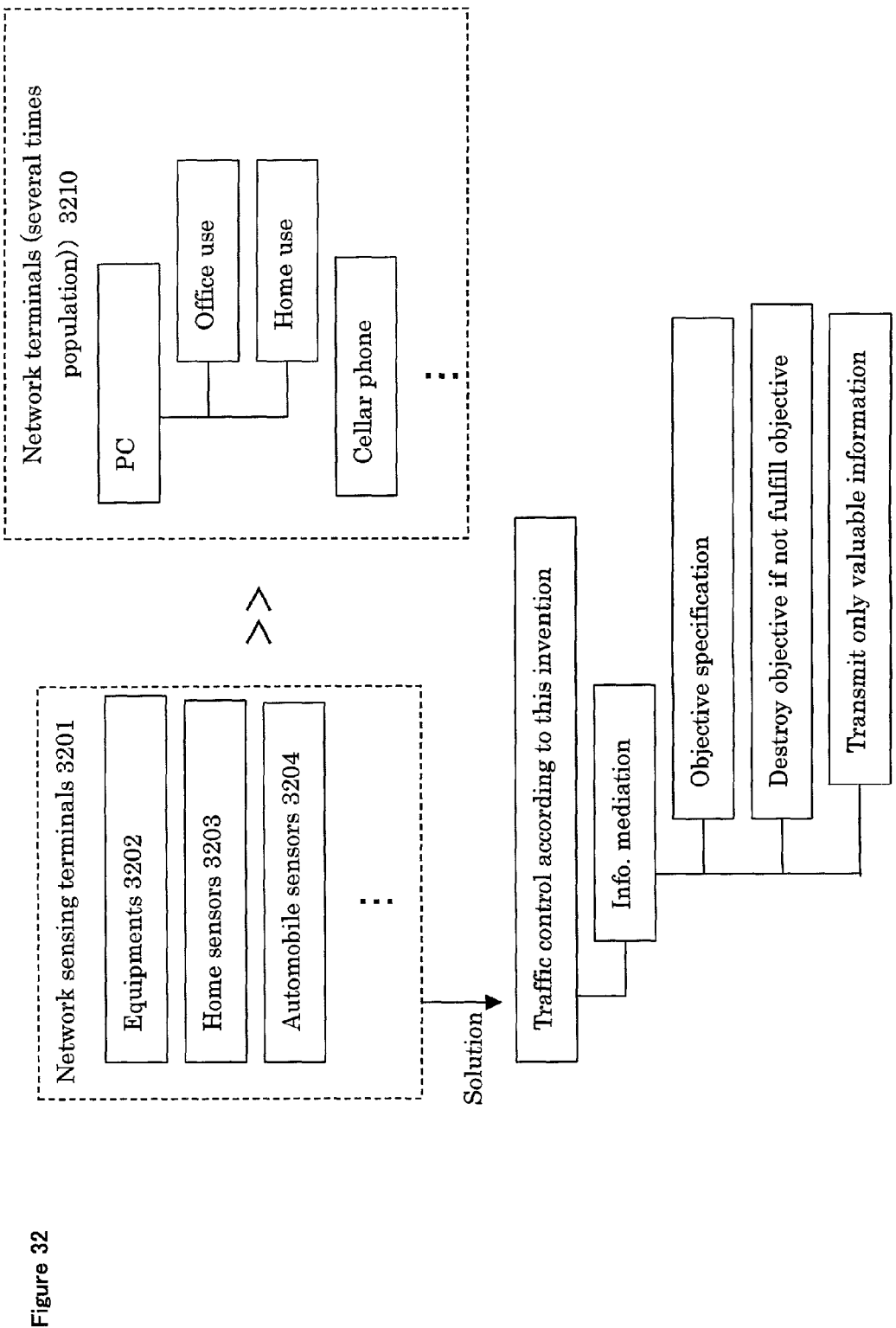
FIG. 32 illustrates problems that will occur in the future as more and more information terminals are connected to a network.

FIG. 31 shows a sample configuration for the verification data 3100 stored in the data base for function 2706 in the verification process shown in FIG. 27. Verification data 3100 consist of the validation data 2701 in FIG. 27, which were discussed earlier, and verification data 2702. These two types of data are combined and stored as a data set for each machine or device. As was discussed earlier, any data which a machine or device transmits to the server for the information mediation system according to this invention must contain validation data 3000 (sic; in the diagram it's 3100). Using these data as a basis, the mediator can obtain verification data which describe detailed characteristics of the information the machine provides. The mediator can then refer to these characteristics to make use of the information which the machine transmits.

Embodiments

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

Figure 33:
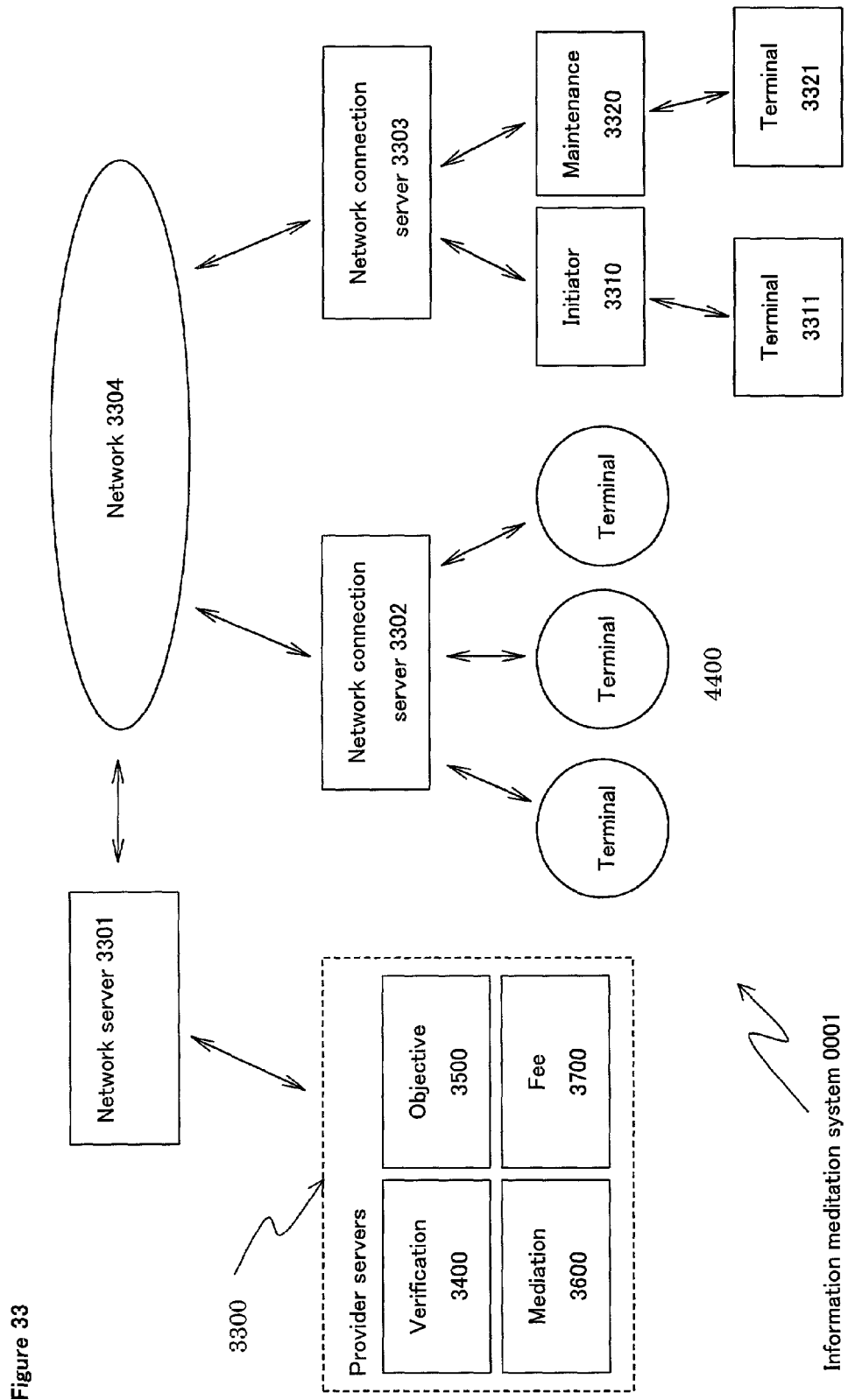
FIG. 33 is a comprehensive diagram of the aforesaid information mediation system related to this invention.

FIG. 33 is a comprehensive diagram of the aforesaid information mediation system 0001 related to this invention. It is a block diagram illustrating one example of the actual means by which such a system might be realized. What follows is a preferred embodiment of the concept of this invention which we have been discussing. In this information mediation system, server group 3300, which constitutes the mediator, and multiple machines and devices 4400 are connected to information network 3304 through servers 3301 and 3302. Server group 3300, which constitutes the mediator, corresponds to mediator's server 0101 in FIGS. 1 through 3 and the actual mediator's server 1304 in FIGS. 13 through 18. To activate information mediation system 0001, in addition to the mediator and the machines, activator's server 3310 and activator's terminal 3311 must also be connected through server 3303. Similarly, controlling server 3320 and the controller's terminal 3321, which accept the output of the information mediation system, must also be connected through server 3303.

Server group 3300, which constitutes the information mediator, is the nucleus which operates the information mediation system. It is in effect the information mediation center. The various machines and devices 4400 are all equipped with sensors that are capable of transmitting signals. These machines and devices are the providers who send their sensing data to the aforesaid information center. They may also be beneficiaries who receive data from the information center. Initiator's server 3310 is the terminal someone uses to input into the information mediation system what is to be done (i.e., to input an objective specification). Usually this server is operated when the system starts up. The service agency's server is a terminal to which data are output from the information mediation system when the service agency needs to take some specific action.

Server Group

Server group 3300 shown in FIG. 33, which constitute the information mediator, in this example consists of verification server 3400, objective specification server 3500, information mediation server 3600 and fee mediation server 3700. The servers in server group 3300 are connected to each other via some sort of network (not pictured). If desired, a control (information mediation) server may be added to supervise the servers in the group. If the information mediation server has too much to do, its responsibilities may be divided among a number of servers, each of which is in charge of the machines or devices in one area.

Server group 3300, which constitutes the aforesaid information mediator, will be discussed in detail in the following section, with reference to FIGS. 34 through 43. Servers 3400 through 3700 will be discussed in detail with reference to FIGS. 44 through 52.

The Server Group

Figure 34:
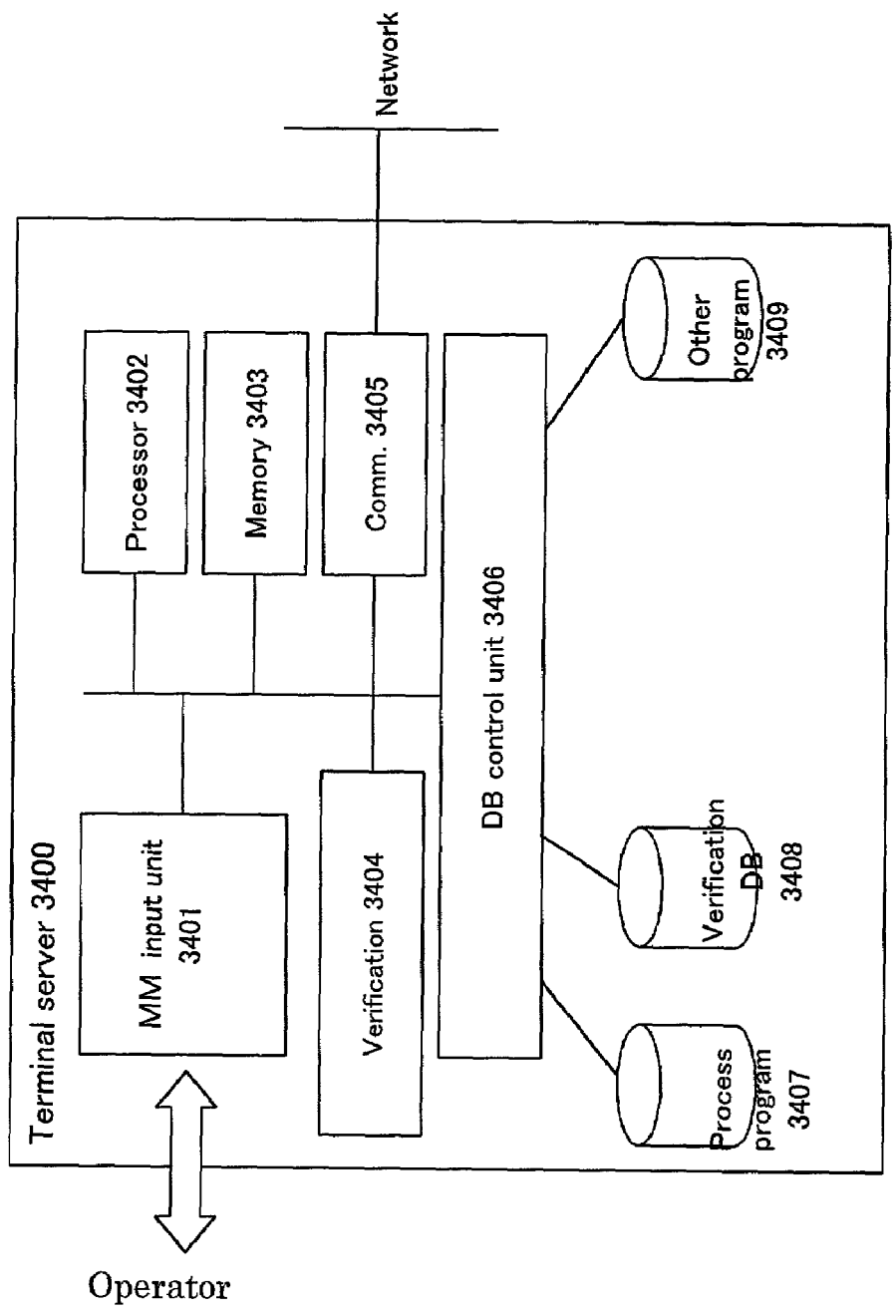
FIG. 34 is a block diagram of the hardware in verification server.

FIG. 34 is a block diagram of the hardware in verification server 3400, one of the servers in server group 3300, which constitutes the information mediator in the information mediation system 0001 related to this invention. Verification server 3400 has the function of verifying the identity of the machine or device which is connected to the mediator through the network and issuing a validation to the device whose identity it has verified. It corresponds to the block diagram in FIG. 27 to illustrate the process of verifying the machine's identity. When this server connects a machine or device to the information mediation system, it issues a validation to certify that that machine or device is a terminal which has a legal right to be connected. This protects the information mediation system from being accessed illegally. In the following section, we shall explain the structural elements of each of the other servers and then walk through a flowchart to show how each server processes information.

The Configuration of the Hardware

In the same diagram, MM (man-machine) input-output unit 3401 has the function of inputting and outputting various data vis-à-vis the operator of the server. The input device may be a keyboard, a ten-key array, a mouse or a bar code reader. The operator may be any person or device which transmits data to the server's system. The output device may consist of a display and a printer or any other device capable of transmitting data from the system to the operator.

Operation unit 3402 has the function of performing all necessary operations to drive and process the various functions (by executing a program). It generally consists of a CPU (central processing unit). Memory unit 3403 contains memory areas (RAMs or ROMs) which the operation unit needs to execute its program. Network verification unit 3404 verifies the identity of the machine or device which transmitted data through the network. Communication unit 3405 has the function of controlling communication with the exterior via the network. DB control unit 3406 has the function of controlling data configuration and the actual data. Processing programs 3407 are the programs needed to achieve the objective of use (including exchanges with other servers) as defined by the verification server. These would include the OS (operation system). Verification DB (data base) 3408 is the data base in which are stored the verification data for machines and devices which are used by other servers. Other program data 3409 include application software such as the operator's word processing or calculation display programs and data incidental to these.

Figure 35:
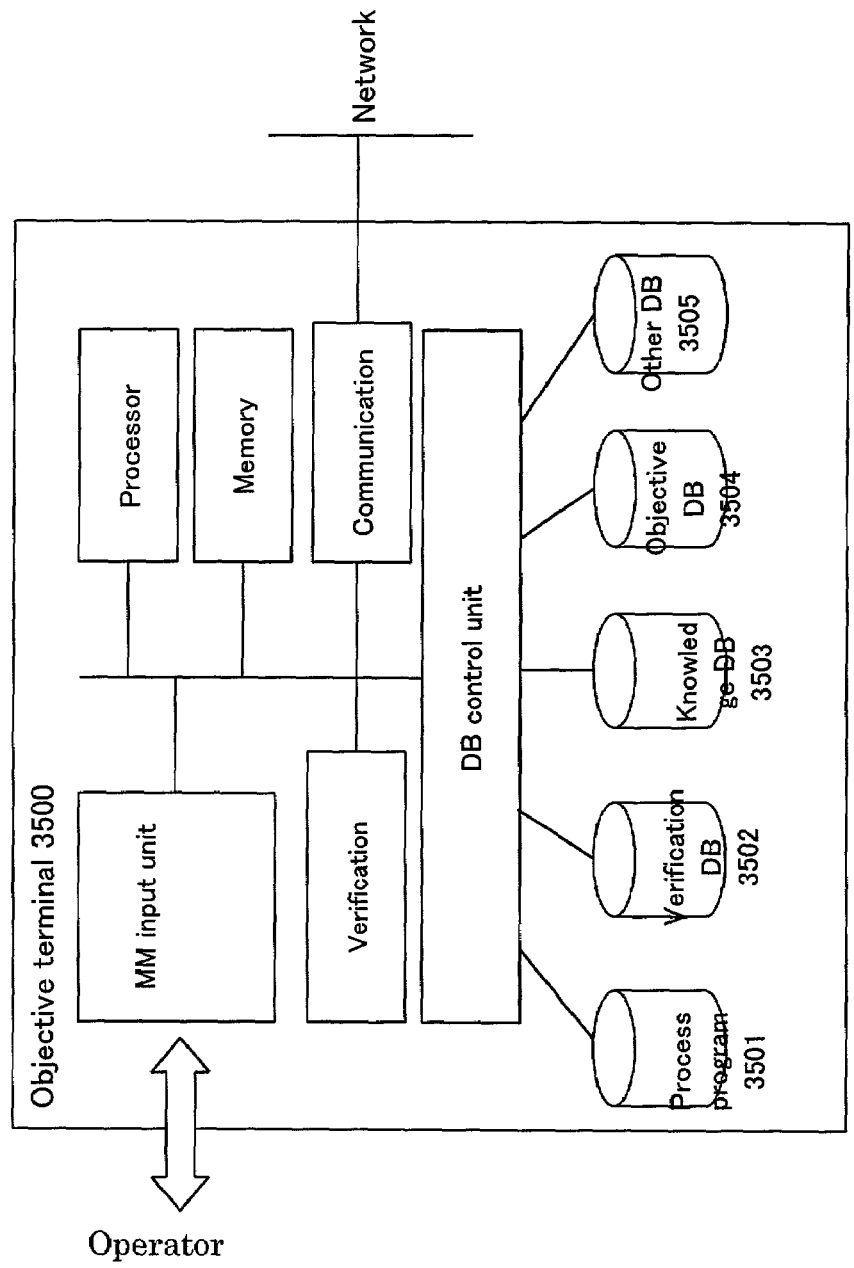
FIG. 35 is a block diagram of the hardware in the objective specification server.

FIG. 35 is a block diagram of the hardware in the objective specification server in server group 3300, which constitutes the information mediator in the information mediation system 0001 related to this invention. Objective specification server 3500 has the function of conveying the objective it receives from the initiator to the mediator. It corresponds to the block diagram of the means to realize objective specification in FIG. 22. Since the MM (man-machine) input-output unit, the operation unit, the memory unit, the network verification unit, the communication unit and the DB control unit have the same functions as the corresponding parts in verification server 3400, shown in the aforesaid FIG. 34, we will not discuss them further at this point.

Processing programs 3501 are the programs needed to achieve the objective of use (including exchanges with other servers) as defined by the objective specification server. These would include the OS (operation system). Verification DB (data base) 3502 is -the data base in which are stored data associated with the machines and devices extracted by the extraction function. Knowledge data base 3503 is the data base in which are stored data which the modification function uses to modify the objective. Objective DB 3504 is the data base in which are stored objective data used by the mediator's server. Other program data 3504 include application software such as the operator's word processing or calculation display programs and data incidental to these.

Figure 36:
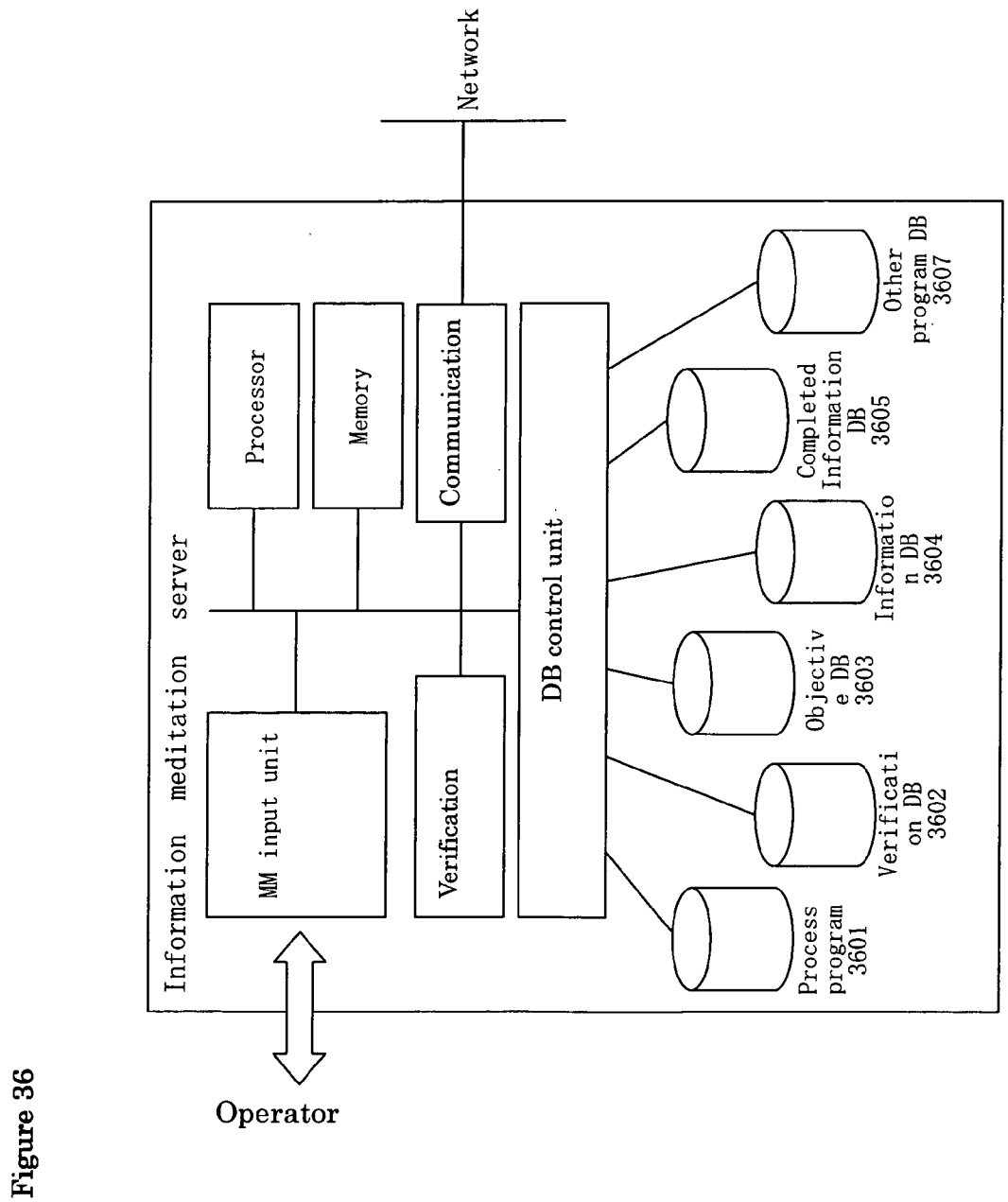
FIG. 36 is a block diagram of the hardware in mediation server.

FIG. 36 is a block diagram of the hardware in mediation server 3600 in server group 3300, which constitutes the information mediator in the information mediation system 0001 related to this invention. The mediation server has the function of deciding according to the objective which of the machines and devices connected to the network will serve as providers and beneficiaries, and sending the beneficiaries only information which conforms to the objective. It corresponds to the block diagram of the information mediation function in FIG. 9. Since the MM (man-machine) input-output unit, the operation unit, the memory unit, the network verification unit, the communication unit and the DB control unit have the same functions as the corresponding parts in verification server 3400, shown in the aforesaid FIG. 34, we will not discuss them further at this point.

Processing programs 3601 are the programs needed to achieve the objective of use (including exchanges with other servers) as defined by the objective specification server. These would include the OS (operation system). Verification DB (data base) 3502 is the data base in which are stored data associated with the machines and devices extracted by the extraction function. Knowledge data base 3503 is the data base in which are stored data which the modification function uses to modify the objective. Objective DB 3504 is the data base in which are stored objective data used by the mediator's server. Other program data 3504 include application software such as the operator's word processing or calculation display programs and data incidental to these.

Figure 37:
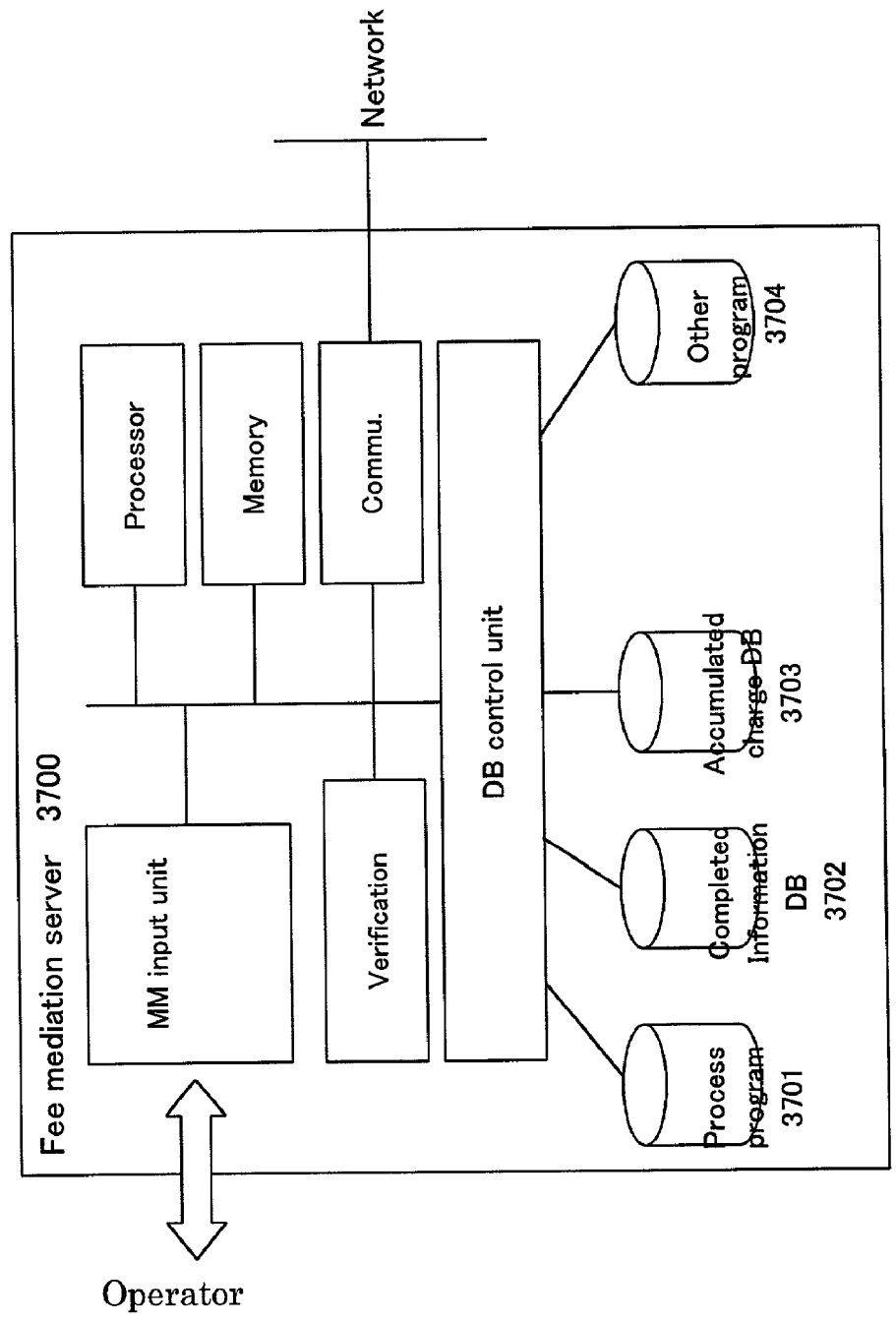
FIG. 37 is a block diagram of the hardware in the fee mediation server.

FIG. 37 is a block diagram of the hardware in the fee mediation server in server group 3300, which constitutes the information mediator in the information mediation system 0001 related to this invention. Fee mediation server 3700 has the function of acquiring the information which conforms to the objective from the mediation server and assessing a fee based on these data. It corresponds to the block diagram illustrating the fee mediation function in FIG. 10. Since the MM (man-machine) input-output unit, the operation unit, the memory unit, the network verification unit, the communication unit and the DB control unit have the same functions as the corresponding parts in verification server 3400, shown in the aforesaid FIG. 34, we will not discuss them further at this point.

Processing programs 3701 are the programs needed to achieve the objective of use (including exchanges with other servers) as defined by the fee mediation server. These would include the OS (operation system). DB 3702 is the data base in which are stored data associated with objectives which have been achieved or completed and data indicating which machines and devices were used. DB 3703 is the data base in which are stored data representing the results produced by the function to total the charges. Other program data 3704 include application software such as the operator's word processing or calculation display programs and data incidental to these.

Server Operation Units and Flow Charts

In the following we shall discuss, with reference to the flow charts, the order of processing used in the operation unit 3402 which is common to all of the aforementioned servers.

Figure 38:
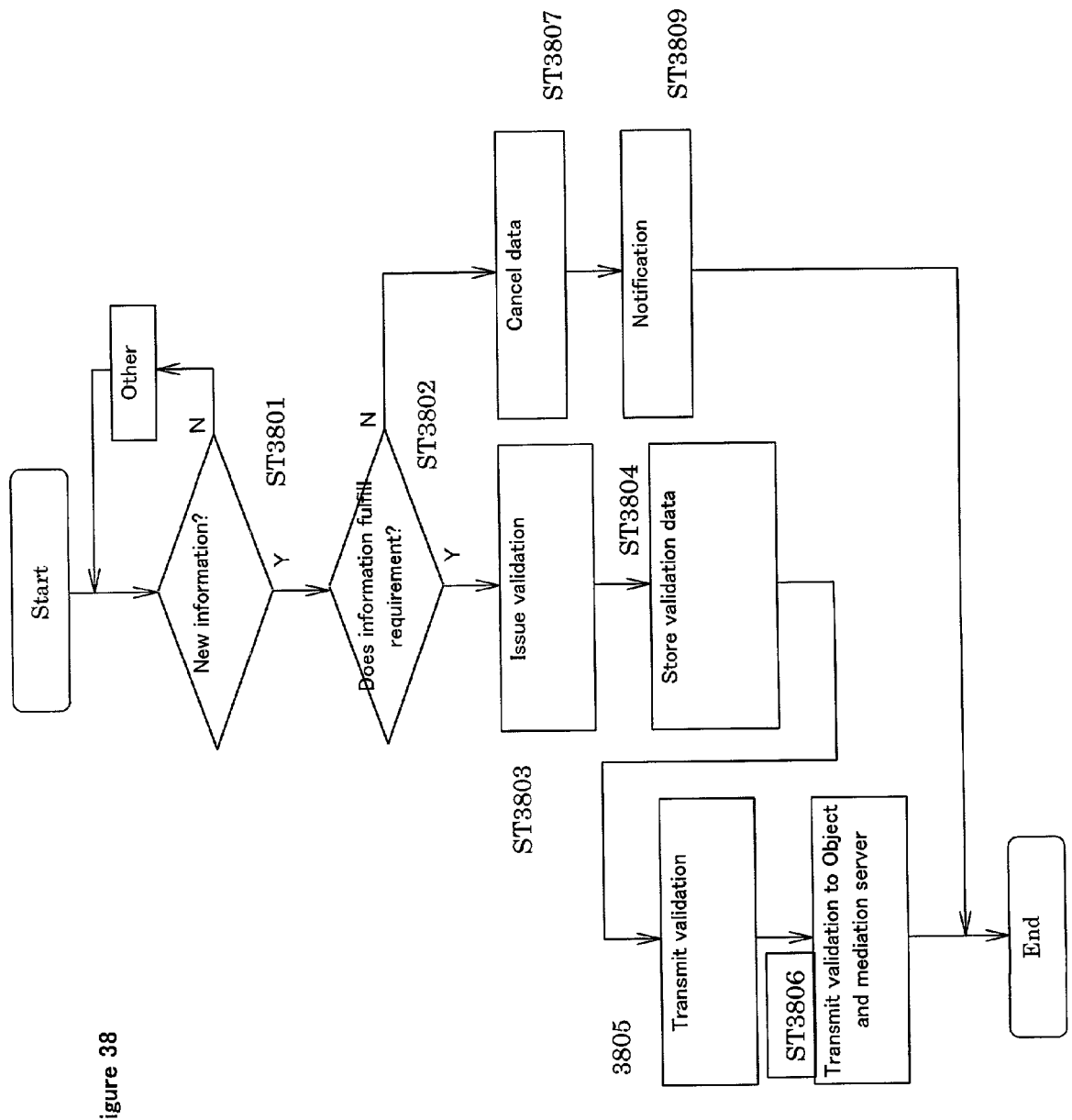
FIG. 38 is a flow chart for the operation unit in verification server.

FIG. 38 is a flow chart for the operation unit in verification server 3400. It corresponds to the block diagram of the server's hardware in FIG. 34 and the block diagram of its functions in FIG. 27. In Step 3801, the server checks to see whether it has validation data for the new machine or device whose identity is being verified. As has been mentioned previously, any machine or device connected to this information mediation system must prove that its participation is legitimate. The person who requests verification here corresponds to the person who inputs the data for verification in FIG. 27. This procedure is required to insure the safety and reliability of the system. If verification data have been input, in Step 3802 these data are checked to see if they meet previously established criteria. If they do, in Step 3804 the server issues validation data for the machine or device which submitted the request. These validation data are stored along with the request for verification in the verification DB to be used when the actual validation is issued. In Step 3805, the validation data that the server issued are sent to the address contained in the verification data, i.e., they are sent to the machine or device, and a "verification completed" flag is set. In Step 3806, the validation data issued by the server are sent to the objective specification server and the mediation server in the information mediation center, and the terminal data indicating that verification has been completed are updated. If in Step 3802 the verification data the server has received do not meet the criteria which were established, it will conclude that the request for verification is illegitimate. In Step 3807, it will cancel the verification data it received, and in Step 3809 it will send a message to the source of the request indicating that it cannot issue validation data.

When the verification server has executed the series of processes entailed in verification, flag data are set in both the server and the machine or device to indicate that verification has been completed. Thereafter, the two are able to exchange data with each other on the basis of the validation.

Figure 39:
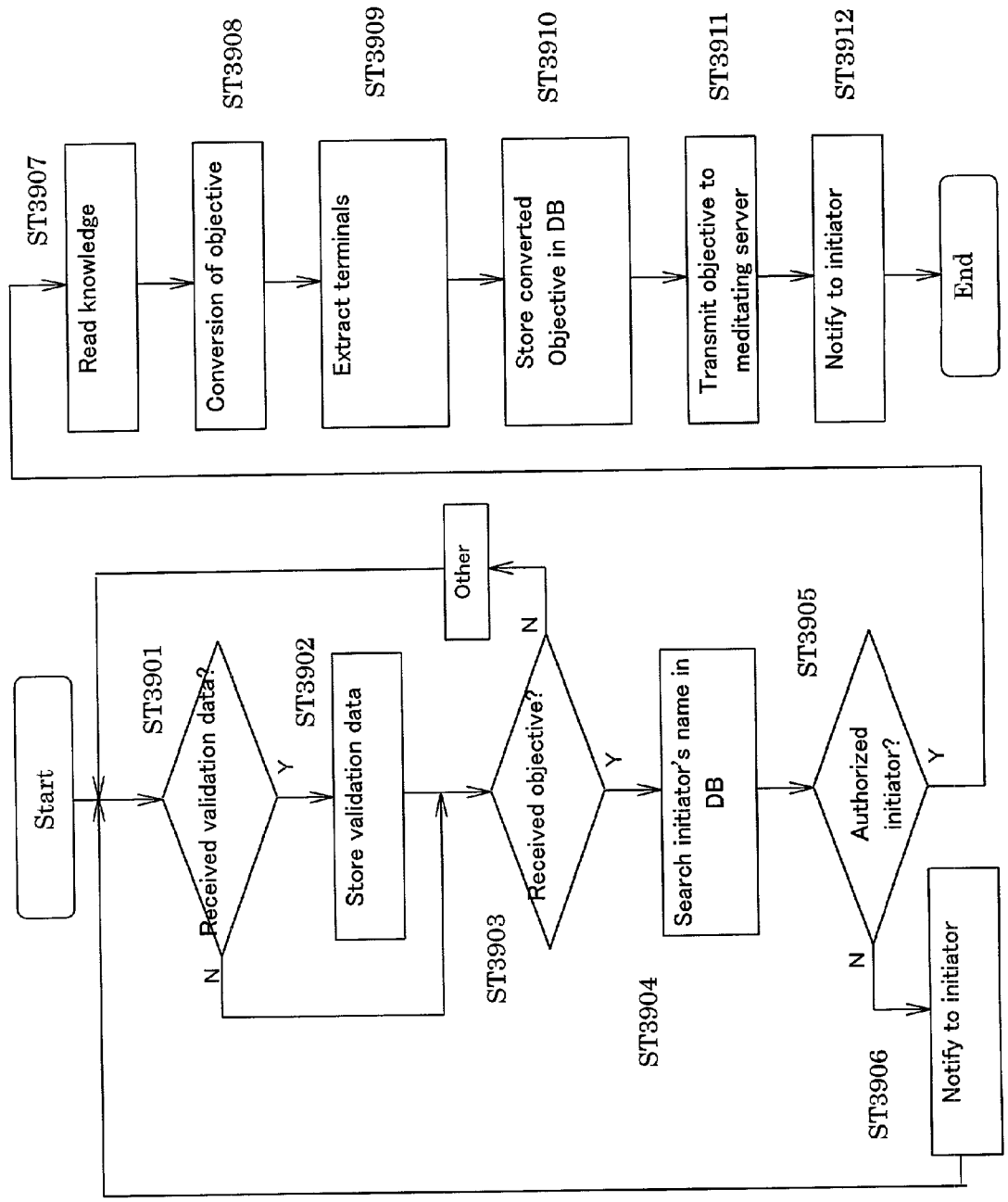
FIG. 39 is a flow chart of the main routines in the operation unit of objective specification server.

FIG. 39 is a flow chart of the main routines in the operation unit of objective specification server 3500. It corresponds to the block diagram of the server's hardware in FIG. 35 and the diagram of its functions in FIG. 22. In Step 3901, before the server accepts the objective, it checks whether it has received validation data from the verification server to prevent illegitimate access. If it has, in Step 3902 it stores the validation data it has received in the verification DB. In Step 3903, the server checks whether it has received an objective from the initiator. An example of an objective sent by an initiator might be "I wish to find beneficiaries for information through the information mediation system related to this invention." In Step 3904, the server searches the verification DB for the initiator's validation data, and in Step 3905, it checks whether the initiator is legitimate. If it was accessed improperly, in Step 3906 the server replies that it cannot accept further input. If the initiator is a legal participant, in Step 3907 the server reads knowledge data concerning the objective out of the knowledge DB. That is to say, it obtains knowledge concerning how to modify the objective. Then, in Step 3908, the server modifies the objective it received based on the knowledge it has read out. Modifying the objective consists of selecting various conditions, as shown in FIGS. 23 through 26, and breaking down the specified objective which was input into a set of specific conditions to be met.

In Step 3909, the server extracts from the verification DB those machines and devices which are best suited to be providers and beneficiaries with respect to the modified objective. This is preparation for the server in the next stage, mediation server 3600, to check whether these machines and devices can be accessed. In Step 3910, the modified objective is stored in the objective DB along with the providers and beneficiaries which the server extracted. In Step 3911, the objective data which were stored are sent to the mediation server. Finally, in Step 3912, an "objective received" message is sent to the initiator. This completes the preparation for the next stage of processing, which is executed by the mediation server as shown in FIG. 41.

Figure 40:
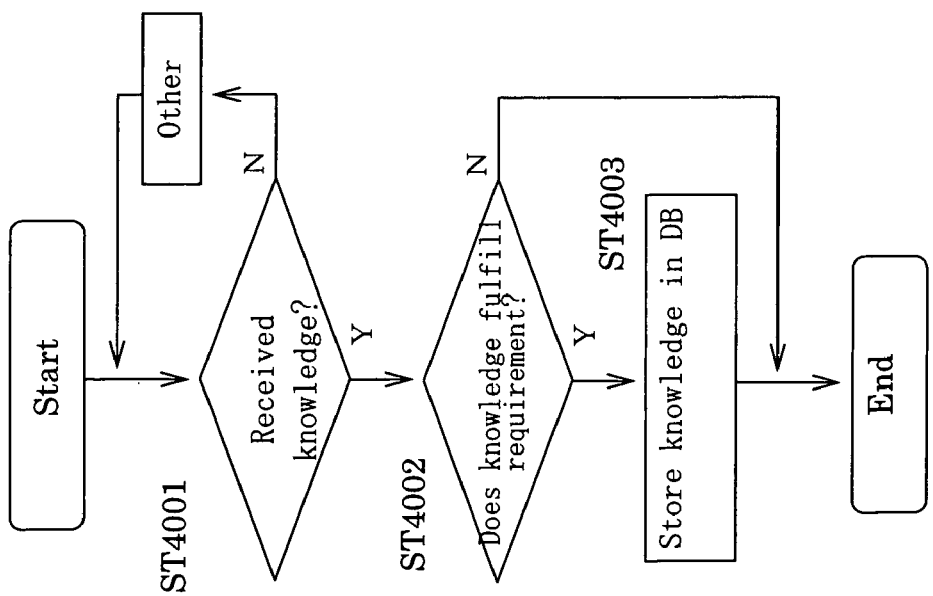
FIG. 40 is a flow chart of the main routines in the operation unit of objective specification server.

FIG. 40 is a flow chart of the subroutine executed by the operation unit of objective specification server 3500. It corresponds to the block diagram of the server's hardware in FIG. 35 and the diagram of its functions in FIG. 22. Knowledge data base 3503 is not fixed but is updated regularly. If someone records knowledge data in Step 4001, the server checks in Step 4002 to see whether the knowledge it received conforms with the standard. In Step 4003, it stores knowledge data which conform with the standard in the knowledge DB. In this way knowledge data base 3503 is updated by knowledge recording function 2204, which is shown in FIG. 22.

Figure 41:
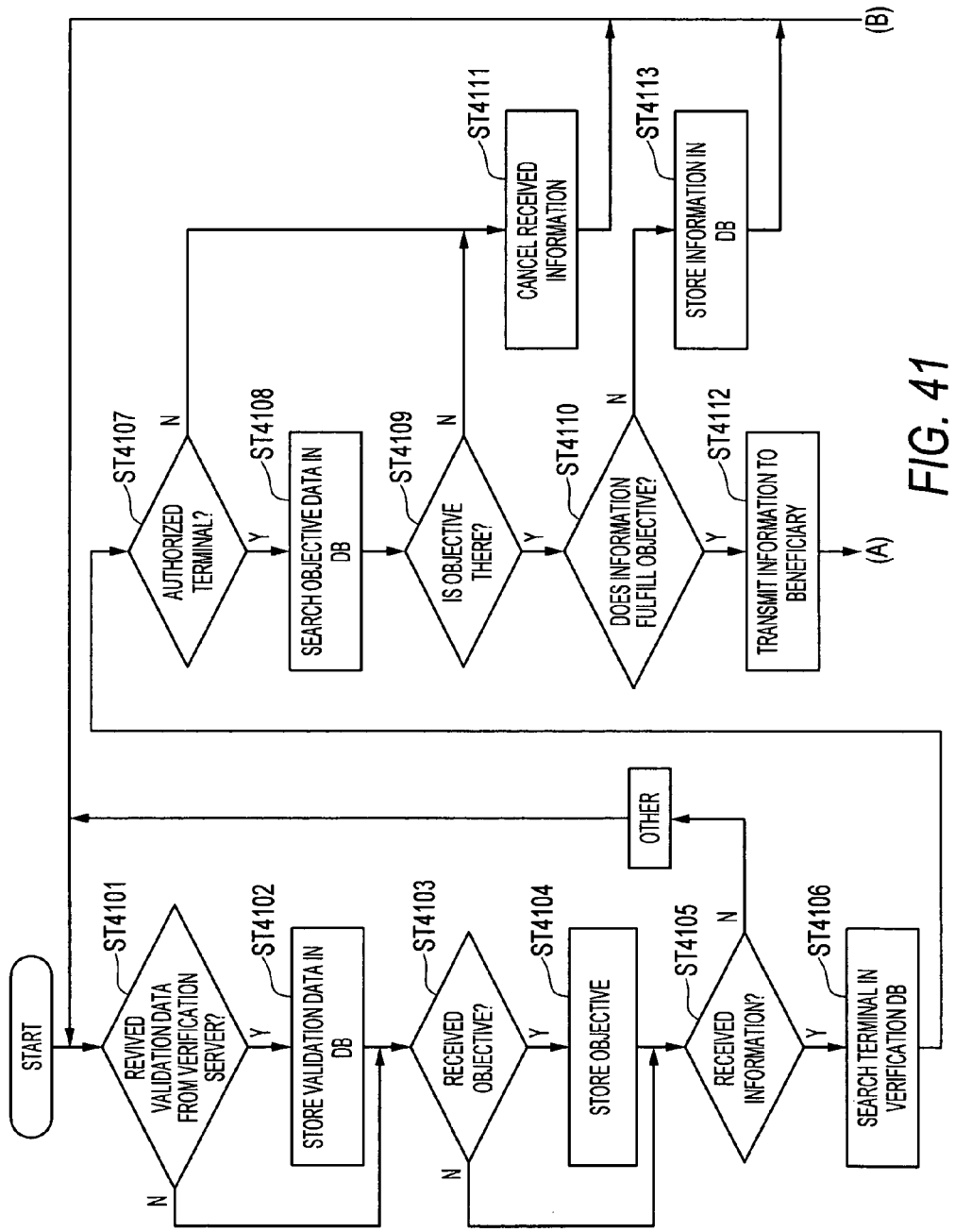
FIG. 41 is a flow chart of the processing executed by the operation unit of mediation server.
Figure 42:
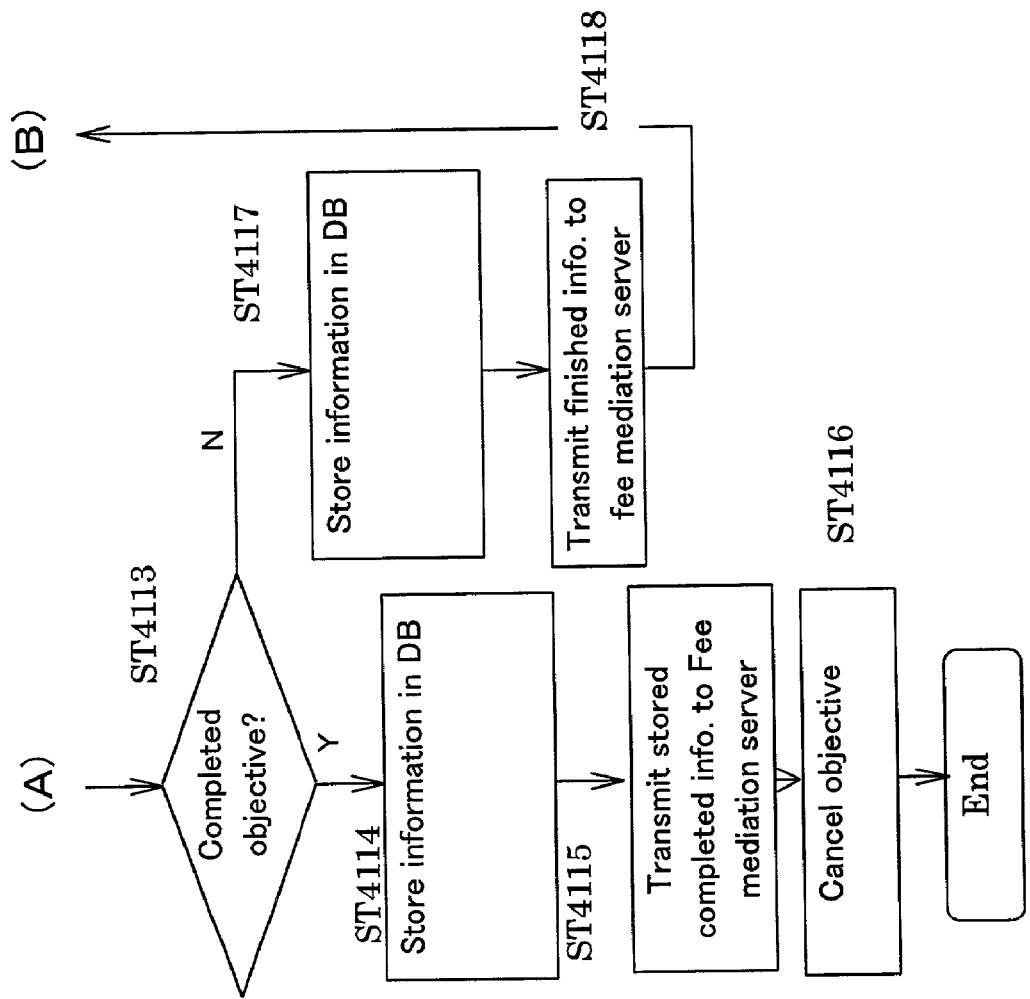
FIG. 42 is a flow chart of the processing executed by the operation unit of mediation server.

FIGS. 41 and FIG. 42 are a flow chart of the processing executed by the operation unit of mediation server 3600. They correspond to the block diagram of the server's hardware in FIG. 36 and the diagram of its functions in FIG. 9. Information mediation server 3600 is the central server in the information mediation system related to this invention. If the information is from a provider whose characteristics conform with the specified objective, the server transmits the information which conforms with the specified objective to the beneficiaries.

In Step 4101, the server checks whether it has received the validation data sent by verification server 3400 in the aforesaid Step 3806. If it has, in Step 4102 it stores the validation data in the verification DB. In this way the system can verify that the machine or device is a legitimate participant.

Next, the server checks in the same way to see whether it has received the new objective specification sent by objective specification server 3500 in the aforesaid Step 3911. If it has, in Step 4140 (sic; should be 4104) it stores the specified objective in the objective DB. If it has not received a new specification, the server skips this step and in Step 4105 checks whether it has received any information from machines or devices. In other words, it checks whether there is any information from providers. If there is new information, in Step 4106 the server searches the verification DB for validation data for the machine or device which provided the information. At the same time, in Step 4107 it checks whether the machine which provided the information is legitimate, i.e., whether the information it provided is reliable. If it is not, in Step 4111 the server cancels the information. If the server determines that the information is legitimate, i.e., reliable, in Step 4108 it searches the objective DB looking for machines or devices. In other words, it checks whether the data base contains any objectives for which these data can be used. In Step 4109, the server checks the data base for objectives for which the machine which sent the data might be a provider. If the data base contains no such objective, the server discards the information that machine sent. In Step 4110, the server checks whether the information obtained from the provider conforms perfectly with the objective. If it does, in Step 4112 the server transmits the information which conforms to the objective to the beneficiaries. If in Step 4110 the server determines that the information does not conform perfectly with the objective, in Step 4113 it stores the information as acquired information linked to the objective in the DB for acquired information. To relate this information to additional information, the server returns to Step 4101.

In Step 4112, the server sends the information which conforms to the objective to the beneficiaries. In Step 4113, it checks whether the objective it has received has been completely attained. It has not, the server goes to Step 4117 and stores the data it has sent in the objective-achieved DB as objective- in- progress data linked to the objective. In Step 4118 the server sends stored objective achieved data for which a fee must be calculated to the fee mediation server. Then, to process the next objective specification, it returns to Step 4101. If in Step 4113 the objective was completed, in Step 4114 the server stores the data it has sent in the objective achieved/completed DB as objective-completed data linked to the objective. In Step 4115 it sends the objective completed data it has just stored to the fee mediation server, which executes the fee processing which will be explained shortly. In Step 4116, the server finally cancels the completed objective and stores the result in the objective DB. This completes the processing executed by the information mediation server.

Figure 43:
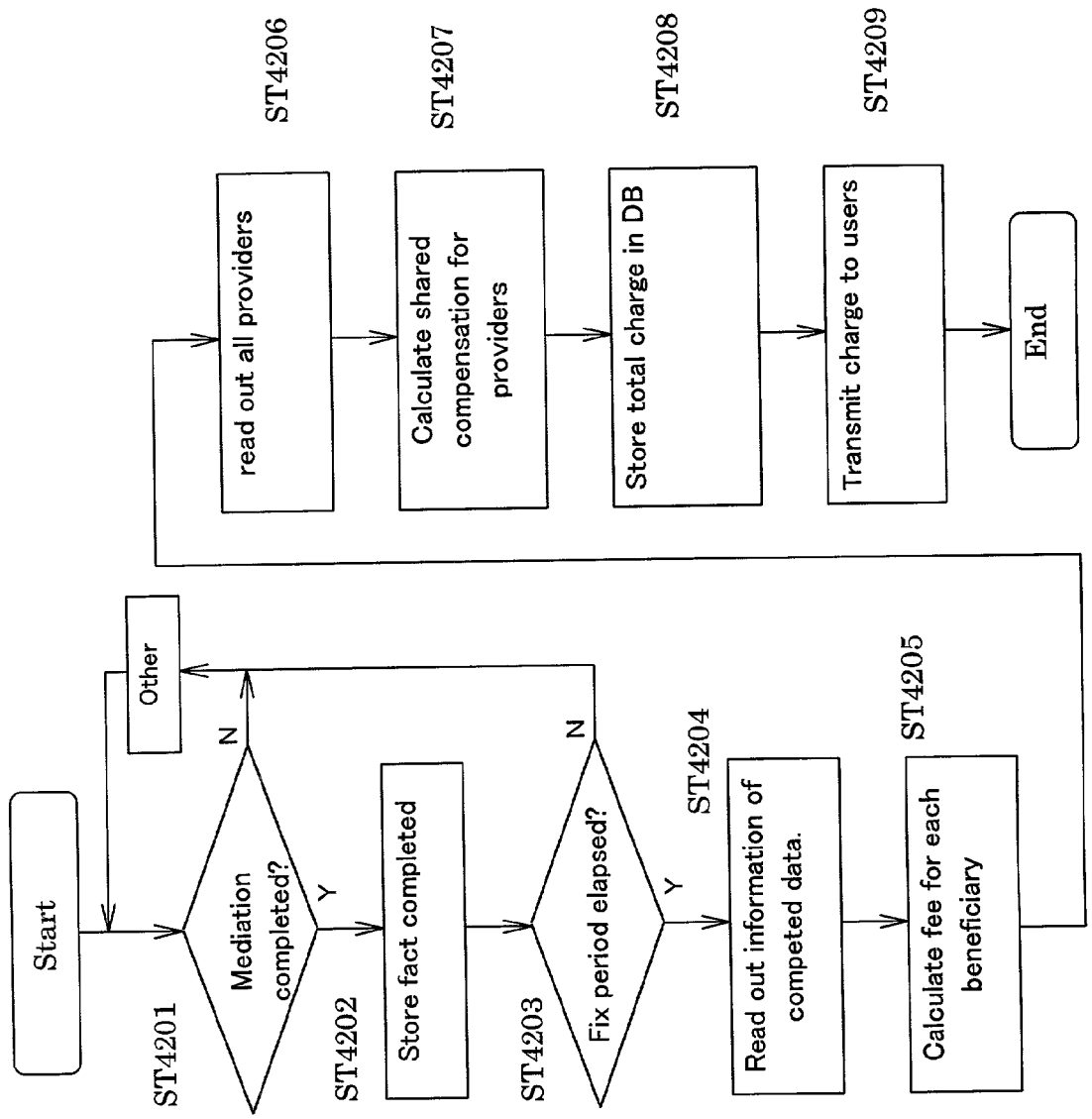
FIG. 43 is a flow chart of operations executed by the operation unit of fee mediation server.

FIG. 43 is a flow chart of operations executed by the operation unit of fee mediation server 3700. It corresponds to the block diagram of the server's hardware in FIG. 37 and the diagram of its functions in FIG. 10. This server executes the processing to calculate the fee the beneficiary will be charged for the information and bills him for it.

In Step 4201, the server checks whether it has received objective achieved or completed data from an information meditaion server. If it has, in Step 4202 it stores these data in the objective achieved/completed DB. In Step 4204, it reads objective achieved/completed data out of the achieved/completed DB each time a fixed period of time has elapsed (Step 4203) and calculates the fee for it. That is, in Step 4205, the server calculates from the value of the information it has read out the fee to charge each beneficiary and decides what to bill him. In Step 4206 it extracts from the objective achieved/completed DB all the providers whose names are stored in the data it has read out. In Step 4207 the server calculates a rate of compensation for each provider it extracted based on the value of the information it provided and determines the compensation they should receive. In Step 4208 the server totals the fee charged and the compensation for each machine or device and stores this value in the total charge DB. Finally, in Step 4209 the server sends the total charge which it has stored to a previously determined destination. This previously determined destination might be the initiator who specified the objective, the person who input the validation data for the machine or device, or the machine or device itself. In the last case, the server sends the total charge data to the owner whose name is encoded in the validation data.

Figure 44:
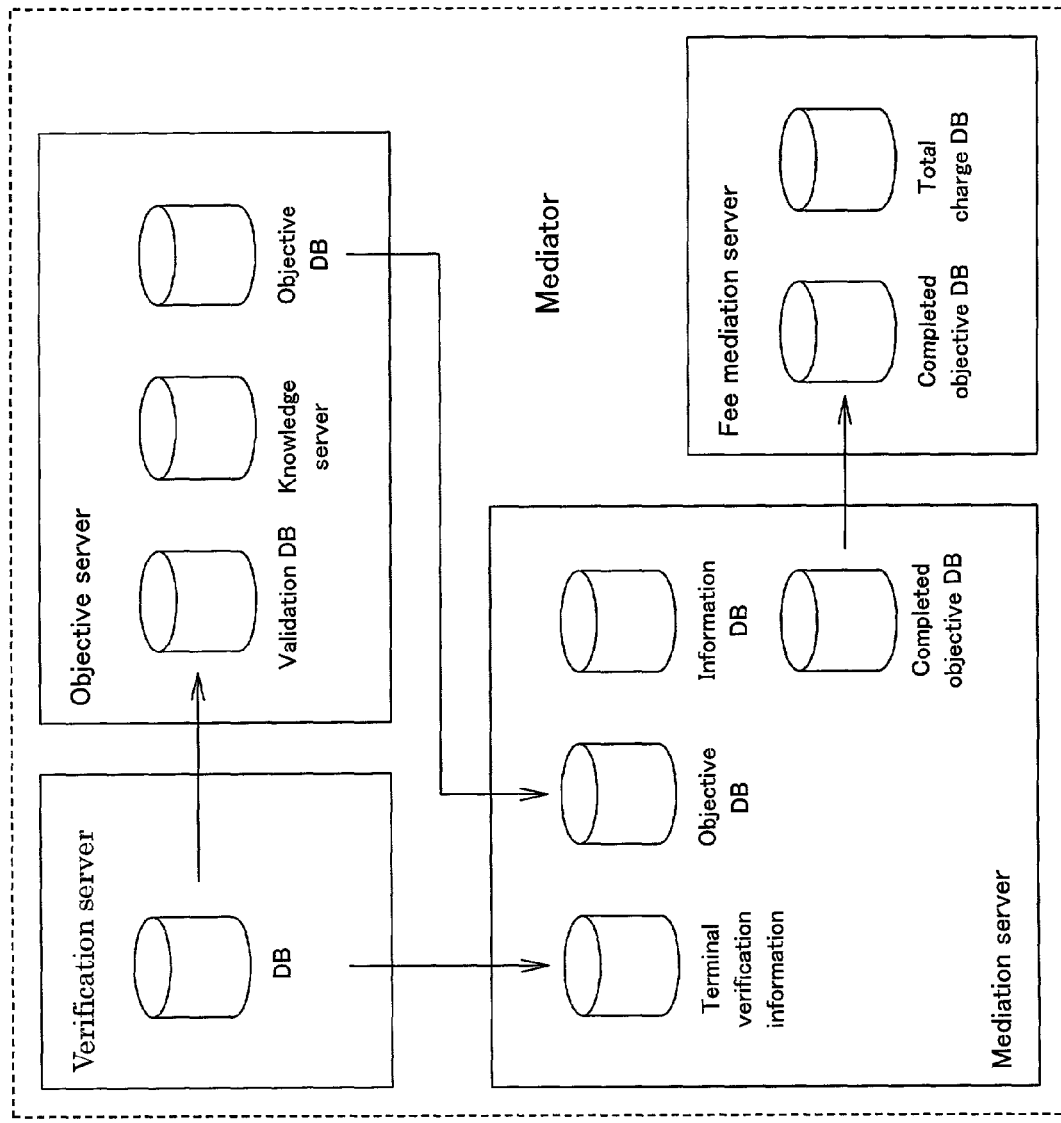
FIG. 44 is a block diagram showing the aforesaid servers'DBs and the flow of processing in the servers.

FIG. 44 is a block diagram showing the aforesaid servers'DBs and the flow of processing as a further illustration of the embodiment in FIGS. 33 through 43. The data base in each server is independent of the others, and data are sent to different servers for different processing.

The Machines and Devices

Figure 45:
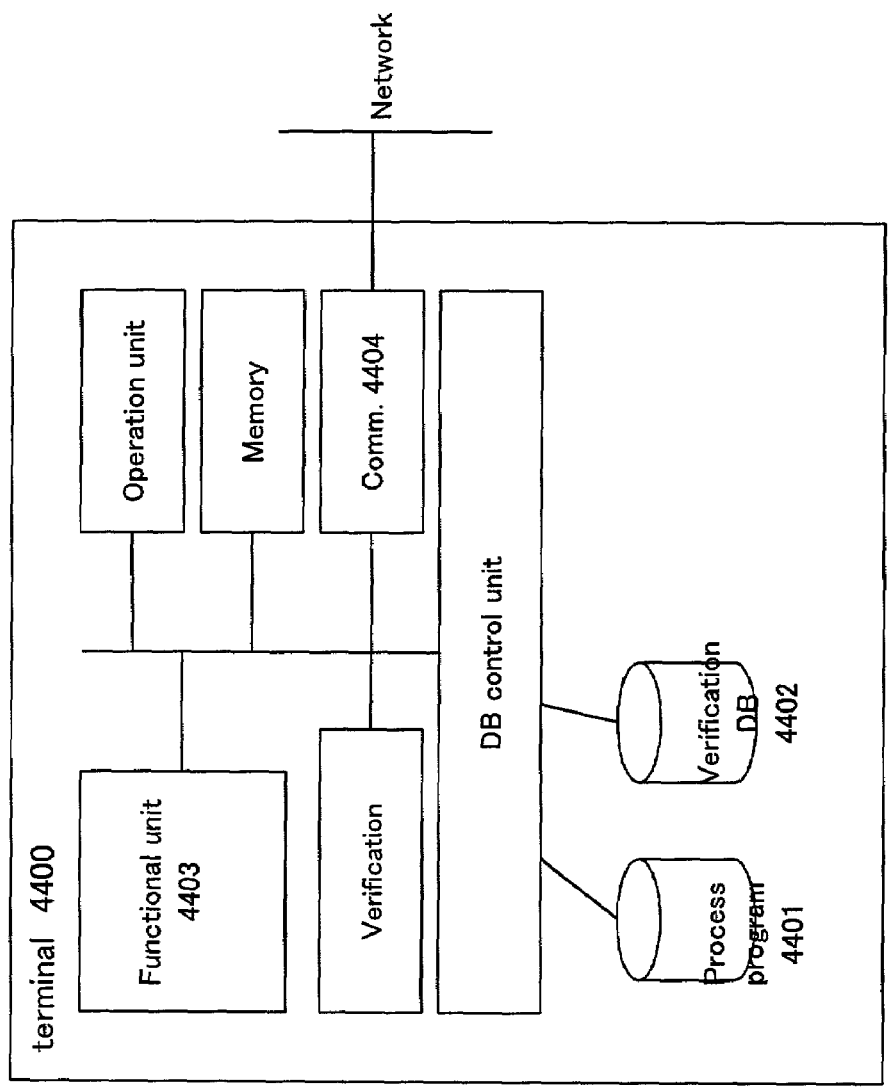
FIG. 45 is a block diagram of the hardware in machine or device.

FIG. 45 is a block diagram of the hardware in machine or device 4400 shown in FIG. 33. The beneficiaries and providers in the information mediation system related to this invention are connected to the information mediation server when these machines or devices are connected to the server through the network. These machines or devices are those which can use a validation transmitted by the verification server to exchange data, through the network, with the information mediation server. As was shown in FIG. 3, there are three ways for a machine to exchange data with the information mediator (i.e., with its server): the machine may be monitored, it may be independent, or its transmission may be triggered by an event.

Processing programs 4401 are the programs needed to exchange data via the network with the mediation server. If a separate OS (operation system) is required, it is included here. Validation DB 4402 is the data base in which are stored validation data sent by the verification server. The machine uses these validation data to access the mediation server.

Special functions 4403 are the parts of the device which contain functions to execute the unique objectives of that specific device. For example, for a device in a car, the special functions are the components of the car. If the car has sensors among its components, those sensors might detect whether the door or window switches were on or off. For a beneficiary, a special function might be a display unit to show him data. Since the operation unit, memory unit, communication unit, network verification unit and DB control unit are identical to those in the server illustrated in FIG. 34, we shall not discuss them further at this point.

Figure 46:
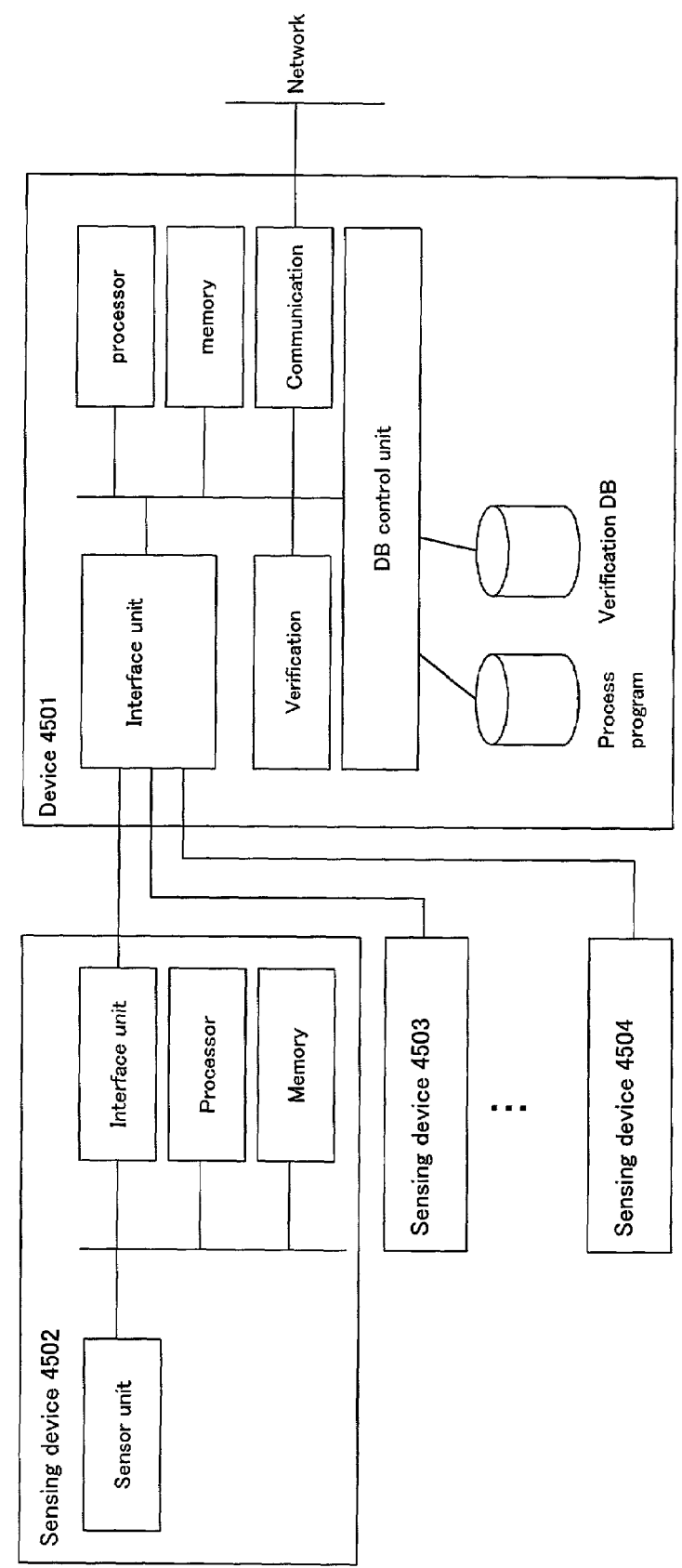
FIG. 46 is a block diagram of the hardware in another preferred embodiment of the machine or device.

FIG. 46 is a block diagram of the hardware in another preferred embodiment of the machine or device of this invention. In this example, the device with the sensing function (normally a sensor) does not itself have the ability to exchange data with the mediation server. As in FIG. 45, the machine or device is one which can use a validation transmitted by the verification server to exchange data, through the network, with the information mediation server. However, since a number of sensing devices are connected to device 4501, we can consider it to be either a terminal or a server for the sensing devices. These sensors, as was shown in FIG. 3, may provide their information in three different ways: they may be monitored, they may be independent, or they may be triggered by an event.

Device 4501 could be viewed as a terminal for the sensing devices when sensing devices 4502, 4503, 4504, etc. are connected to it by a relatively simple means of connection. It could be viewed as a server for the sensing devices when the sensing devices are connected to it by a relatively sophisticated means of connection (or means of communication). The sensing element in a sensing device is the part with the sensing capability. A number of different methods of sensing may be used depending on the application and the objective. A sensing device will normally have an operation unit and a memory to enable it to carry out its sensing function.

Figure 47:
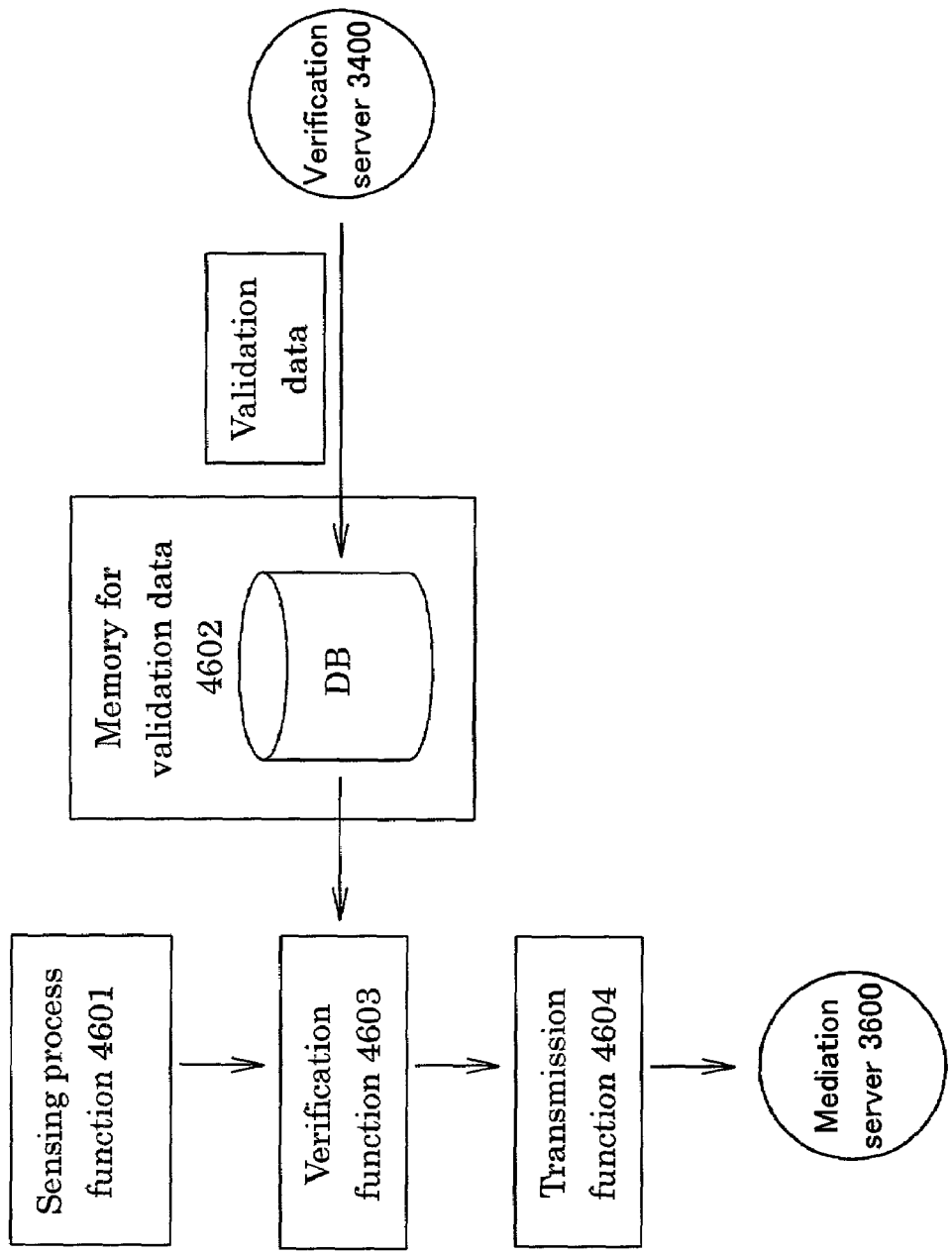
FIG. 47 is a functional block diagram for the machine or device.

FIG. 47 is a block diagram illustrating what occurs when the machine or device 4400 or 4501 of this invention is the provider. Processing function 4601 is the function of (the sensors) performing the sensing in accordance with the application and objective of the device. Data storage function 4602 is the function of storing the validation data sent by the aforesaid verification server 3400 in the data base. Function 4603 is the function by which the validation data are appended to the sensing data obtained through processing function 4601. In this function the validation data, a sort of ID, are appended to the data from the sensors to indicate their origin. This processing insures that the source of the sensor data will remain obvious after they are sent to mediation server 3600, the mediation center. Transmission function 4604 consists of sending the sensor data to which the validation data have been appended by function 4603 to mediation server 3600.

Processing Units in Machines or Terminals and Flow Charts

Figure 48:
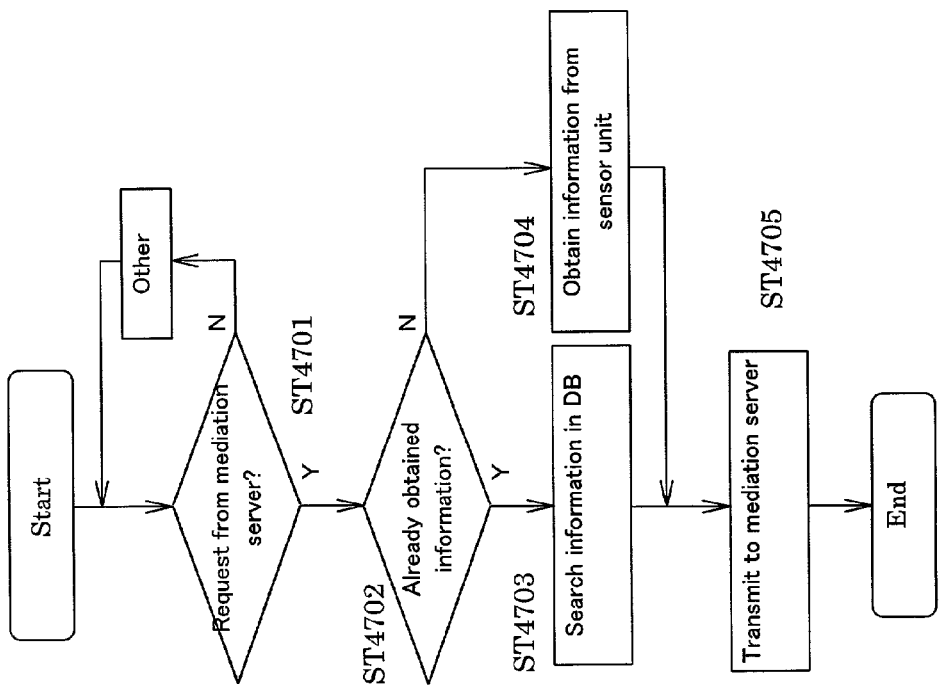
FIG. 48 is a flow chart of the operation unit in a machine or device.

FIG. 48 is a flow chart of the operation unit in a machine or device. It corresponds to the block diagram of the unit's hardware in FIGS. 45 and 46 and the diagram of its functions in FIG. 47. This device transmits data by being monitored; and it is monitored by being polled. In other words, it transmits data whenever mediation server 3600 asks it to.

In Step 4701, the operation unit checks whether it has a request to transmit from the mediation server. If it does, in Step 4702 it checks whether it has finished collecting the information requested. For example, a vending machine has sensors inside it which check how many bottles of juice or packs of cigarettes it has left. If it has the requested information, in Step 4703 the unit searches the DB in which it is stored and obtains it. If the unit does not yet have the information, in Step 4704 it obtains it from the processing function. In Step 4705 the unit transmits the information it has obtained to the mediation server.

Figure 49:
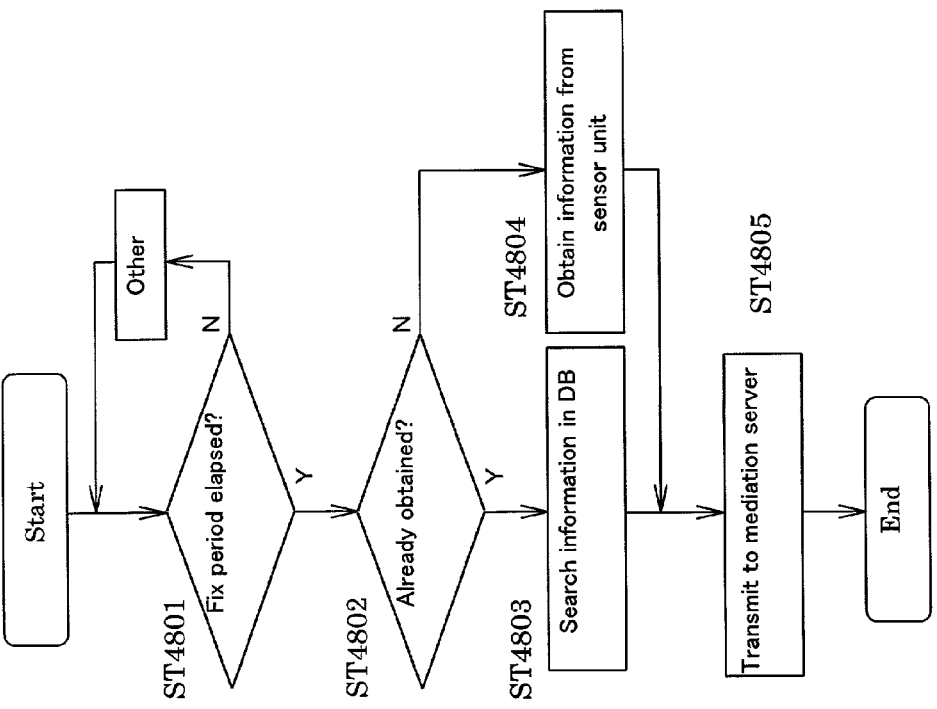
FIG. 49 is a flow chart of the operation unit in a machine or device.

FIG. 49 is a flow chart of the processing in another operation unit of a machine or device. It corresponds to the block diagram of the unit's hardware in FIGS. 45 and 46 and the diagram of its functions in FIG. 47. This device is an independent data transmitter, which means that it transmits data whenever a previously determined period of time has elapsed. How long this period of time will be is determined mutually by mediation server 3600 and the machine or device. At fixed intervals, the machine or device itself initiates the transmission of data.

In Step 4801, the operation unit checks whether the previously determined period of time has elapsed. If it has, in Step 4802 it checks whether it has acquired the information that was requested. If it has, in Step 4803 the unit searches the DB in which the requested information is stored and acquires it. If the unit has not yet acquired the information, in Step 4804 it acquires it from the processing function. In Step 4805 the operation unit transmits the requested information to the mediation server.

Figure 50:
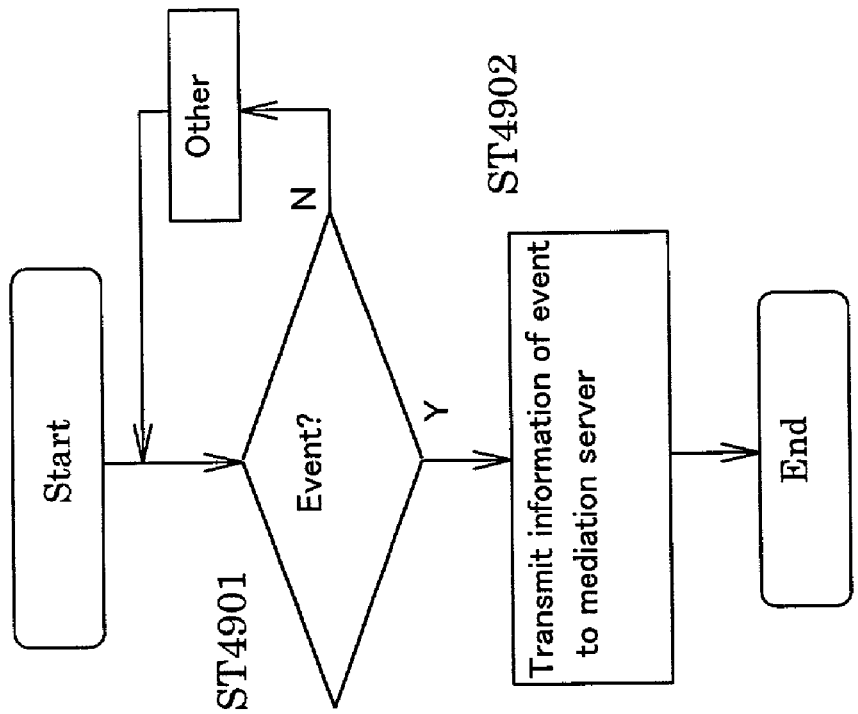
FIG. 50 is a flow chart of the operation unit in a machine or device.

FIG. 50 is a flow chart of the processing executed by the operation unit of another machine or device. It corresponds to the block diagram of the unit's hardware in FIGS. 45 and 46 and the diagram of its functions in FIG. 47. This device transmits data when a specific event has occurred. The event might, for example, be an unusual shock picked up by the internal sensors in a vending machine. In other words, this machine transmits sensing data spontaneously when an event occurs which was determined mutually by mediation server 3600 and the machine. The aforesaid event may be an unusual occurrence or the phenomenon of a (previously determined) value crossing a threshold.

In Step 4901 the operation unit checks whether a previously determined event has occurred. If it has, in Step 4902 the unit sends the data acquired during or because of the event to the mediation server. This is how data are transmitted in response to an unforeseen event.

Specific Examples of Machines and Devices

Figure 51:
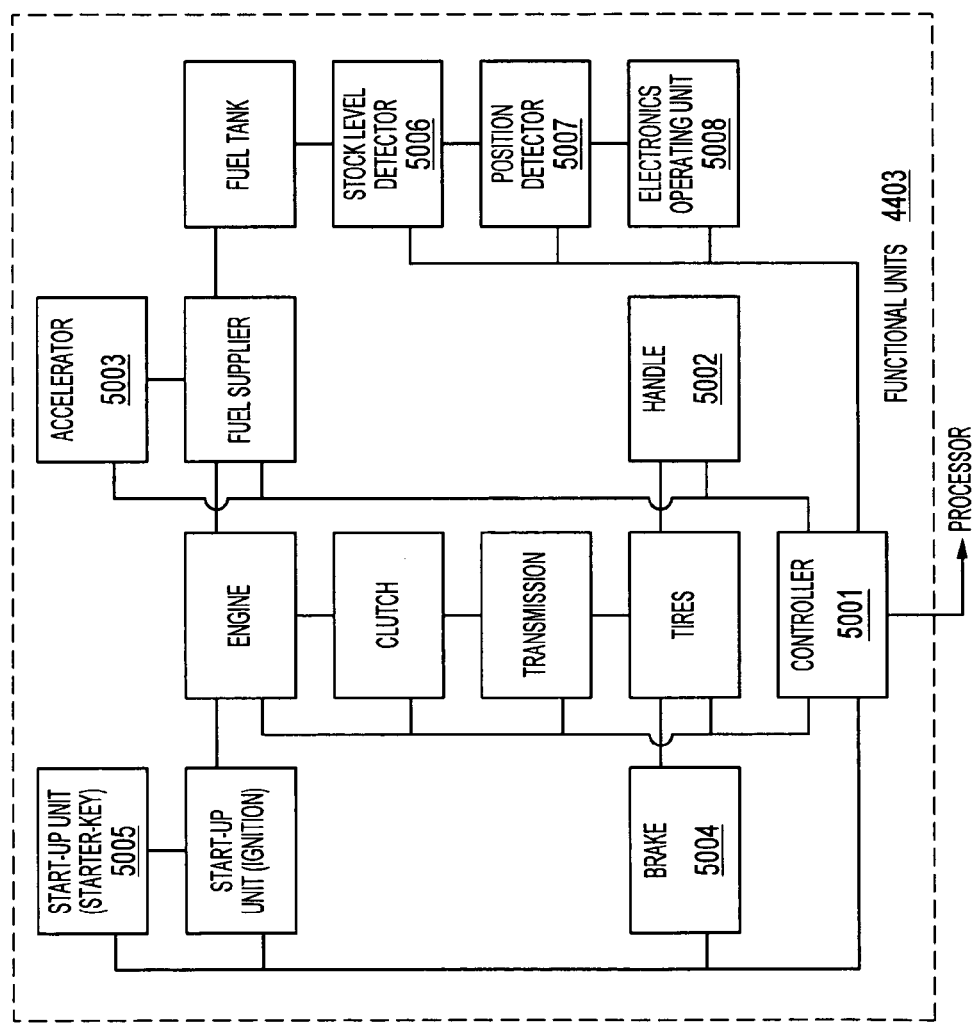
FIG. 51 is a detailed example of the special functions discussed in FIG. 45.

FIG. 51 is a detailed example of the special functions discussed in FIG. 45. In this example, the machine or device is an automobile. Control unit 5001 controls all the other components. Generally it would include an operation unit (i.e., a CPU), a memory and processing programs. The control unit has a number of sensing devices with different purposes to detect the state of every part (see FIG. 53). The various units in the diagram may have beneficiary interfaces if needed. The driver, who is in general the car's beneficiary, transmits his intentions to the car through various beneficiary interfaces, including the steering wheel, or steering mechanism 5502; the gas pedal, or acceleration unit 5003; and the brake pedal, or deceleration unit 5004. He accesses these interfaces by using an instrument such as an ignition key, or start-up unit 5005. Stock level detector 5006 detects the quantity of fuel left in the fuel tank. Normally, it would be a liquid level sensor. Position detector 5007 detects the car's position. Generally, it detects signals from several external devices (viz., satellites) such as those of the GPS and uses them to calculate the car's current position. Electronics operating unit 5008 is used to operate the electronic devices in the car. These include electronic locks, windows, (exterior) lights, emergency flashers and lamps (brake lights, hazard lights, etc.). The speedometer, tachometer, audio equipment, both radio and CD player, and interior lights are also electronic devices. In addition, the car has various sensors which detect the state of the critical components. The sensing data from these are transmitted to the information mediation system according to this invention. When it provides these sensing data, the car becomes a provider. In contrast, a beneficiary can specify his desired objective and obtain the data he needs based on these sensing data.

The signals detected by these various sensing devices are transmitted by control unit 5001 to operation unit 4404 (in a machine or device). From there they are transmitted, via a network, to mediation server 3600 in the information mediation center discussed in FIG. 36. In the information mediation system 0001 according to this invention, these signal data are sent to the mediation server as sensing data from both a provider and a beneficiary. For example, in the car shown in FIG. 51, the on-off signal from the car's windshield wipers, which are one of the electronics in unit 5008, is sent to the mediation server as provider data with respect to objective A shown in FIG. 13, to find out where it is raining right now in Japan. On the other hand, if control unit 5001 can control the locking or unlocking of the electronic door locks, which are another of the electronics in unit 5008, and the driver has inadvertently locked his keys in the car, mediation server 3600 can send a command to open the door locks. When the car receives the "open locks" signal from mediation server 3600, it becomes the beneficiary. Thus in the information mediation system related to this invention, the same machine or device can function as both a provider and a beneficiary.

Figure 52:
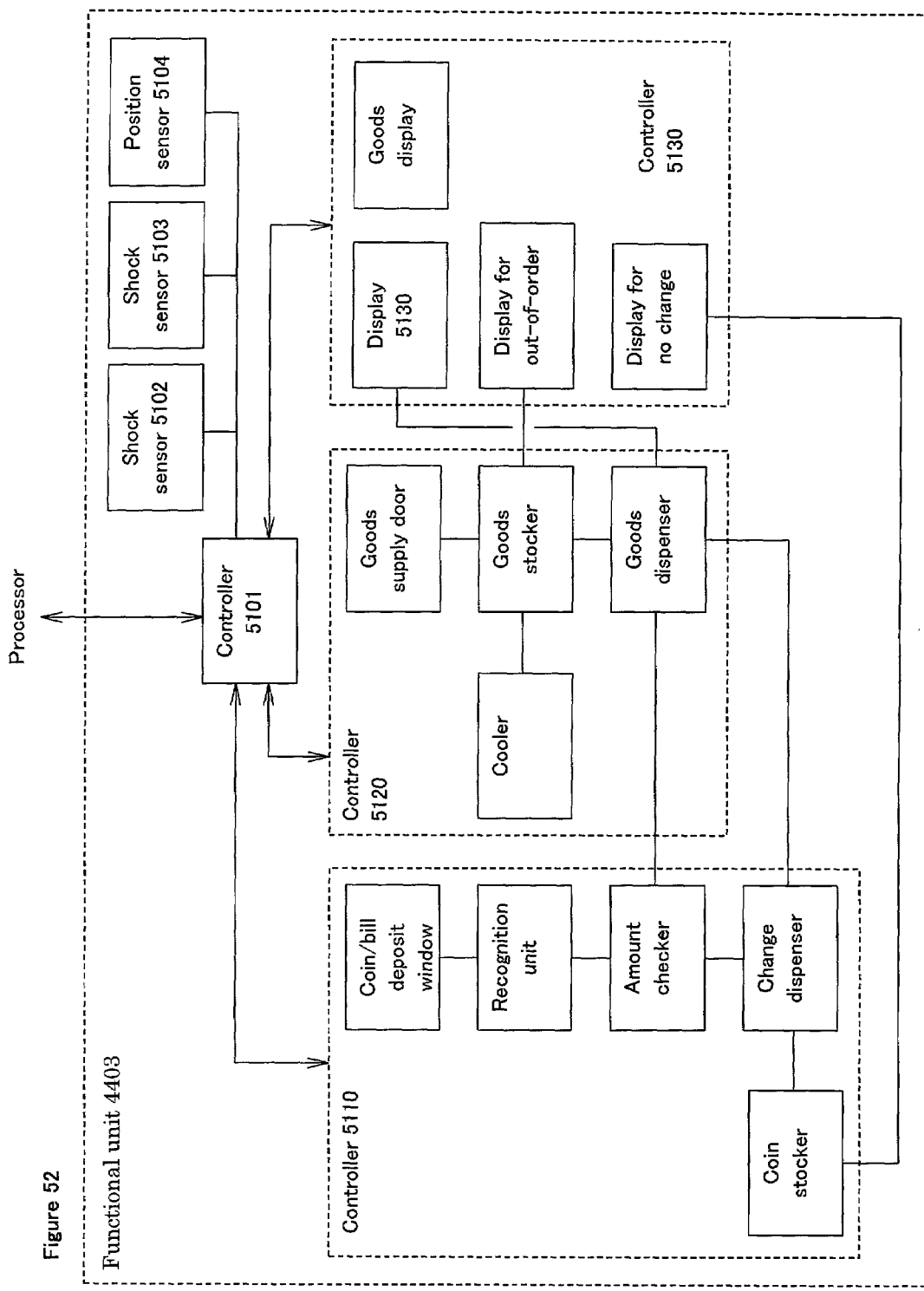
FIG. 52 is a detailed example of the special functions discussed in FIG. 45.

FIG. 52 is a detailed example of another embodiment of the special functions of the machine or device in FIG. 45. In this example, the device is a vending machine. Control units 5110, 5120 and 5130 control the various parts of the machine. Generally, they would include an operation unit (i.e., a CPU), a memory and processing programs. The control unit has a number of sensing devices to detect the state of its various parts as needed for different purposes (see FIG. 53). The parts shown in the diagram have beneficiary interfaces as needed. These interfaces would be used by the service and security agencies in charge of the machine. Main control unit 5101 oversees the three control units under it: unit 5110, which controls the processing of coins and bills; unit 5120, which controls the vending processing; and unit 5130, which controls the display. Normally, each control unit would have its own controller; if this is not the case, the main control unit would assume that responsibility. Control unit 5110 receives the money for the merchandise sold in the vending machine, determines whether it is legal tender, and permits vending controller 5120 to provide the merchandise according to the amount inserted. It subtracts the price of the merchandise from the amount inserted and returns the remainder as change (in either coins or bills). Vending control unit 5120 keeps the merchandise stocked in the machine by the service agency at the proper temperature. When the beneficiary (i.e., the person who puts money into the machine) presses a switch (usually) on price display 5131 of display control unit 5130, control unit 5120 provides merchandise according to the amount determined by the coin and bill processing unit. Display control unit 5130 displays the available merchandise and its prices, as well as the message that a product is sold out or that the machine is out of change.

Shock detector 5102 detects shocks which the vending machine receives (from the exterior). Along with vibration detector 5130, which detects vibration, the shock detector is used to prevent crimes from occurring. (These two functions detect when a person is treating the machine in an inappropriate manner and transmit this information to security personnel in order to prevent unlawful behavior and protect the machine.) The vibration detector is used merely as an adjunct in order to avoid mistaking natural shocks, such as those resulting from an earthquake (when, for example, the vending machine is knocked over), for illegal acts. However, if it detects vibration when nearby machines and devices are not experiencing vibration, then it might be concluded that something is going on: someone could be drilling into the machine or shaking it. Position detector 5104 detects the current location of the vending machine. This information is generally sent to the service and security agencies (to give them the location instantaneously). However, the detector can also be used to find the location (in order to keep track of it) after the vending machine is moved.

Figure 53:
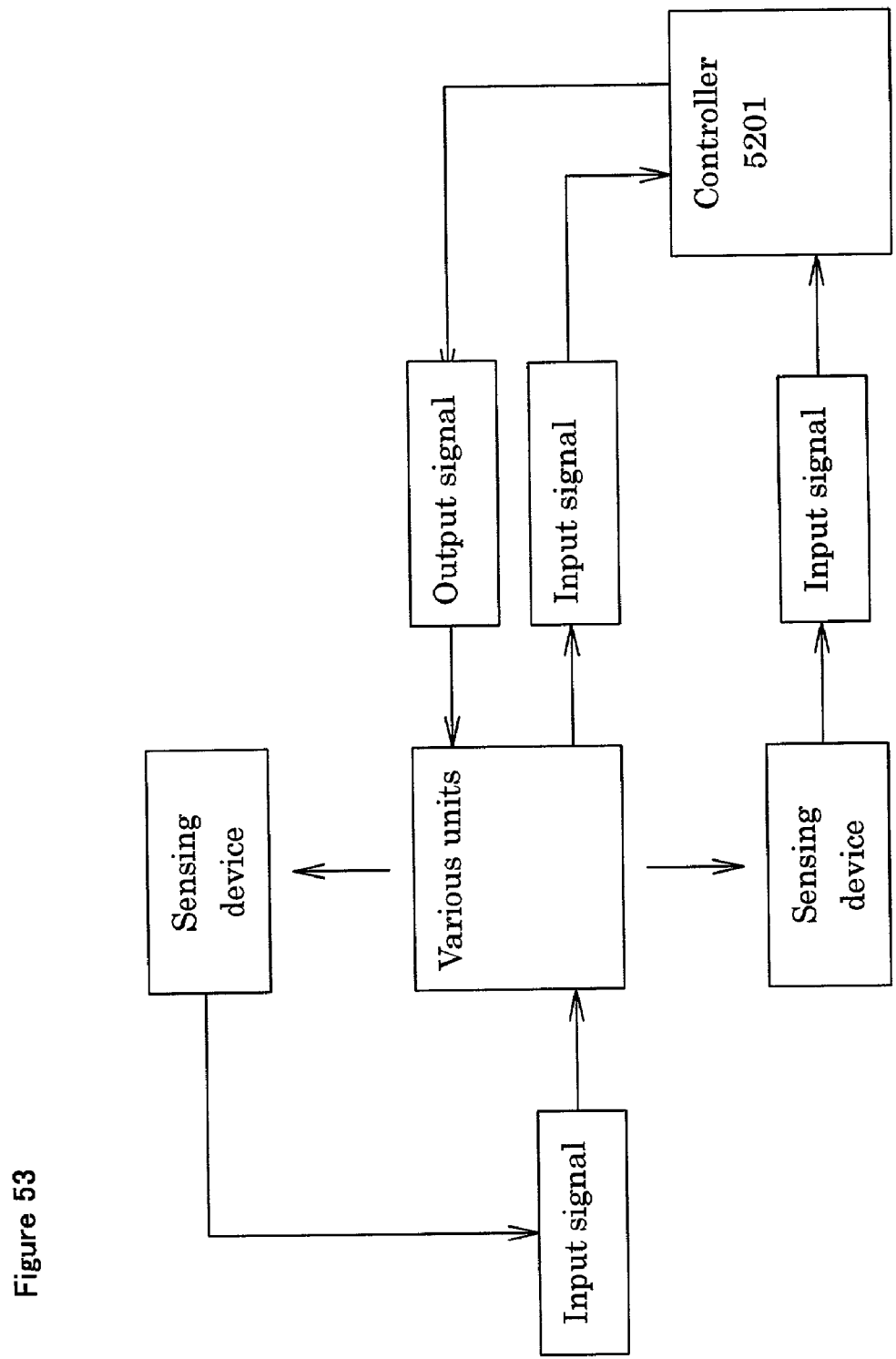
FIG. 53 is an additional illustration concerning the control units in FIGS. 51 and 52.

FIG. 53 is an additional illustration concerning the control units in FIGS. 51 and 52. It is a block diagram showing how various sensing devices with different purposes as needed help control unit 5201 detect the state of various components. In some cases, each part has its own independent sensing device, and the signal from that device is input into that part. Since the input signal is basically an electrical signal, parts which do not produce their own signal are given one by the sensing device.

The Flow of Information Back and Forth among Beneficiaries, the Mediation Server and Providers (Example 1)

Figure 54:
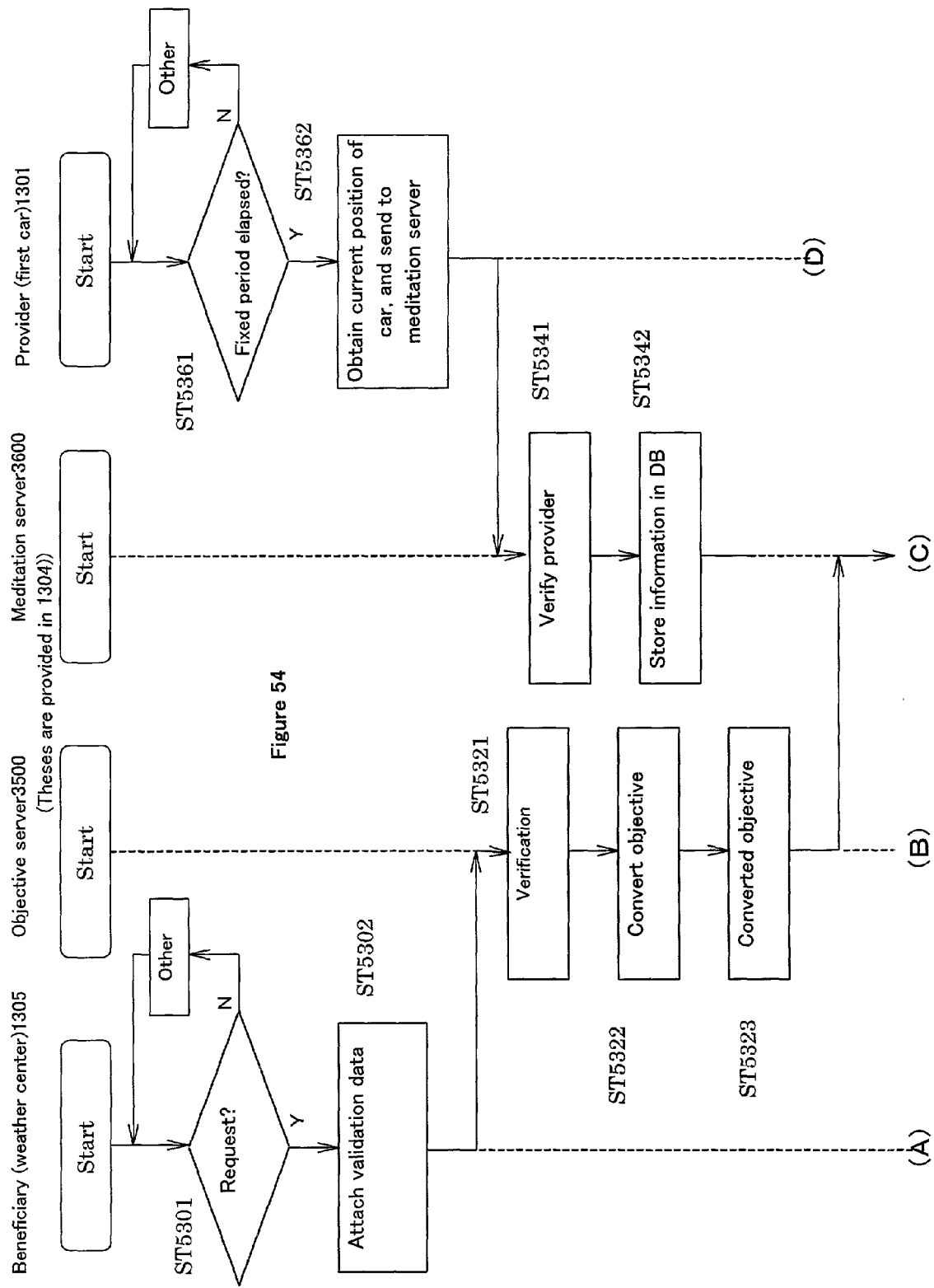
FIG. 54 is a flow chart to execute objective A in FIG. 13.
Figure 55:
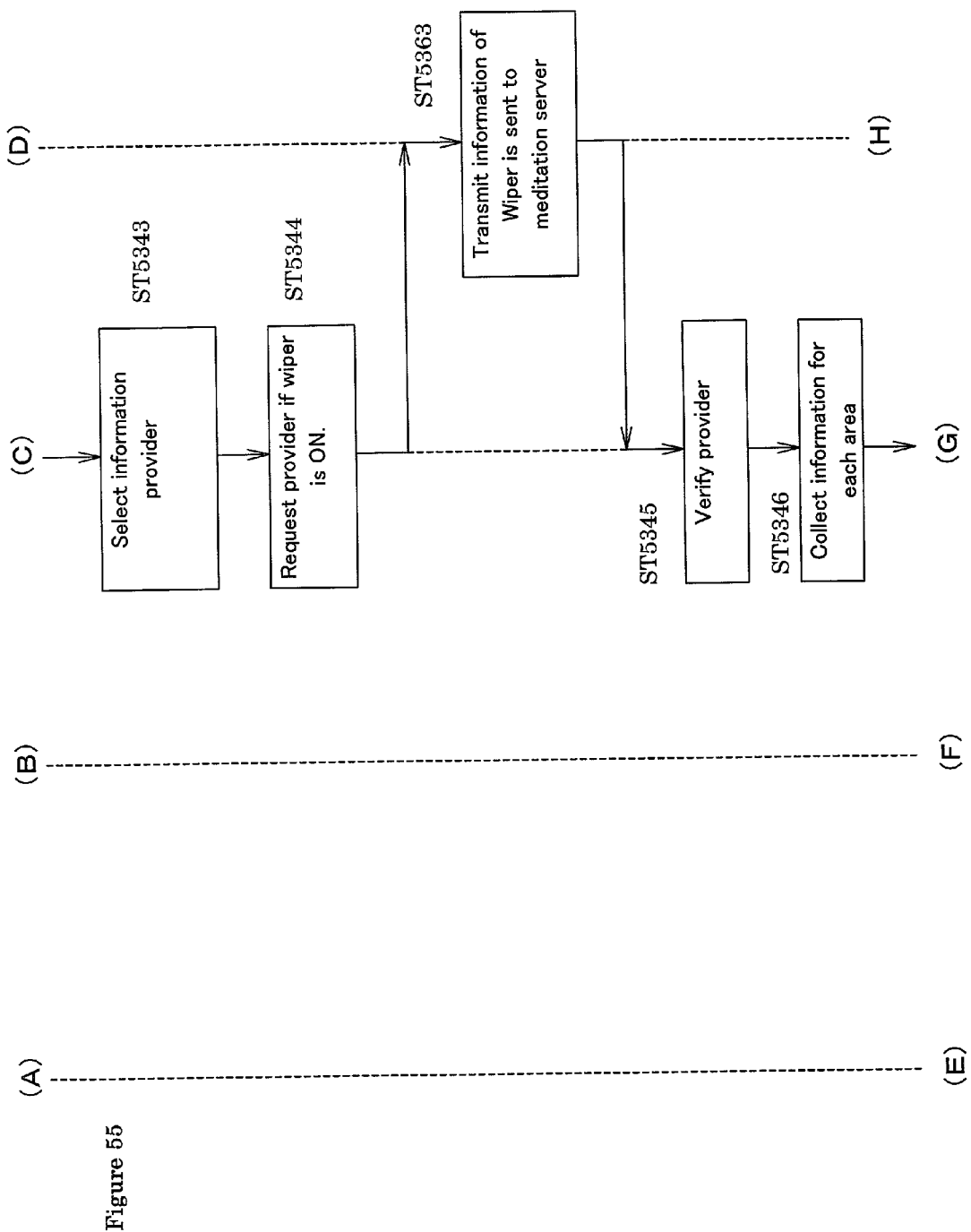
FIG. 55 is a flow chart to execute objective A in FIG. 13.
Figure 56:
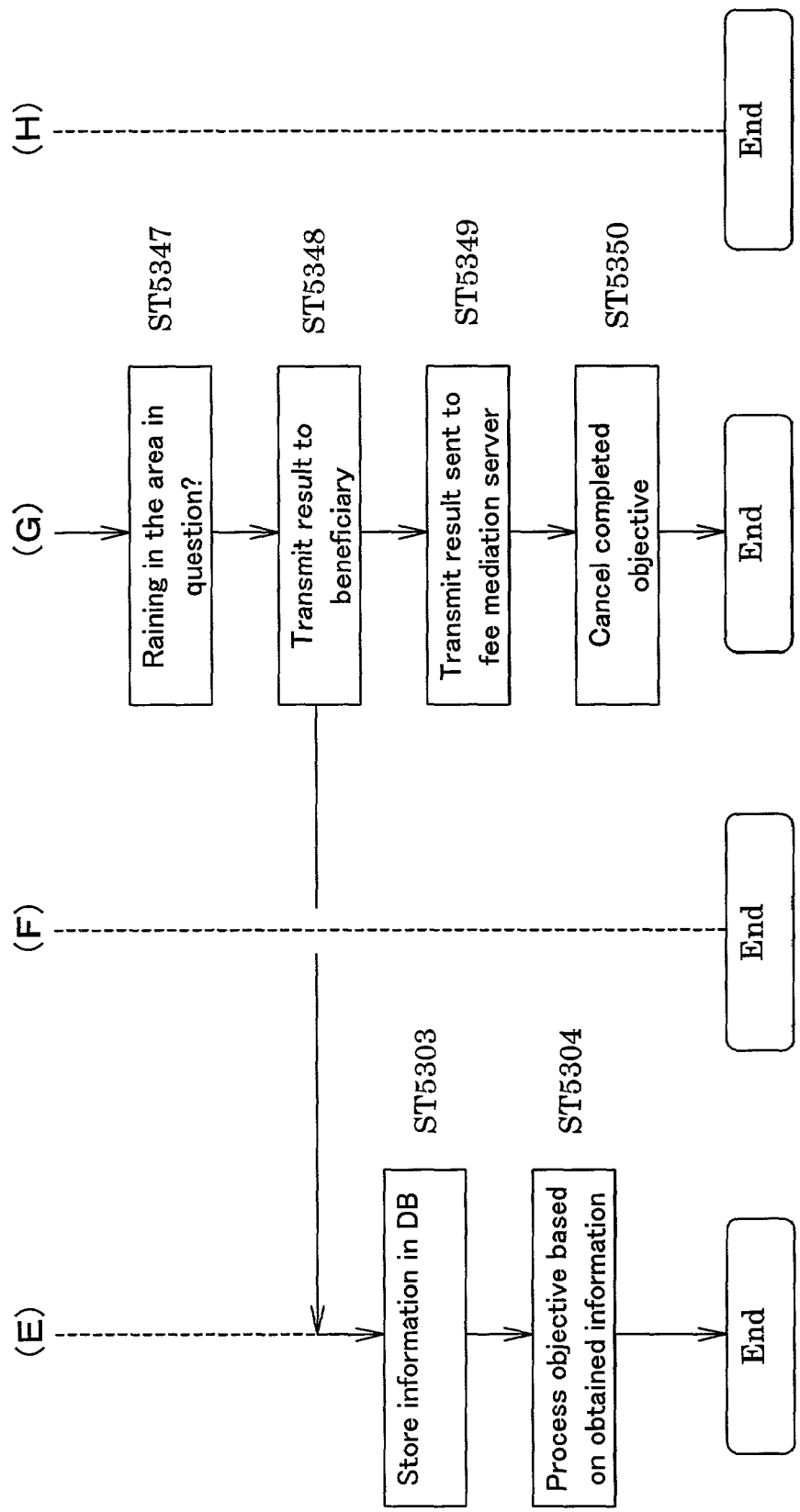
FIG. 56 is a flow chart to execute objective A in FIG. 13.

FIG. 54 through FIG. 56 are flow charts of ways the system might execute objective A in FIG. 13. Here objective A is to find out where it is raining right now in Japan. The beneficiary who is requesting the objective is the server for the weather information center. Server 1305 for the weather information center is using an indirect technique to acquire the data it wants. It will use the sensor data from cars now on the highway indicating whether their windshield wipers are operating to infer what the weather is in that locality. Starting from the left, the diagram shows a time series chart of the processing executed by: the beneficiaries server 1305 for the weather information center; objective specification server 3500 and information mediation server 3600 in the mediation server group; and car 1301, the provider. Car 1301 corresponds to the car whose hardware was diagrammed in FIGS. 45 and 51. The objective is the one shown in FIG. 21. In the real world, the provider would not be a single car but many cars. In the example, however, we show the relationship between one of these, car 1301, and beneficiary 1305, objective specification server 3500 and information mediation server 3600. Servers 3500 and 3600 are members of the server group 3300 which constitutes the mediator, as shown in FIG. 33. In the following we shall explain step by step the processing that is being executed simultaneously at any given time.

First, beneficiary 1305 checks whether an instruction was input to find out where it is raining. It selects the objective of obtaining data on where it is raining, appends validation data, and sends the objective specification server the objective of finding out where it is raining right now in Japan. The reason for appending validation data, as we discussed earlier, is to insure that this beneficiary is indeed the server for the weather information center. In Step 5361, the provider, car 5360 (sic), checks whether a specified period of time has elapsed. The car in this case is sending information as an independent provider, as shown in FIG. 3. If the specified period of time has elapsed, in Step 5362 the car's current position is obtained from the position detector, validation data are appended, and all these data are sent to the mediation server. The current position is obtained from the GPS. In Step 5341, mediation server 3600 verifies the identity of the provider using the validation DB. In Step 5342, it stores the data it has received in the DB for acquired data. In Step 5321, objective specification server 3500 verifies the identity of the beneficiary by searching the validation DB. This certifies that the beneficiary is a terminal which is legally entitled to participate. In Step 5322, server 3500 modifies the objective it received using the knowledge DB. In other words, as can be seen in FIG. 21, it processes the specified objective in order to break it down into a set of modified objectives. This is necessary so that the next stage, mediation server 3600, can match objectives against data in the data base. Server 3500 sends the modified objective to the mediation server. When mediation server 3600 receives data from a provider, in Step 5341, just as in Step 5321, it first verifies the identity of that provider using the validation DB. In Step 5342, it stores the data it has acquired in the DB for acquired data.

Through the processing described above, mediation server 3600 acquires all the necessary data from beneficiary 1305 and provider 5360. It then begins the actual mediation processing. In Step 5343, mediation server 3600 extracts from the current positions of cars stored in the DB for acquired data providers appropriate for the geographical condition. Here the providers would be limited to cars currently in the targeted region. In Step 5344, the server requests data from the extracted providers on whether their windshield wipers are operating. In Step 5663, the electronics units of the cars which are the providers acquire data indicating whether their windshield wipers are on. They append validation data and transmit the entire data set to the mediation server. When the mediation server receives these data, in Step 5345 it verifies the identity of the provider using the validation DB and certifies that it has been authenticated. In Step 5346, it cumulates, from the data it has received, the operating state of the windshield wipers of all the cars which meet the geographic condition. In Step 5347, the server determines, based on the result of this accumulation, whether it is raining in the region in question. In Step 5348 it maps the result of its determination and sends it to the beneficiary. The question of how much the mediation server should process the data must be decided on the basis of finding an appropriate level of added value. In Step 5303 the beneficiary, i.e., the server for the weather information center, stores the data it has received in a DB. In Step 5304, it executes the objective of the weather information center based on these data. After the mediation server transmits the result of its determination, in Step 5349 it sends that result and an "objective completed" message to the fee mediation server. In Step 5350, it cancels the completed objective. The processing is now finished.

In the above discussion, we concentrated our attention on the information mediation processing. When that processing is completed, the fee is processed. All charges and payments are totaled and a statement is processed at regular intervals.

In the example above, we posited that the weather information center was the beneficiary and the cars on the highway were the providers. However, as has been discussed, in the information mediation system related to this invention, the beneficiaries and providers may reverse roles according to the objective. For example, to use the weather-related example again, let us assume that one of the cars has specified to the mediation server the objective of finding out what the weather is like in the area where he is headed. If the mediation server provides weather data from the weather information center to the car, the roles are reversed. The car is now the beneficiary and the weather center is the provider. The car will pay a fee, and the weather center will receive a payment. Here, as was discussed above, the positions of beneficiary and provider are reversed by a new objective being specified.

The Flow of Information Back and Forth among Beneficiaries, the Mediation Server and Providers (Example 2)

Figure 57:
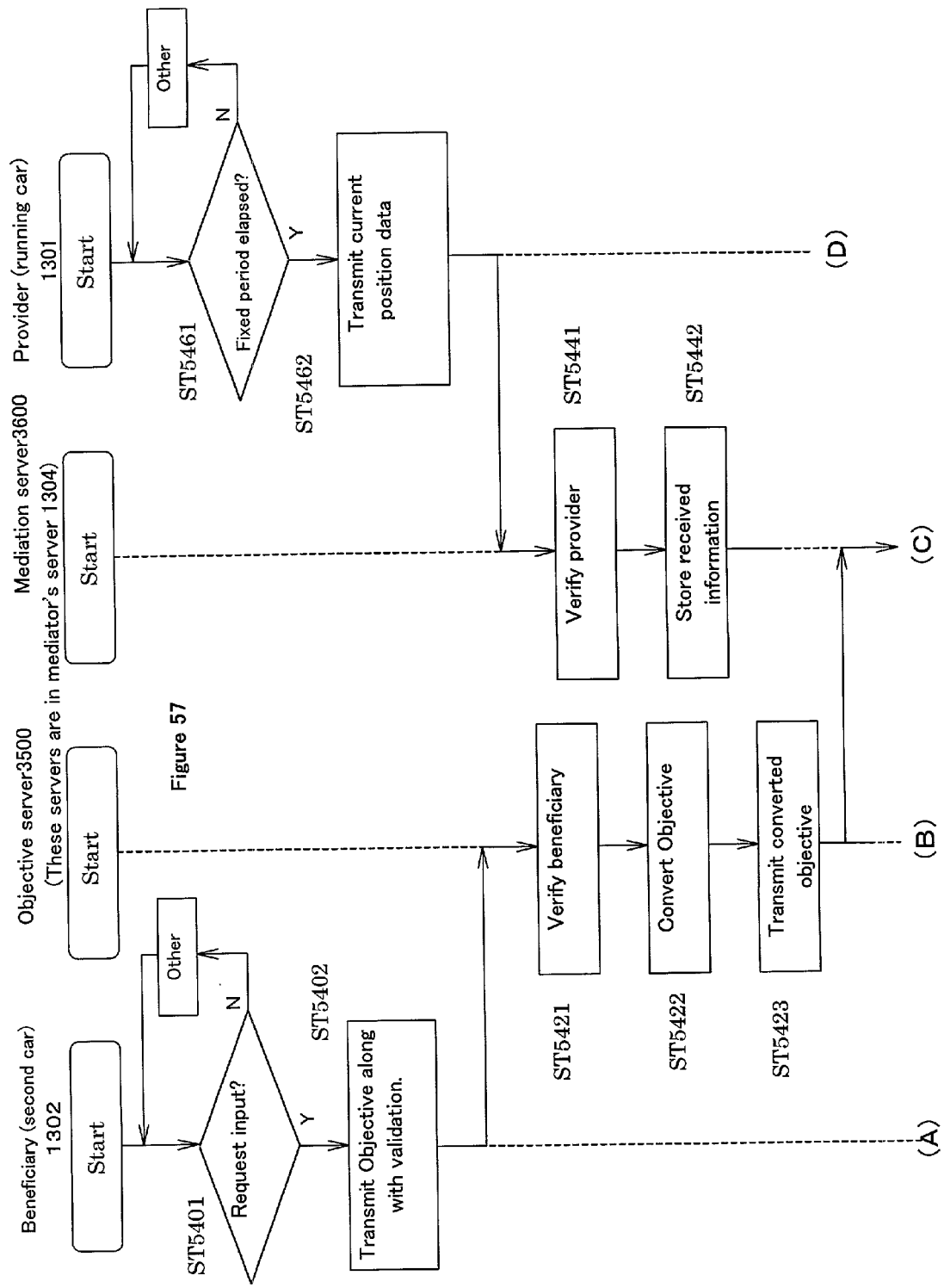
FIG. 57 is a flow chart to execute objective B in FIG. 13.
Figure 58:
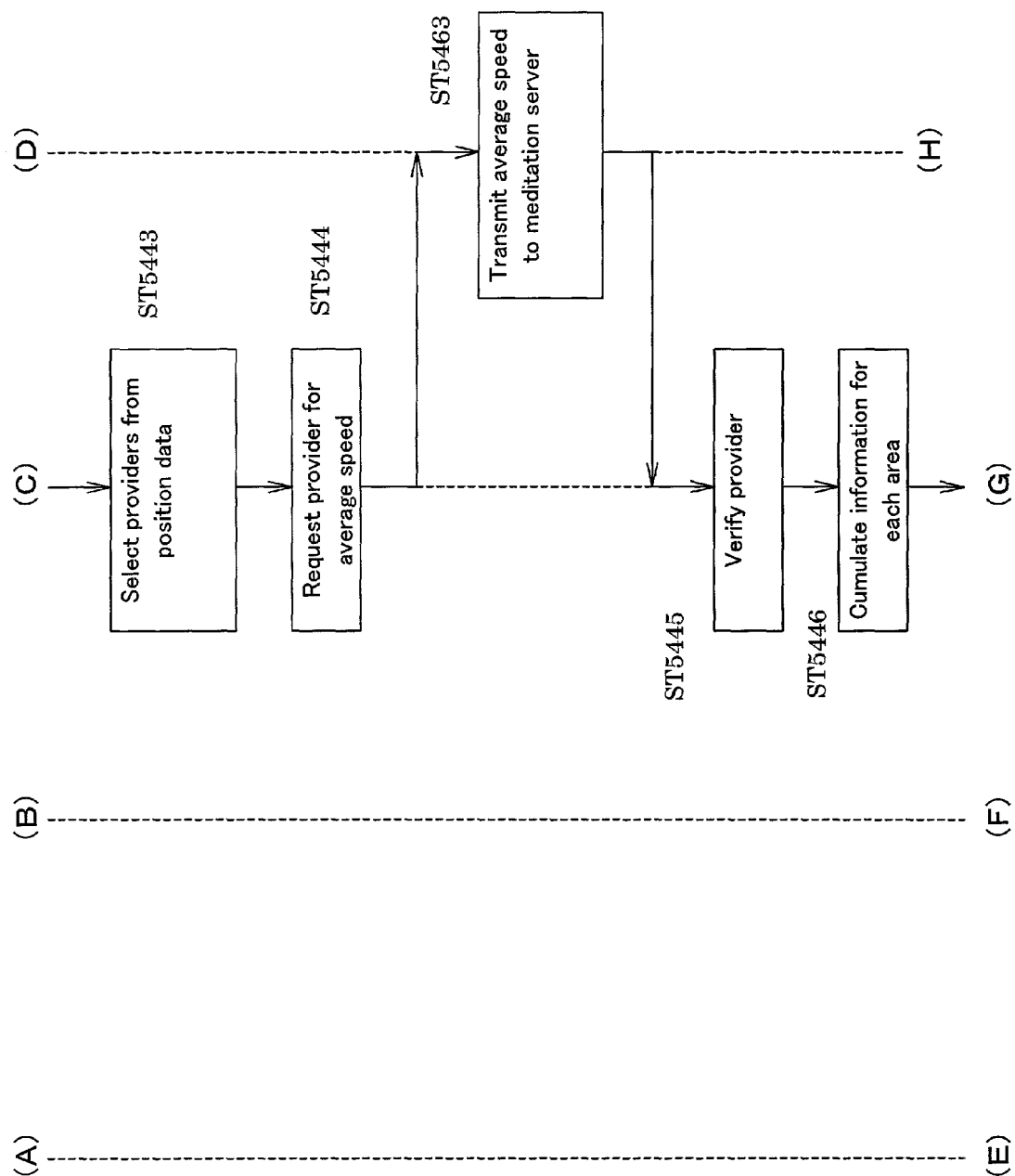
FIG. 58 is a flow chart to execute objective B in FIG. 13.
Figure 59:
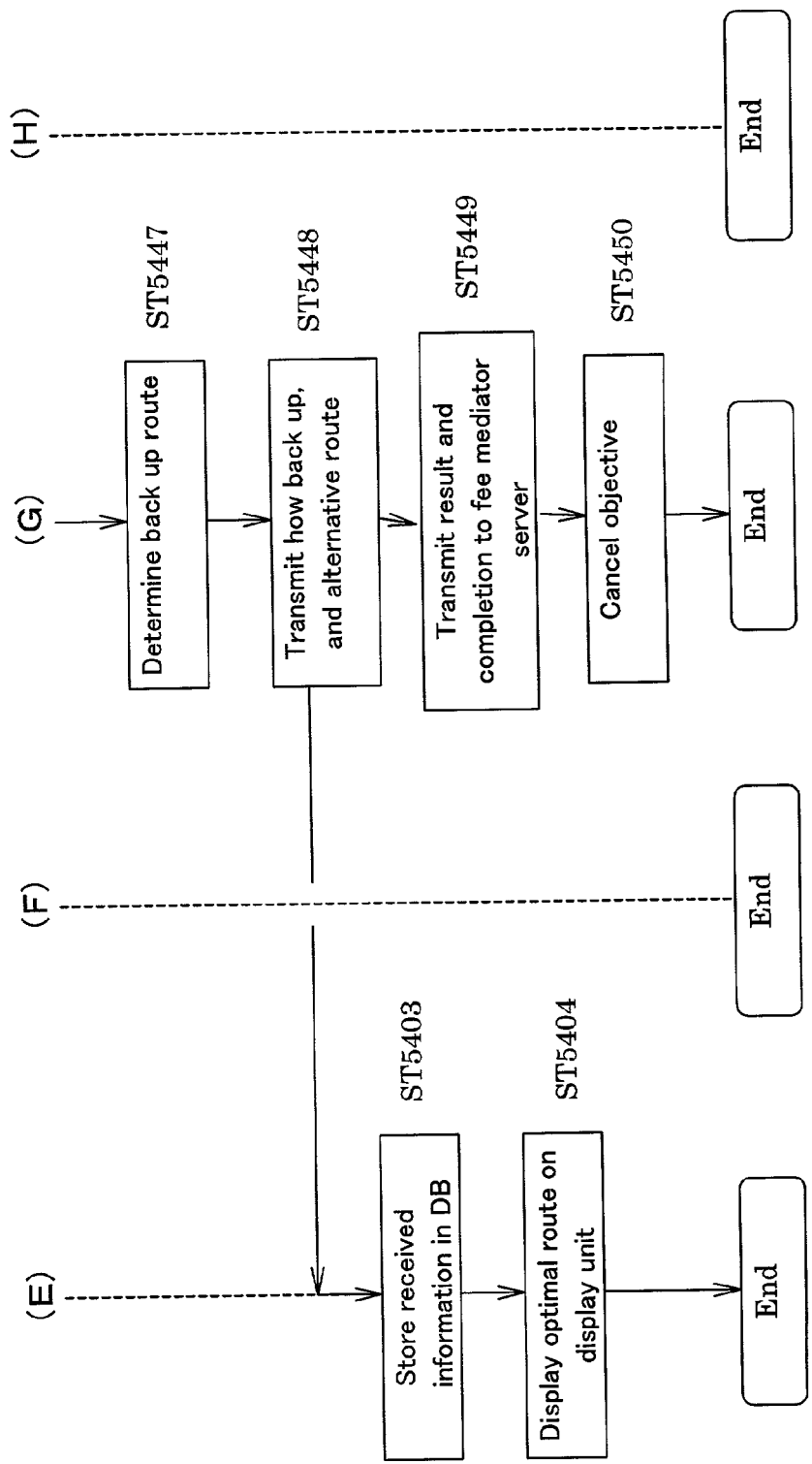
FIG. 59 is a flow chart to execute objective B in FIG. 13.

FIG. 57 through FIG. 59 are a flow chart of the execution of objective B in FIG. 13. Objective B here was to find out if traffic was backed up in the direction the car was going. The beneficiary who specifies the objective here is car 2. The provider is car 1, which is now traveling in the area ahead of car 2. The mediation server obtains the average speed of car 1 and from this speed infers how well the traffic is flowing in that area. It thus uses an indirect method to determine whether the traffic is backed up. Starting from the left, the diagram shows a time series chart of the processing executed by: the beneficiary, car 1302; objective specification server 3500 and information mediation server 3600 in the mediation server group; and car 1301, the provider. Cars 1301 and 1302 correspond to the cars whose hardware was diagrammed in FIGS. 45 and 51. The objective is the one shown in FIG. 23. In the real world, the provider, car 1301, would not be a single car but many cars. In the example, however, we show the relationship between one provider and beneficiary 1302, objective specification server 3500 and information mediation server 3600. We shall explain step by step the processing that is being executed simultaneously at any given time.

In Step 5401, beneficiary 1302 checks whether an instruction has been input to acquire data on traffic conditions. If it has, in Step 5402 it appends validation data to the objective, finding out the traffic conditions ahead, and sends these data to the objective specification server. The reason for appending the validation data is to enable the different servers to check whether the data are from a terminal which has a legal right to participate. Car 1301, the provider who is traveling in the area ahead of car 1302, the beneficiary, checks in Step 5461 to see if a specified period of time has elapsed. It does this because it is an independent provider, as shown in FIG. 3. If the specified period has elapsed, In Step 5462 the position location unit obtains the car's current position, appends validation data and sends the lot to the information mediation server. In other words, data indicating the position of the first car, the provider, are posted to the mediation server at regular intervals.

In Step 5441 information mediation server 3600 verifies the identity of the provider using the validation DB. In Step 5442, it stores the data it has received in the DB for acquired data. In the real world, position data from many cars would be stored in the DB for acquired data in the information mediation server and data would be selected and used as needed.

Figure 23:
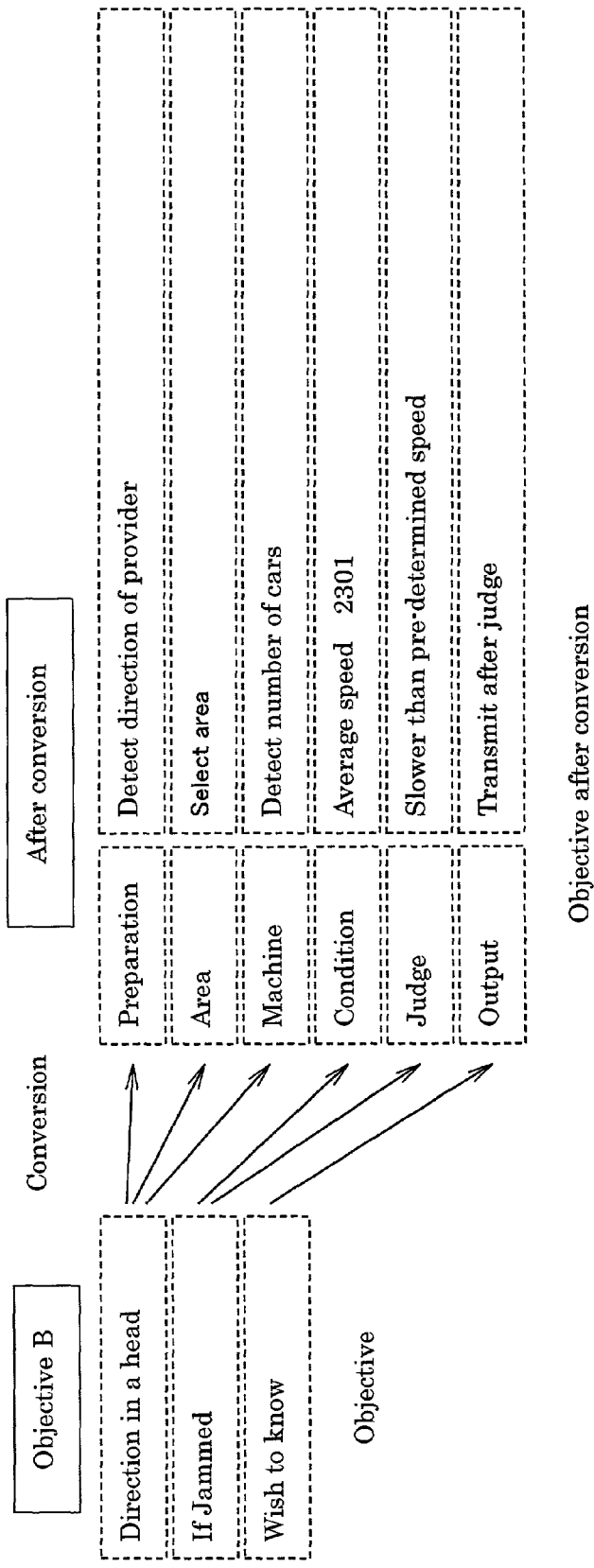
FIG. 23 is a block diagram which illustrates how the objective specification is processed in the information mediation system according to this invention.

In Step 5421, objective specification server 3500, which receives the objective from the beneficiary, verifies the identity of the beneficiary by looking in the validation DB. In Step 5422, it modifies the objective it has received using the knowledge DB. The objective is broken down into its main elements, as is shown in FIG. 23, and the goodness of fit is judged for the data from each provider. In Step 5423, the modified objective is sent to the information mediation server.

In the processing which we have described, information mediation server 3600 has completed the acquisition of data from beneficiary 1302 and provider 1301. Thereafter, it executes the information mediation processing which is its main function. In Step 5443, the server extracts suitable providers for the geographic condition from the current positions of cars stored in the acquired data DB. The geographic condition refers to the area ahead of car 2 which was specified in the objective. In Step 5444, the server requests average speed data from the providers it has extracted. In Step 5463 Car 1301, the provider, calculates its average speed based on the rpm of its driving wheel. It appends validation data and sends the data set to the information mediation server. The traffic conditions can be inferred from this average speed. In Step 5445, the mediation server verifies the identity of the provider using the validation DB. In Step 5446 it cumulates the data it has received for each geographic condition. That is, it cumulates the data from the many cars 1301 which are the providers. Remember that although the diagram shows only one car 1301 for the sake of convenience, in the real world data are sent from many providers.

In Step 5447, the server determines, based on the cumulative result, whether the chosen route is backed up, and in Step 5448 it sends the beneficiary data indicating how backed up the traffic is and suggestions of alternate routes. This information is produced by a program in the server. In Step 5449, the information mediation server sends the result it has transmitted and an "objective completed" message to the fee mediation server. In Step 5450, it cancels the completed objective, thus completing the information mediation processing. In Step 5403, the beneficiary stores the data which the information mediation server has sent in a DB. In Step 5404, as will be discussed shortly, the beneficiary displays the optimal route on its display means based on the data it has received.

Example of a Terminal

As has been discussed, the beneficiary in the information mediation system according to this invention has a display with specific functions which is used to input objective specifications and display specification data when it acquires them. FIG. 60 through FIG. 65 show an example of a beneficiary's terminal. FIG. 66 shows an example of what might appear on a provider's terminal.

Figure 60:
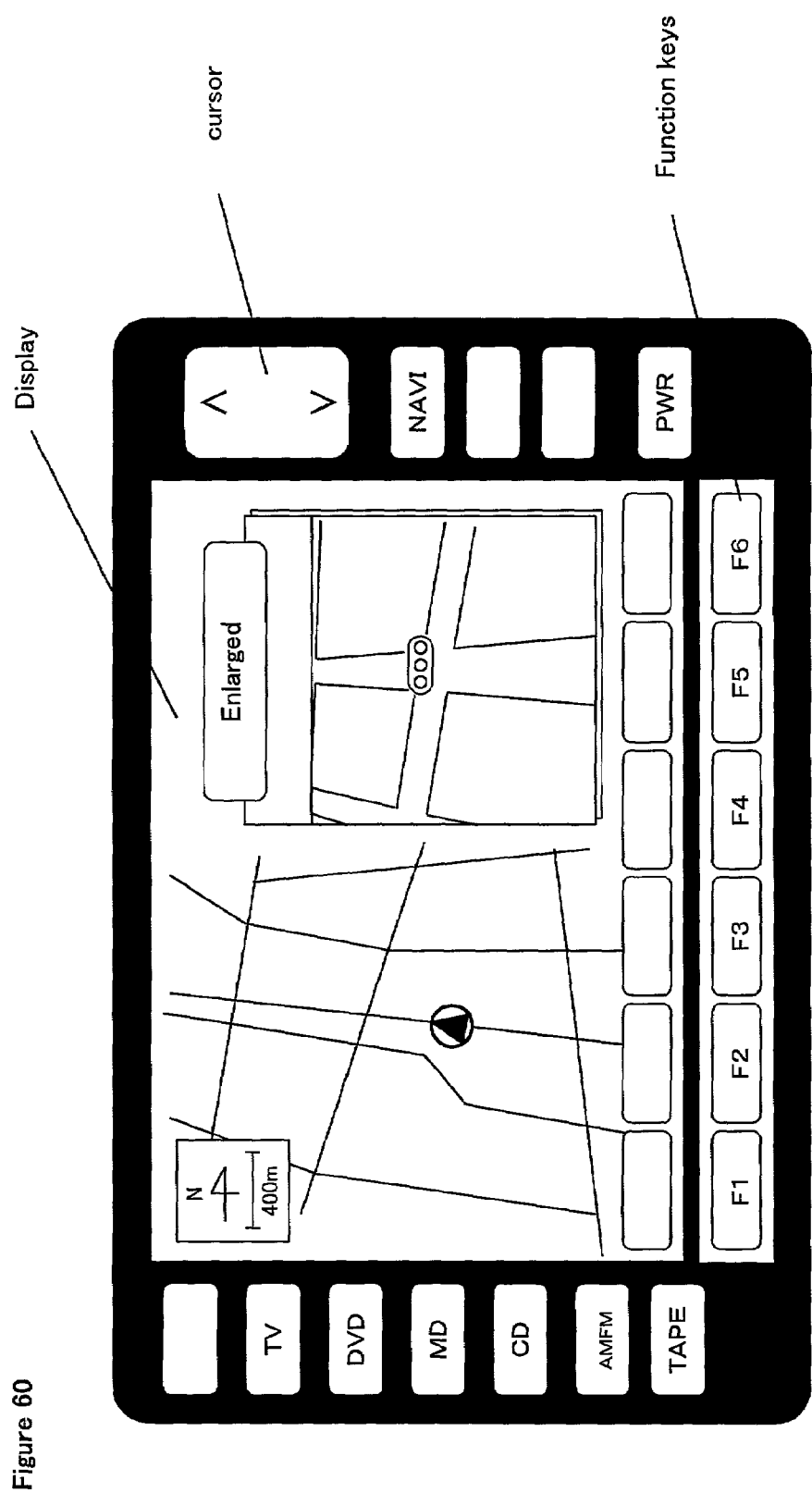
FIG. 60 is a realistic example of the machine or device for the beneficiary shown in FIG. 57 through FIG. 59.

FIG. 60 is a realistic example in which the beneficiary shown in FIG. 57 through FIG. 59, i.e., the machine or device installed in the second car which wanted to know whether the traffic was backed up, is used as an on-board navigation system. In the information mediation system according to this invention, each participant at some times plays the role of beneficiary and at other times that of provider. Here the beneficiary has a terminal with the same display and function keys as a car navigation system. This terminal is one of the special functions 4403 of the machine or device in FIG. 45. It is installed in machine or device 4400.

Such a terminal may be used for a variety of purposes, from merely finding out how crowded a given route is to determining the best route with the help of a car navigation system. The terminal pictured in FIG. 60 through FIG. 65 is being used to decide on a route with the help of car navigation. The content shown on the display is identical to what would appear on an existing car navigation system.

Figure 61:
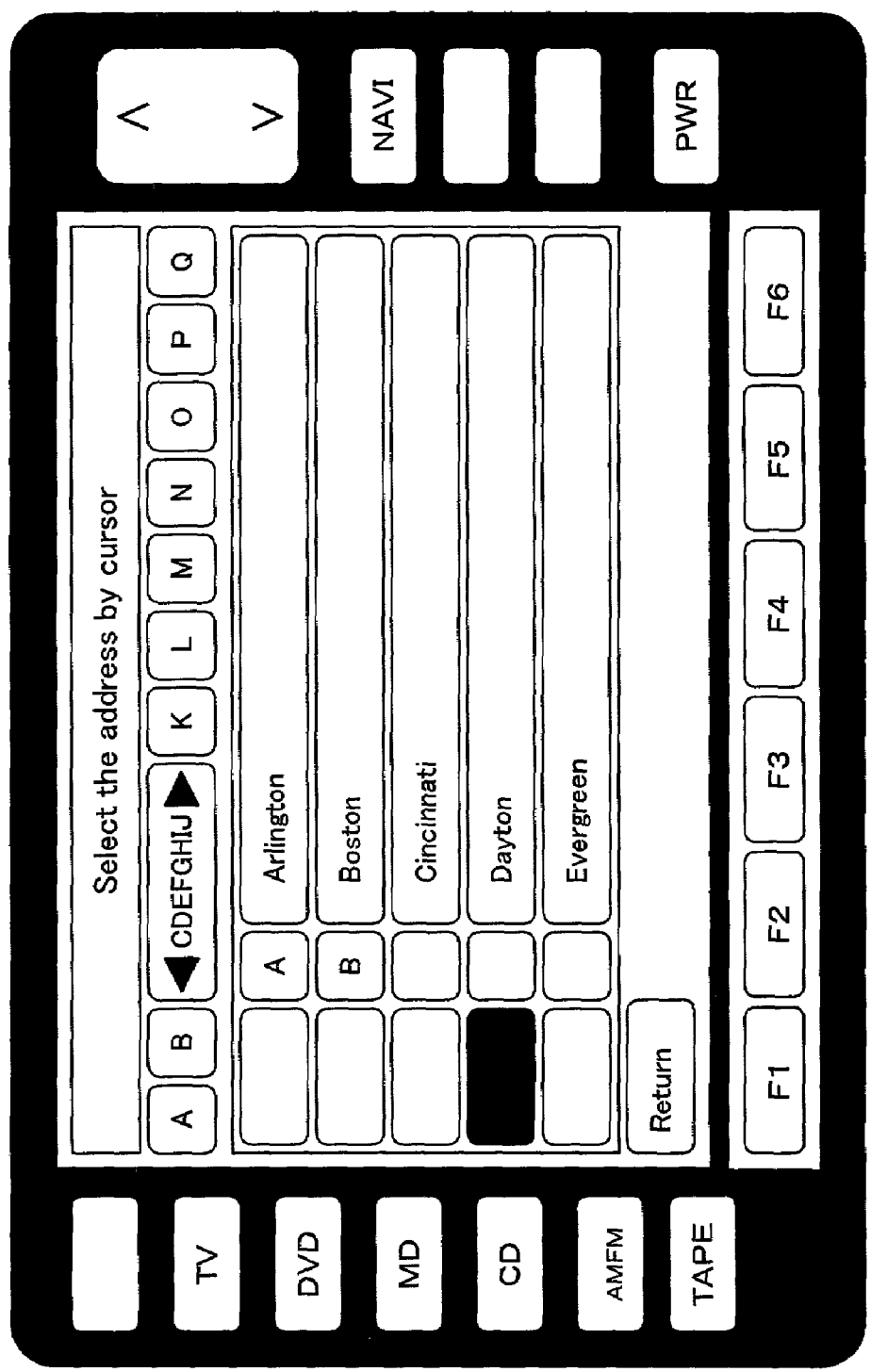
FIG. 61 is a realistic example of the machine or device for the beneficiary shown in FIG. 57 through FIG. 59.

FIG. 61 is a drawing of the actual screen which would appear if the driver had pressed F1 (Menu) in FIG. 60. This screen allows the driver to indicate the name of his destination. The beneficiary selects his destination by choosing a place name from a set which he himself stored earlier. This screen is also one which would appear in an existing car navigation system.

Figure 62:
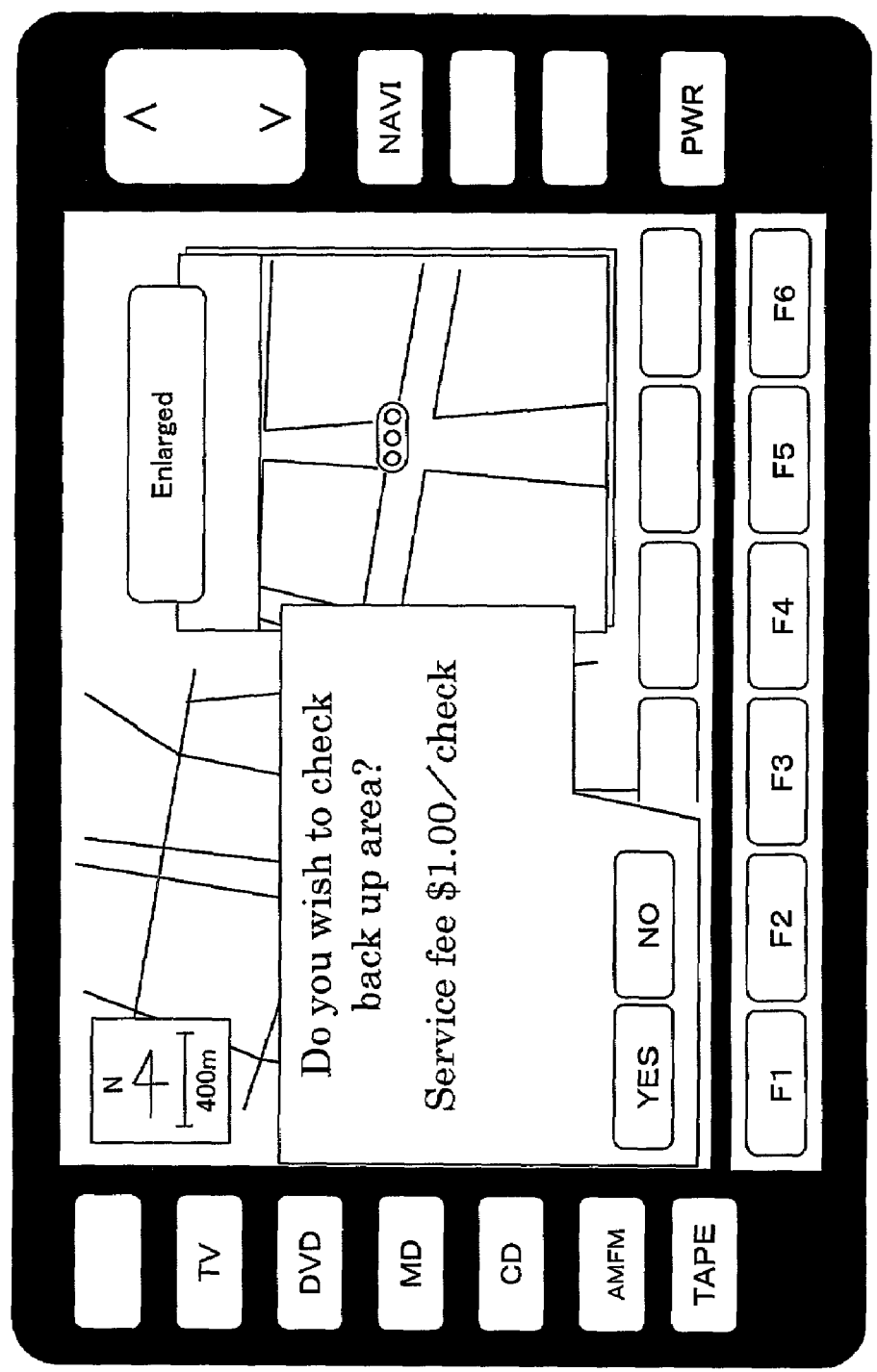
FIG. 62 is a realistic example of the machine or device for the beneficiary shown in FIG. 57 through FIG. 59.

FIG. 62 is a drawing of the actual screen which would appear to ask the driver or passenger in the car which is the beneficiary (i.e., the second car, which wanted to know if the traffic was backed up shown in FIG. 57 through FIG. 59) whether he wishes to specify an objective to the information mediator. The screen asks for verification of the request.

Figure 63:
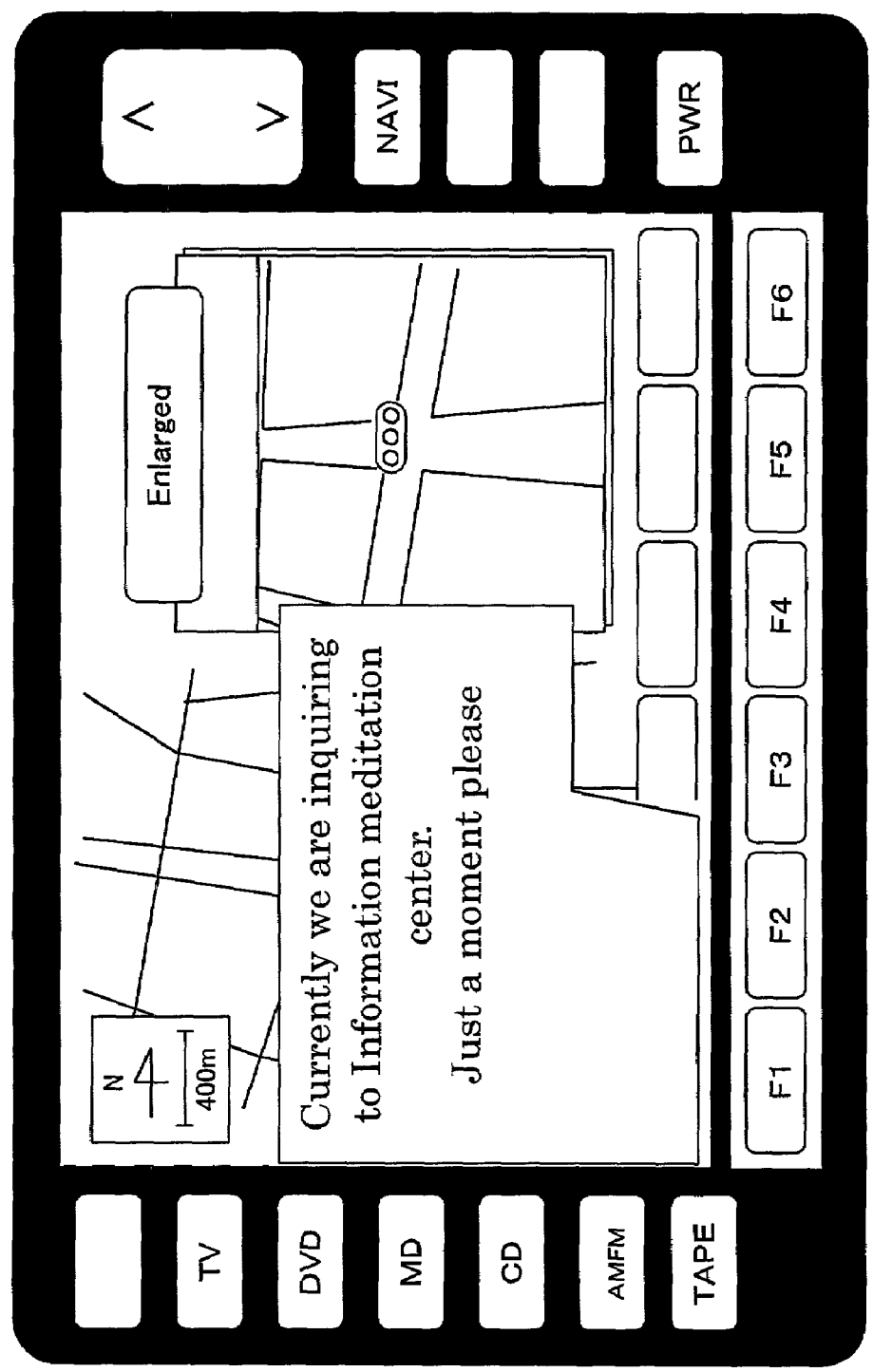
FIG. 63 is a realistic example of the machine or device for the beneficiary shown in FIG. 57 through FIG. 59.

FIG. 63 is a drawing of the actual screen which would appear telling the driver to stand by while the objective specification shown in FIG. 62 is sent to the information mediator.

Figure 64:
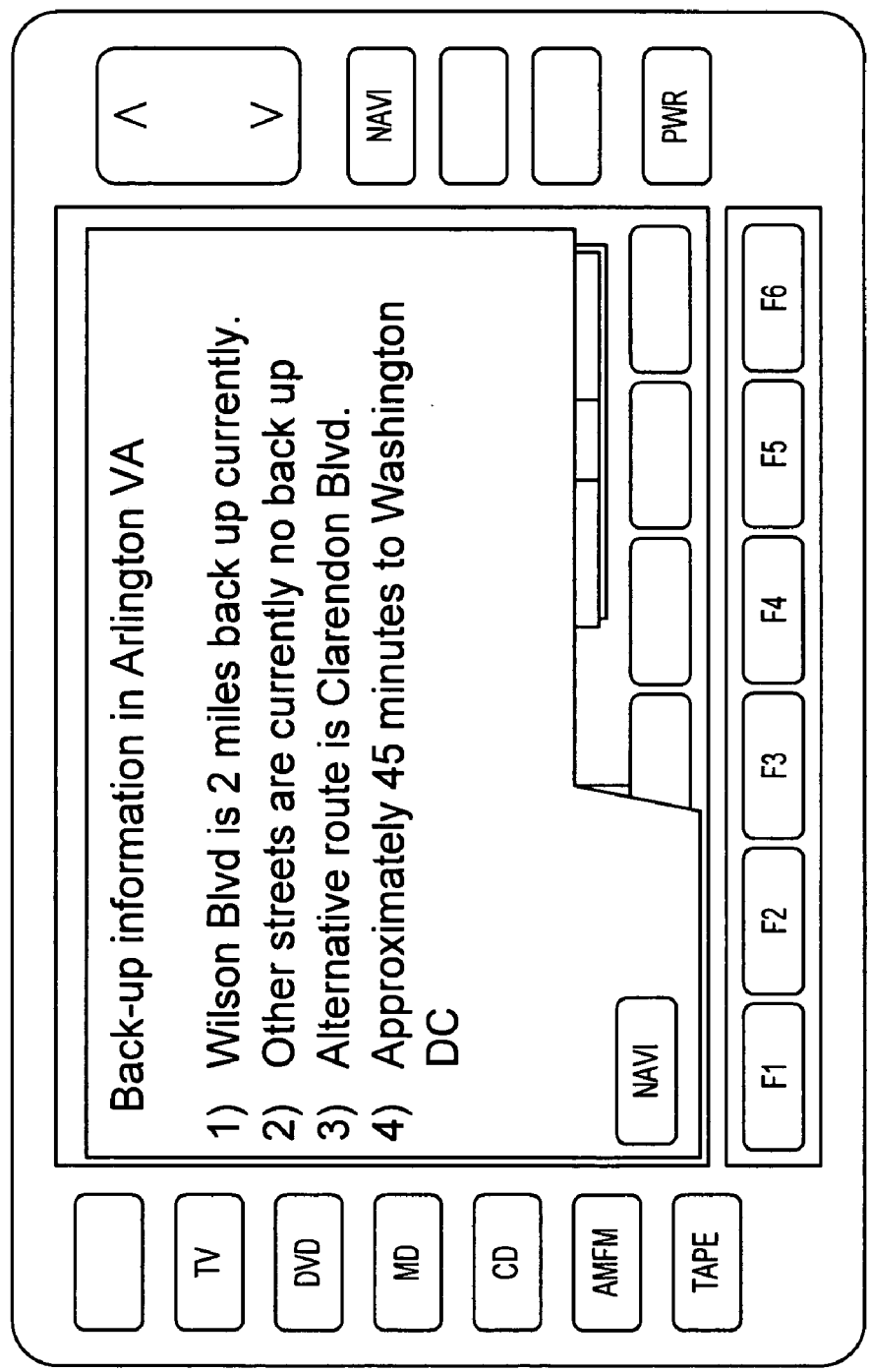
FIG. 64 is a realistic example of the machine or device for the beneficiary shown in FIG. 57 through FIG. 59.

FIG. 64 is a drawing of the actual screen which would appear in a car navigation system for the information beneficiary shown in FIG. 57 through FIG. 59 to display the information obtained from the mediation system according to this invention (in this case, information concerning how backed up the traffic is between the current position and the destination).

Figure 65:
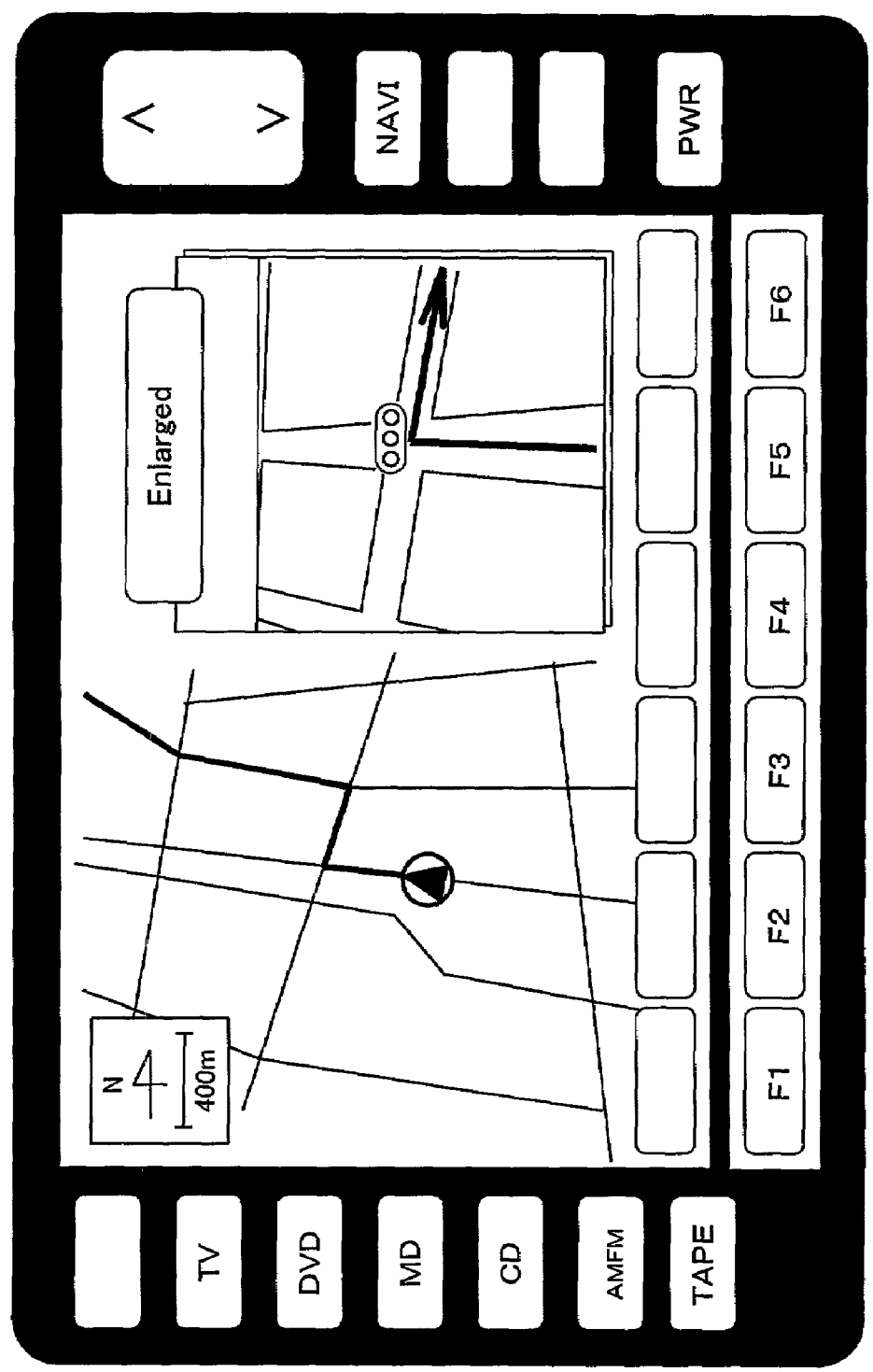
FIG. 65 is a realistic example of the machine or device for the beneficiary shown in FIG. 57 through FIG. 59.
Figure 66:
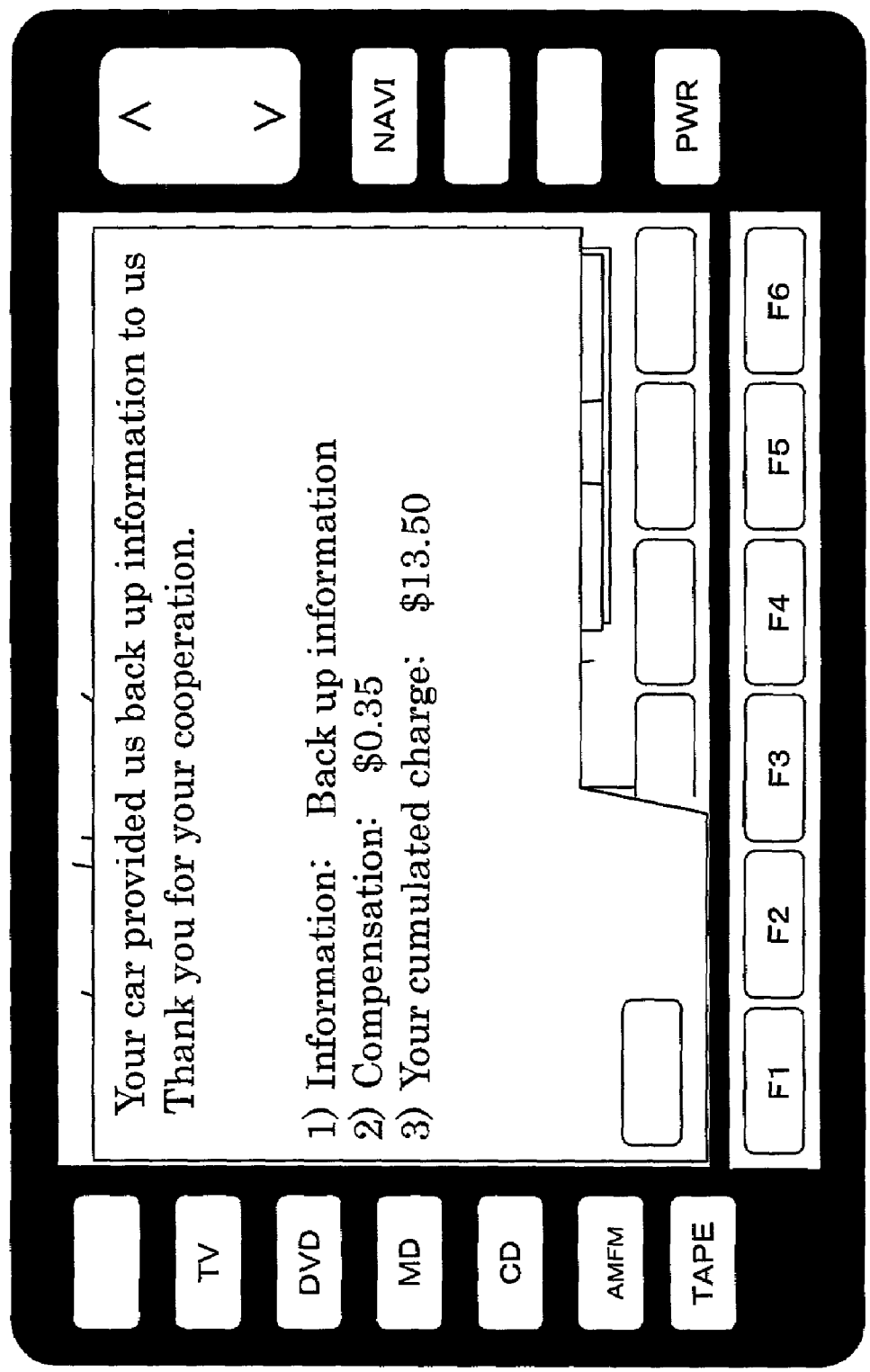
FIG. 66 is a realistic example of the machine or device for the beneficiary shown in FIG. 57 through FIG. 59.

FIG. 65 is a drawing of the actual screen which would appear in a car navigation system for the information beneficiary shown in FIG. 57 through FIG. 59 to display the recommended route based on information obtained from the mediation system according to this invention.

FIG. 66 is a drawing of the actual screen which would appear in a car navigation system for the information provider shown in FIG. 57 through FIG. 59 to display the amount paid to the provider (compensation) and the cumulated fees (cumulative fee) shown in FIG. 10. As has been discussed, in the information mediation system according to this invention the roles of beneficiary and provider change according to the objective. Thus each terminal must be able to provide both functions. The screen shown in FIG. 65 displays content aimed at the beneficiary. In FIG. 66, the driver has become the provider. The screen, on the same terminal that communicated with the beneficiary, now shows the compensation paid to the provider. In this example, instead of the information for the beneficiary displayed in FIGS. 60 through FIG. 65, this screen is displayed if the driver has not received any information but is being compensated ¥3.2 for the information he has just provided and has accrued a credit of ¥130 so far. Naturally, if the machine or device has been getting information as a beneficiary, he will have been charged for it, and his account will be debited. If he has been providing information, he will have been paid compensation for it and his account will be credited. This, in fact, is the distinguishing feature of the current invention: the fact that the same device can, according to circumstances, be both a beneficiary and a provider.

Machines and Devices with a Read-Write Unit as the Memory (Other Preferred Embodiments)

Figure 67:
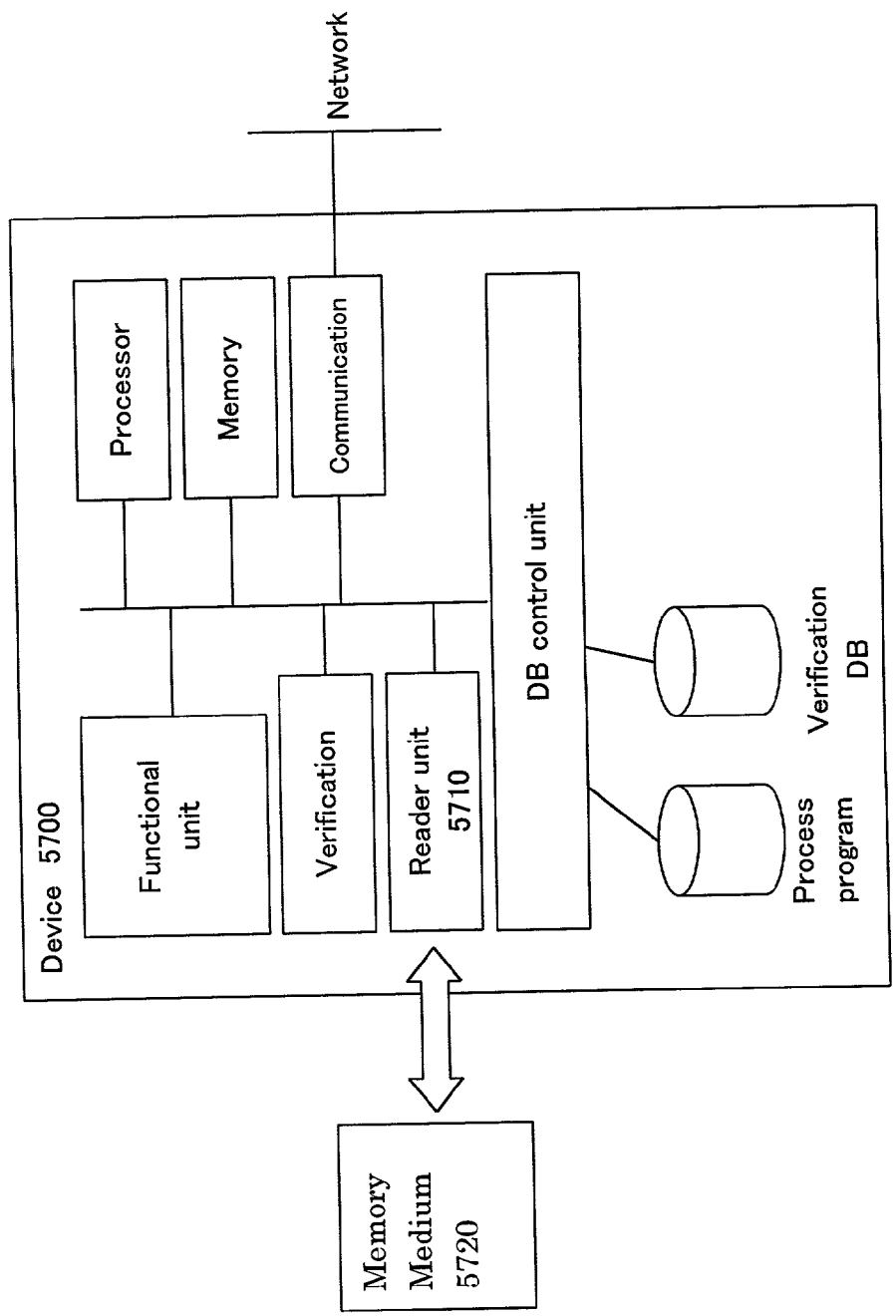
FIG. 67 is a block diagram of the hardware in machine or device.

FIG. 67 is a block diagram of the hardware in machine or device 5700, another embodiment of this invention, which has a readwrite unit 5710 as the memory medium of machine or device 4400 in FIG. 45. Memory medium 5720 is the medium which stores data which machine or device 5700 has acquired. It might, for example, be an IC card. This might be used to subtract the beneficiary fee or add the provider compensation shown in FIG. 60 through FIG. 65. If employed to subtract beneficiary fees, it would function in the same way as a prepaid card. To add provider compensation, it would be used like a debit card. If memory medium 5720 could also be used for general purchases (i.e., to pay for other transactions), its utility would be enhanced. If the memory medium does not have the capability of being used to pay for general purchases, it should still be able to be credited or debited in an ATM machine by accessing the information mediator's account and adding or subtracting the amount recorded on the card.

Figure 68:
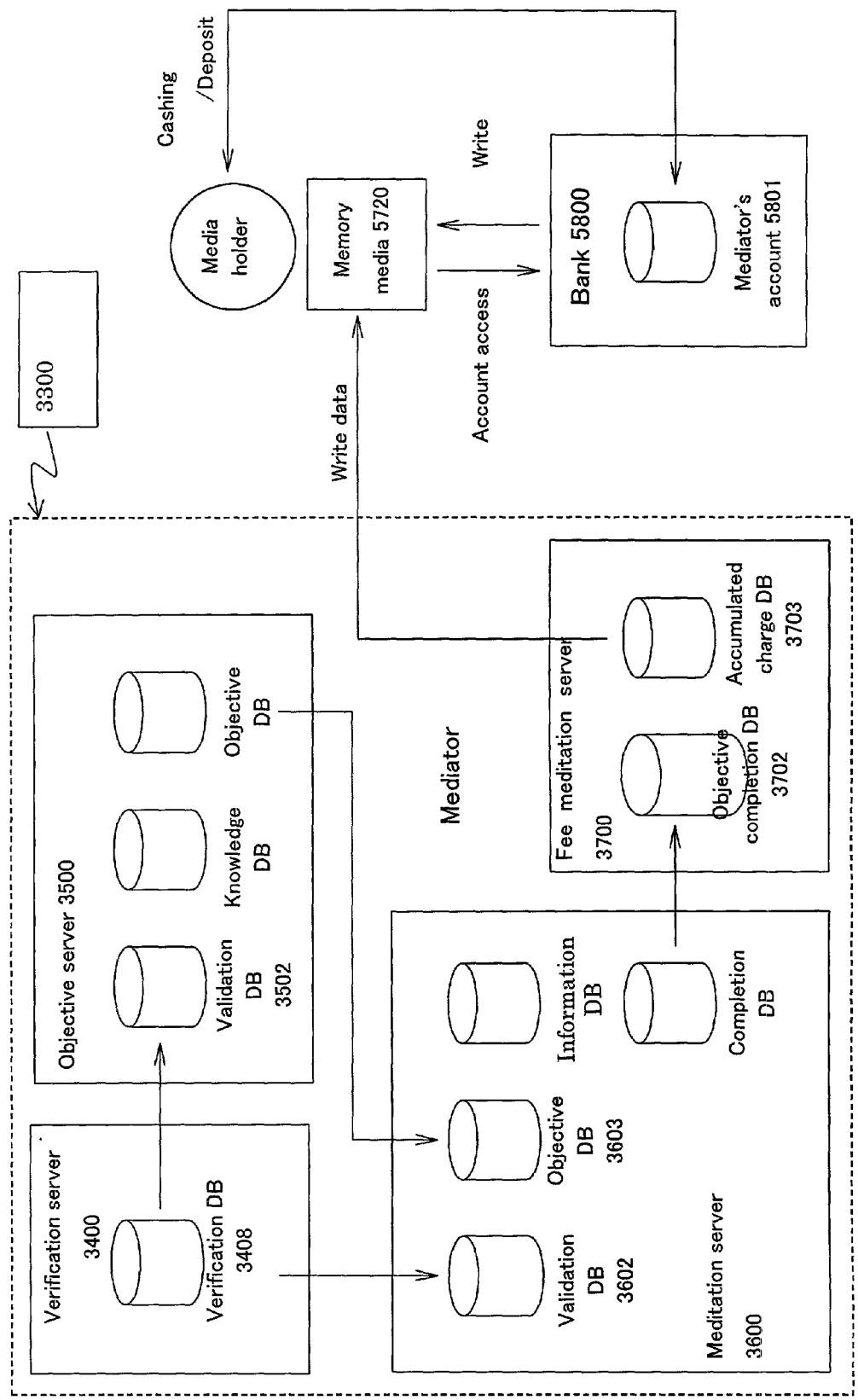
FIG. 68 is a block diagram which illustrates the flow of information between the DBs for the various servers and the memory medium.

FIG. 68 is a block diagram which illustrates the flow of information between the DBs for the various servers and the memory medium when a memory medium 5720 like that described above is used. This diagram is an additional illustration of the embodiment in FIG. 67. It shows the entire configuration involved in paying off a charge recorded on the memory medium in the mediator's bank account by using an ATM machine. This contrasts with the method shown in FIG. 44, in which a memory medium was not used.

First, the verification data for the machine or device belonging to the beneficiary and provider are sent from validation DB 3408 in the mediator's server group 3300 to validation DB 3502 in objective specification server 3500 and validation DB 3602 in information mediation server 3600. This must be done to verify the authenticity of the data in each of the servers. As can be seen in FIG. 23, once the objective input by the beneficiary has been modified, it is sent from the DB for the objective specification server to DB 3603 for the information mediation server, the core feature of this invention. There each of the criteria specified in the modified objective is processed separately. Once this has been completed, the next processing occurs when an objective is achieved. At that point, an "objective completed" message is sent from achieved/completed DB 3605 to DB 3702 for fee mediation server 3700. As a result, the fee is calculated, and the cumulated charge is written from DB 3703, the data base for cumulated charges, to memory medium 5720. The person who owns the memory medium accesses the information mediator's account 5801 through ATM or other cash machine 5800 and deposits or withdraws funds. Then data are written onto the memory medium and, in a separate task, the result of the transaction is communicated to the fee mediation server. This series of processes enables withdrawals and deposits to be processed using a memory medium such as an IC card.

Figure 69:
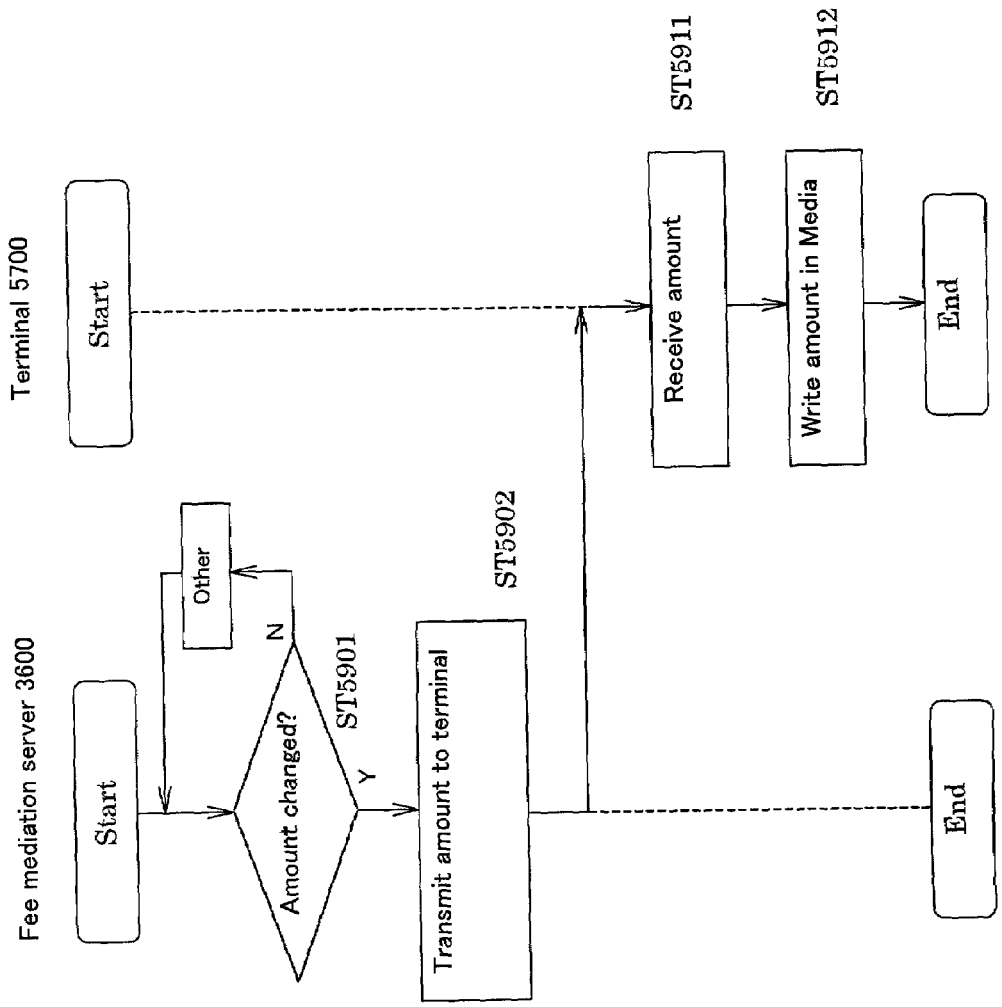
FIG. 69 is a flow chart of the example shown in FIG. 68.

FIG. 69 is a flow chart giving an example of a method which might be used to write data onto memory medium 5720 in FIG. 68. The fee mediation server corresponds to that whose hardware is diagrammed in FIG. 37 and that in the block diagram in FIG. 68. The machine or device corresponds to that whose hardware is diagrammed in FIG. 67 and that in the block diagram in FIG. 68. Data are written onto memory medium 5720 from the cumulated charge DB 3703 shown in FIG. 68 by writing unit 5710 in machine or device 5700.

In Step 5901, fee mediation server 3600 checks whether there has been any change in the cumulated charge. The cumulated charge is decreased or increased if the machine has provided or used data. In Step 5902, if the aforesaid cumulated charge has been changed, the result of the change is sent to the machine or device in question as the limit that can be withdrawn from the information mediator's account. In other words, an amount is determined which is to be paid into the account of the owner of the machine or device in question. In Step 5911 the machine or device 5700 which has experienced a change receives the limit of the amount which can be deducted from the mediator's account. In step 5912, the limit it has received is written onto the memory medium. Thereafter the owner of the machine or device is authorized to withdraw the amount written offline onto memory medium 5720 from an ATM. To put it another way, the cumulated charge written onto the memory medium (e.g., an IC card) is treated as the limit which the owner can withdraw from the mediator's account using a cash machine. If the owner has a positive balance, he can use the memory medium to withdraw that amount and balance his account.

Figure 70:
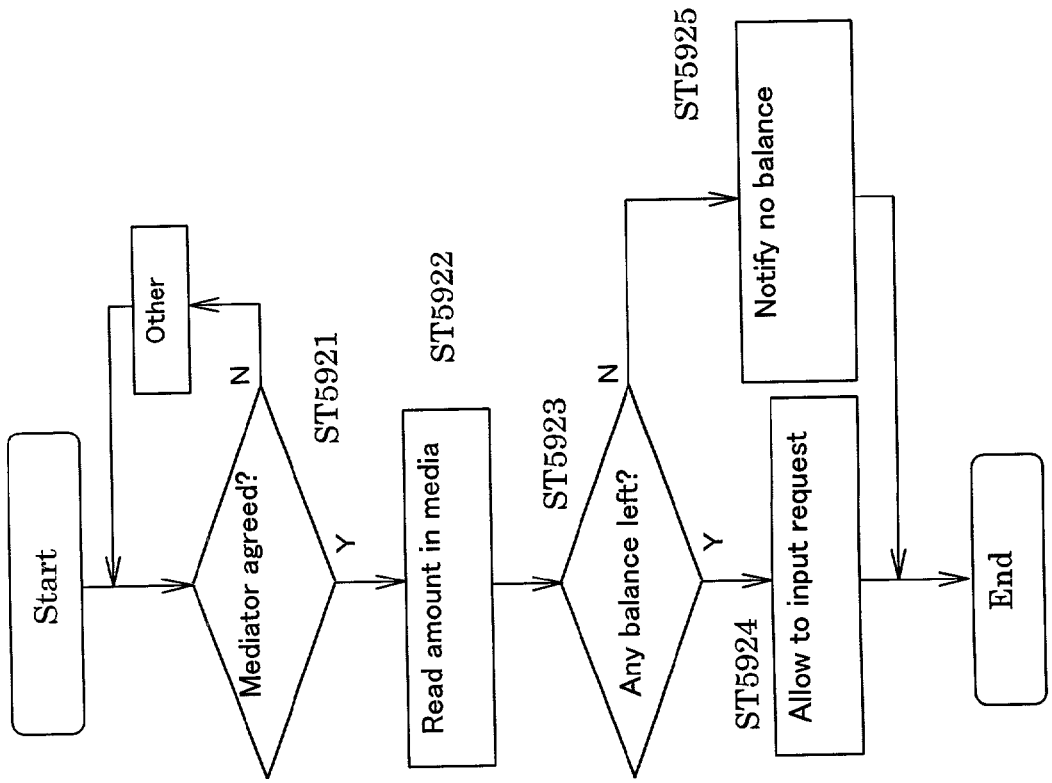
FIG. 70 is a flow chart of the example shown in FIG. 68.

FIG. 70 is a flow chart showing one method by which memory medium 5720 in FIG. 68 might be used to control giving or denying permission to machine or device 5700 when it wishes to enter the system. This flow chart covers processing executed by the operation unit in the machine or device when memory medium 5720 is inserted into that machine or device. This is the same operation unit as in the block diagram of the hardware in FIG. 67 and the block diagram in FIG. 68.

When memory medium 5720 is inserted into machine or device 5700, in Step 5921 the mediation server checks whether there has been a request to use the mediator. It checks, in other words, whether the owner has requested the use of the mediation system which he will pay for using the memory medium. In Step 5922, the server reads the balance recorded on the memory medium. In Step 5923, it checks whether the balance on the memory medium, for example an IC card, is positive. If there is a sufficient positive balance, in Step 5924 it permits the beneficiary to view the beneficiary menu and then proceeds to the input of an objective specification and so forth. If the balance on the card is, say, below the specified beneficiary fee, in Step 5925 the mediation server employs the beneficiary interface to tell the person who input the request that there is no balance on the memory medium, and it refuses to honor the request.

The cumulated charge written onto the memory medium (e.g., an IC card) is treated as the limit which the owner can withdraw from the mediator's account using a cash machine. If the owner has a negative (or zero) balance (or if the balance is not sufficient for the transaction), he can still use the memory medium to pay his beneficiary charge if the mediator takes measures not to recognize this usage.

Figure 71:
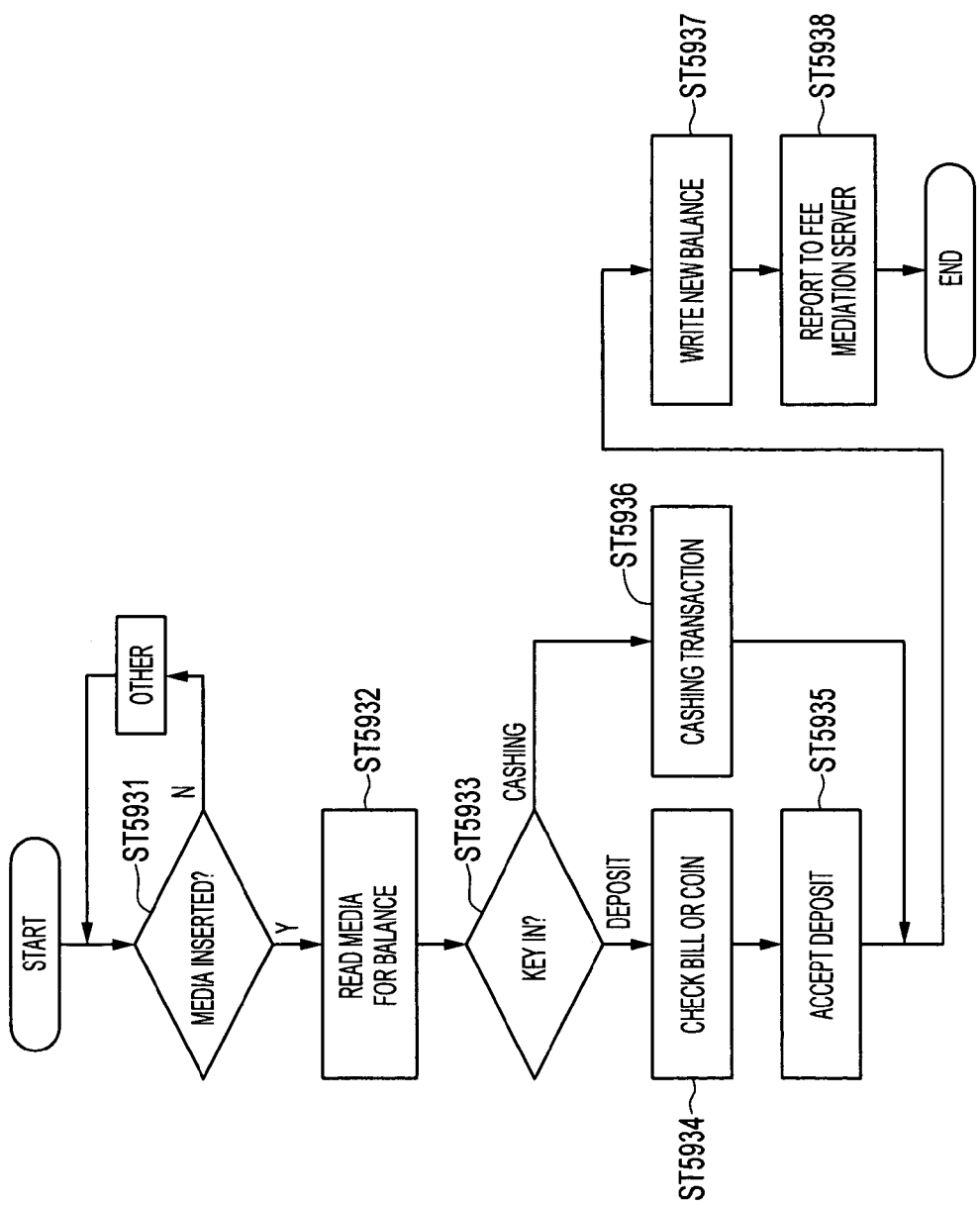
FIG. 71 is a flow chart of the example shown in FIG. 68.

FIG. 71 is a flow chart of the processing which might be executed by the operation unit of a deposit-withdrawal machine such as an ATM serving as the cash machine (including the host processing) in FIG. 68. We have not provided a diagram of the hardware; basically, the machine should have the same configuration as any ordinary ATM. Normally, account data (for the mediator's account) would be stored not in the cash machine, but in the host computer. However, data are written onto the memory medium and processing is executed to deposit or withdraw funds at any ATM terminal. The processing we shall describe does not differ greatly from the normal offline processing in an ATM.

In Step 5931, the terminal checks whether a memory medium has been inserted into its read-write unit. In the case of an ATM, it would check whether a card had been inserted. In Step 5932, the terminal reads the balance recorded on the memory medium. In Step 5933 it checks whether instructions have been input via the input unit, i.e., the keyboard, to deposit or withdraw funds. If there is an instruction to deposit funds, in Step 5934 the terminal determines whether the bills or coins deposited are genuine. In Step 5935, the deposit unit approves the processing of the amount of money whose authenticity has been determined. If there is an instruction to withdraw funds, in Step 5936 the withdrawal unit processes the withdrawal of the amount input via the keyboard up to a previously determined limit. When this deposit or withdrawal processing has been completed, in Step 5937 the terminal updates the balance on the memory medium based on the result of the processing. This is how the new balance is written onto th IC card which is the memory medium. In Step 5938, the terminal sends the result of the processing to the fee mediation server and communicates the new balance.

The output processing executed by the aforesaid withdrawal unit pays out the amount indicated in the withdrawal instruction (from the information mediator's account) as long as it is within the limit recorded on the memory medium. The amount paid out is subtracted from the balance recorded on the memory medium. If the instruction was to deposit funds, the processing pays the amount deposited into the information mediator's account. The amount paid in is added to the balance recorded on the memory medium. In some cases, the amount charged by the cash machine for the transaction may also be withheld.

Figure 72:
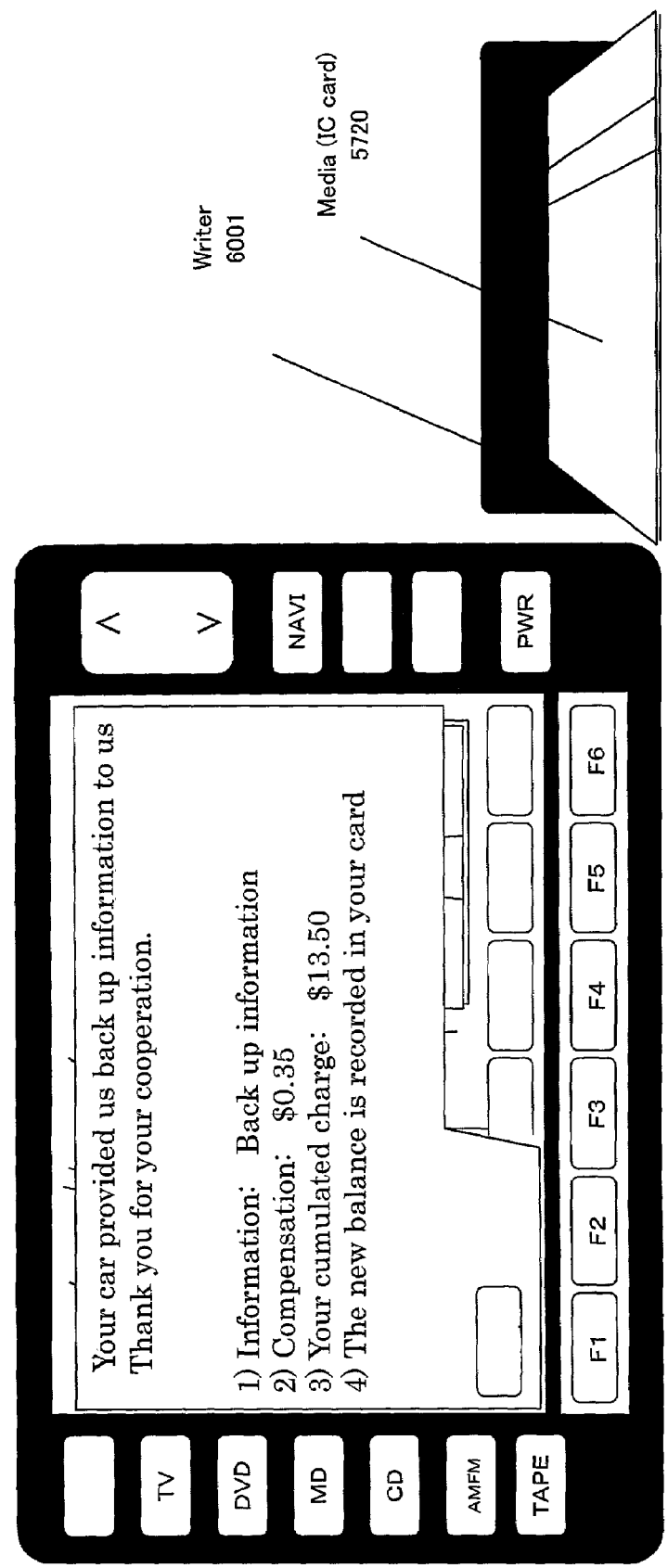
FIG. 72 shows a sample appearance of a machine or device.
Figure 73:
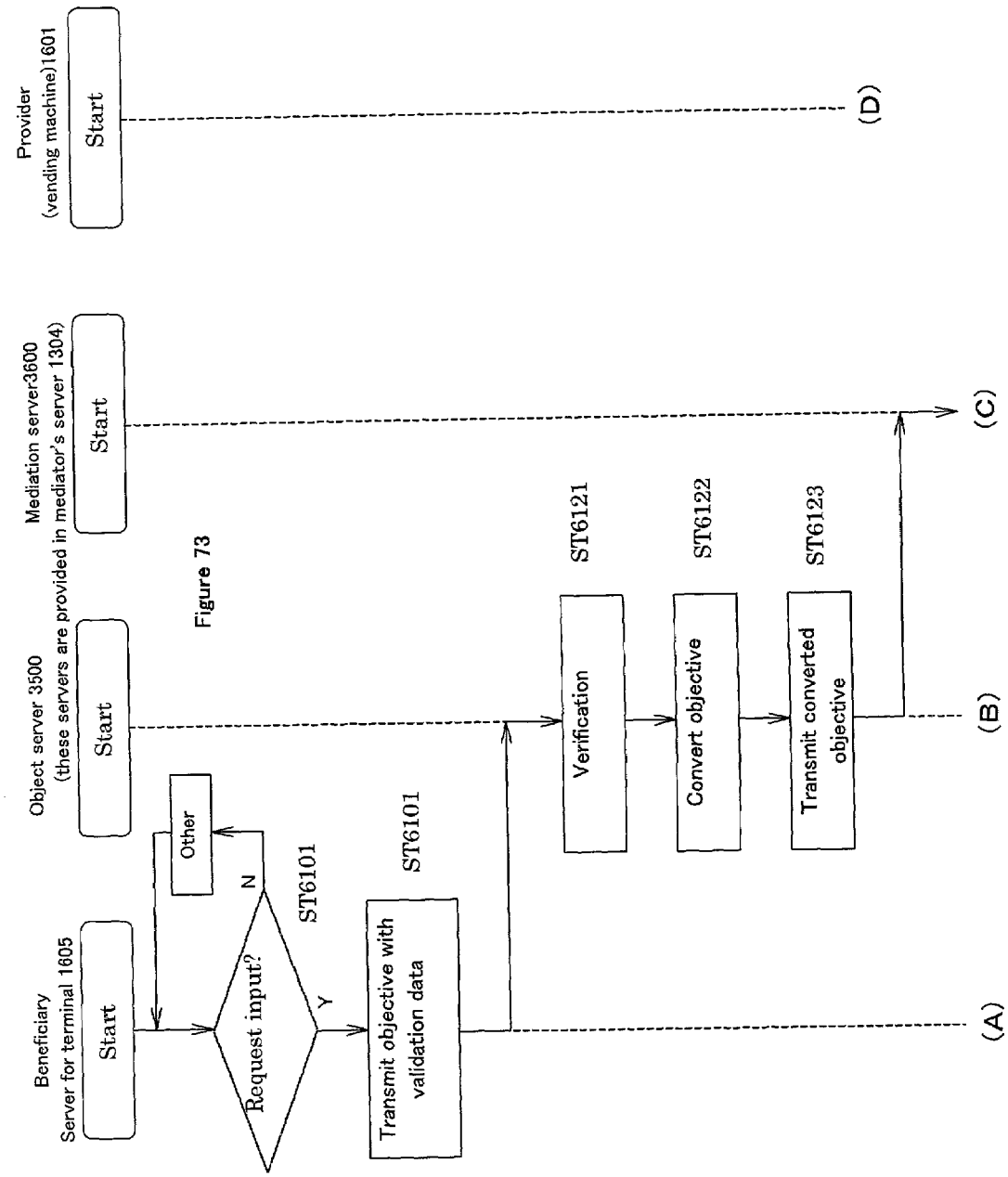
FIG. 73 is a flow chart of the processing for objectives C and D in FIG. 16.
Figure 74:
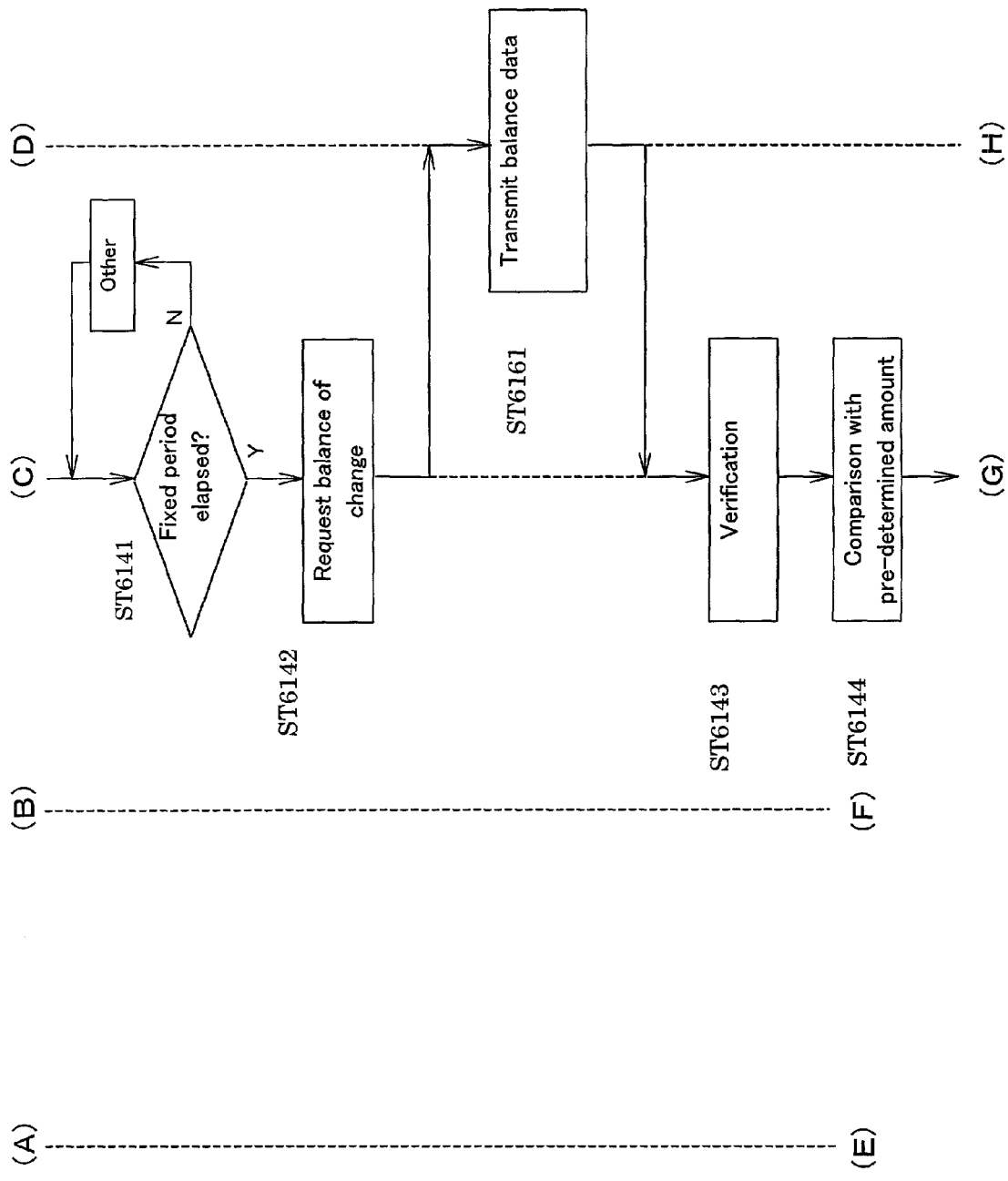
FIG. 74 is a flow chart of the processing for objectives C and D in FIG. 16.
Figure 75:
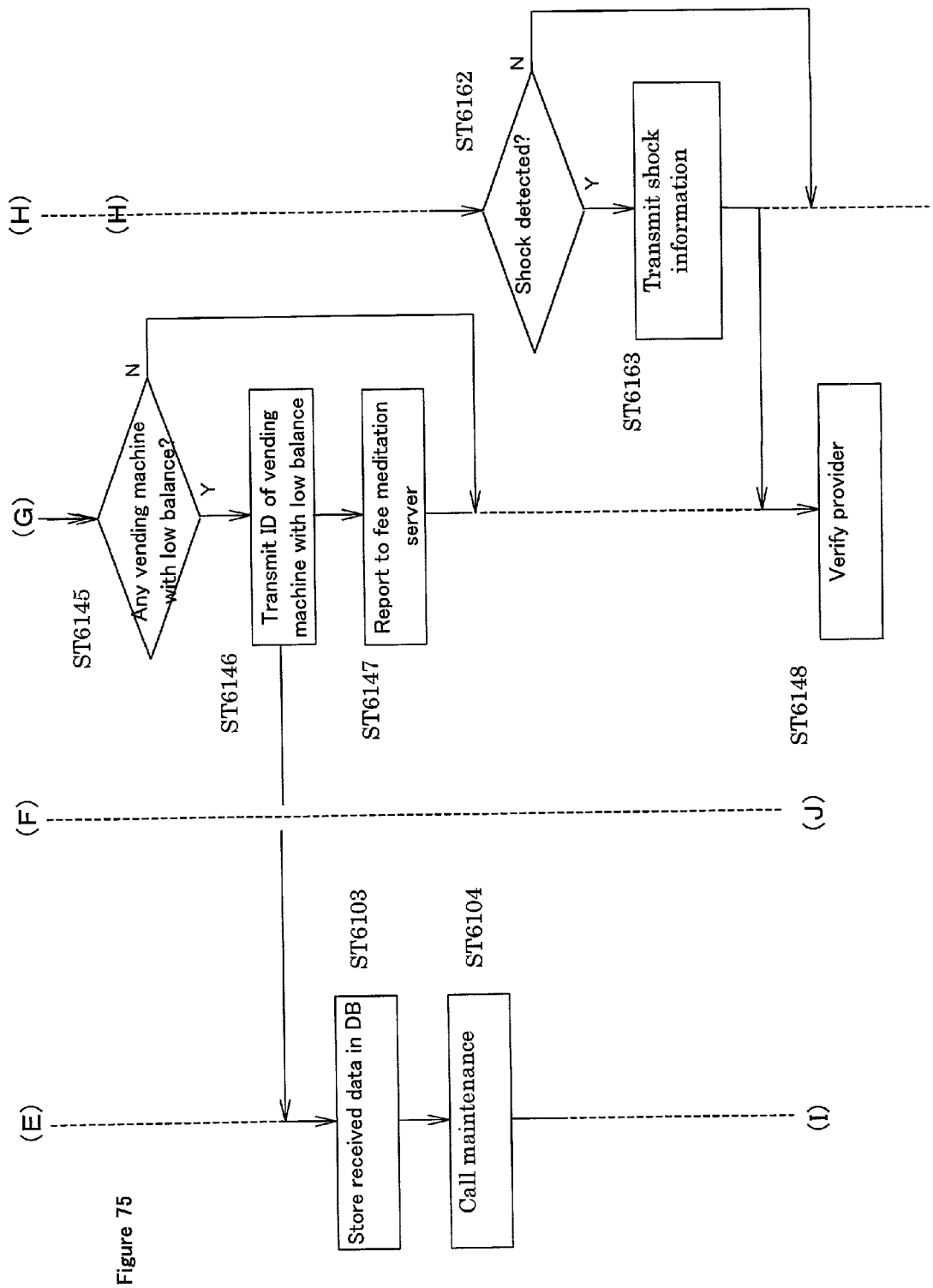
FIG. 75 is a flow chart of the processing for objectives C and D in FIG. 16.
Figure 76:
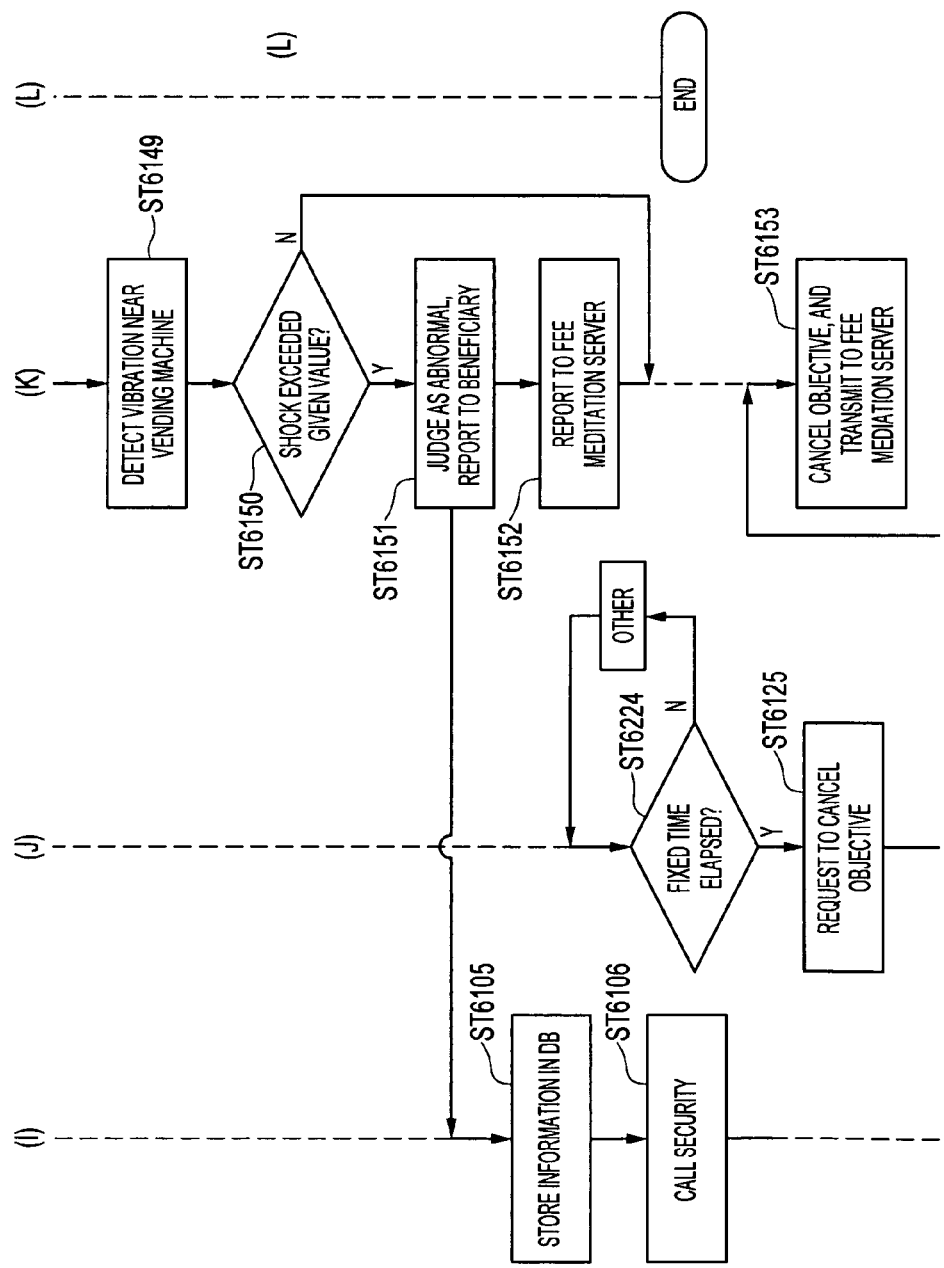
FIG. 76 is a flow chart of the processing for objectives C and D in FIG. 16.

FIG. 72 shows a sample appearance of a machine or device 5700 in which the read-write unit shown in FIG. 67 is installed. This example differs from that shown in FIG. 66 in that, as was mentioned above, read-write unit 6001 executes processing to write data onto memory medium (i.e., IC card) 5720. Instructions for this process also appear on the display.

The Flow of Information Back and Forth among Beneficiaries, the Mediation Server and Providers (Example 3)

FIG. 73 through FIG. 76 are flow charts of the processing for objectives C and D in FIG. 16. Here objective C is to detect when the machine is out of change or has a given amount (i.e., has an amount below a given level). When the amount of change goes below a specified level, the machine contacts the mediator. Objective D is to detect shocks caused from the exterior (to help prevent theft or other crimes). These objectives would be requested by the server controlling the machine or device which is a beneficiary. The information is obtained indirectly when the controlling server infers what the state of the vending machine is based on the detection signal from a proximity sensor in the provider vending machine which detects how much change there is, or on detection data from a shock sensor which detects shocks originating outside the machine. Starting from the left, the diagram shows a time series chart of the processing executed by: server 1605, which controls the machine or device that is the beneficiary; objective specification server 3500 and information mediation server 3600 in the mediation server group; and vending machine 1601, the provider. Vending machine 1601 is the same machine whose hardware was shown in the block diagrams in FIGS. 45 and 52. The objective is the same as that shown in FIGS. 24 and 25. In the real world, the provider would not be a single vending machine but many vending machines. In the example, however, we show the relationship between one of these, beneficiary 1605, objective specification server 3500 and information mediation server 3600. In the following we shall explain step by step the processing that is being executed simultaneously at any given time.

In Step 6101, beneficiary 1605 checks whether an instruction has been input to monitor the vending machine. In other words, the beneficiary itself checks whether a request was output to find out if the machine is receiving the information mediation service. If it is, in Step 6102 the beneficiary specifies the objective of having the vending machine monitored, appends validation data to it, and sends it to the objective specification server. This objective appeared earlier as objective C. It entails detecting when the machine is out of change or has very little left and contacting the mediator when the amount of change drops below a given value. In Step 6121, objective specification server 3500 verifies the identity of the beneficiary by searching through the validation DB. This is done to certify that the beneficiary is authenticated. In Step 6122, the server modifies the objective it received using the knowledge data base. In Step 6123, it sends the modified objective to the information mediation server. Modifying the objective consists of breaking it down into a set of conditions or criteria, as shown in FIG. 24.

In Step 6141, information mediation server 3600 checks whether a specified period of time has elapsed. Since the case we are discussing here involves a monitored provider as shown in FIG. 3, the information mediation server must query whether the specified period has elapsed so that it can poll the provider, vending machine 1601. Monitoring, of course, need not be limited to this scheme only, but can be done in other ways as well. For example, independent reporting as in FIG. 3 could be used if the vending machine spontaneously sent a signal to mediation server 3600 whenever its stock of change was low. In this example, however, if the specified period of time has elapsed, in Step 6142 the server requires the vending machine to send data indicating the amount of change it has. In Step 6161, vending machine 1601 obtains the amount of change remaining from its change stock unit, appends validation data and transmits the entire set to the information mediation server. In Step 6143, the information mediation server verifies the identity of the provider by searching the validation DB. This also authenticates the vending machine. In Step 6144, the server compares the data that were received with a previously determined reference. In other words, it determines whether the amount of change in the machine is below a given value.

In Step 6145, information mediation server 3600 checks whether the change in this vending machine has fallen below the standard. Since in the real world there are a large number of vending machines 1601 from which the "low change" signal might have come, in Step 6146 the server pinpoints which vending machine has low change and sends the data for the appropriate machine to the beneficiary. In Step 6147 it sends that result and an "objective achieved" message to the fee mediation server so the fee can be processed. In Step 6103 server 1605, the beneficiary which is controlling the vending machine, stores the data it has received in its DB. In Step 6104 it sends an instruction to the service agency's terminal based on the data it has received. In other words, it issues an instruction to the terminal owned by the service agency telling it to fill up the change supply.

The above is the processing flow which would apply to objective C. For objective D, the following order of processing would occur. In Step 6162, in parallel with the monitoring for objective C, the provider, vending machine 1601, checks whether its detection unit has detected a shock signal. If it has, in Step 6163 the machine appends validation data to the "signal detected" data and sends the lot to the information mediation server. In Step 6148 information mediation server 3600 authenticates the provider by searching the validation DB.

In Step 6149 the server obtains the values of the vibration sensors peripheral to the vending machine in question. This step is performed in order to ascertain whether the shock reported by the shock sensor in the vending machine was felt only by that machine rather than, for example, being caused by a large vehicle going by. This is why the values from the vibration sensors peripheral to the vending machine are checked. In Step 6150 the server compares the shock sensor value with the values of the vibration sensors and determines whether the shock value exceeds a given threshold. If it does, in Step 6151 the server determines that something abnormal has happened to the vending machine. It sends data concerning that vending machine to the beneficiary. In Step 6152 it sends that result and an "objective completed" message to the fee mediation server. In Step 6105 the beneficiary, controlling server 1605, stores the data it has received in its DB. In Step 1606 it sends an instruction to the terminal of the security agency based on the data it has received. It may, for example, inform a security firm and request that they check the machine in question. When the information mediation server has transmitted the message to the beneficiary, its work is finished. In Step 6153 it cancels the completed objective and simultaneously sends an "objective completed" message to the fee mediation server, which will execute the subsequent fee processing. In Step 6224, objective specification server 3500 checks whether the period of time has elapsed which was previously specified for processing the objective. If it has, in Step 6125 the server considers the objective to have been completed. It requests that the information mediation server cancel the completed objective, thus completing the processing.

Examples for the Information Meditating Service of the Internal and External High Level Processing The following are examples of the internal and external high level processing illustrated in FIG. 83 and FIG. 84.

(Delivering Service to Deliver the Maintenance Information for Automobiles)

Suppose that each automobile is provided with sensors to detect the remaining of the brake shoes, or the air pressure of tires. The sensors can be installed in various functional units in each automobile. These sensors can be connected to the information mediating server as shown in FIG. 3. The information mediating server connects to the portal site which has the data base for the garages in which the repair of the brake shoes is possible. The portal site means an access point which can easily access the necessary internet web sites related to the specific information. The mediating server can send the type of the automobile to the portal site, which needs the repair, then the portal site accesses the possible web sites for the type of the automobile. The web sites can, then, display the direction to the garages, name of the garages which are near the automobile, and repair service charge, etc. on the display of the car navigation system. In this navigating system, the information beneficiary is not limited to the driver of the automobile, but also the garages because these garages can obtain the customer names who need the repair. In this sense, the information mediator can charge a service fee to both the driver and the garages. The mediating server can have an access control by which the garages are selected as candidate garages. The mediator may, therefore, create a new business by controlling the priority of the garages.

(Guiding Service to Guide the Automobile in Which the Gas Remaining is Low Gas to a Gas Station)

The gas remaining sensor is installed in a gas tank of each automobile. When the sensor detects the remaining gas is low, then the mediating server searches the nearest gas station through the internet, and displays the direction to the nearest gas station.

(Parts Supply Service to Supply the Parts)

Suppose that a sensor is installed near the cutting edge of a machine to detect the defect of the cutting edge. As an alternative, another type of sensor can be installed at the parts warehouse to detect the quantity of the stocked parts. When the mediating server detects the abnormal state from the sensors, then it connects to the portal site through the network depending on the sensor's output. The mediating server can display the information obtained through the portal site along with the information, when and from where such parts are obtained. The server can display the countermeasures which should be taken before the parts arrive.

(Garbage Amount Delivery Service)

A sensor is installed in the garbage box to detect the amount of garbage. If the mediating server receives the information that the garbage box is full, then it can start to search the available nearest garbage collecting company through the internet. The contact data of the garbage collecting company can be sent to the administrator of the garbage box, or the garbage information is sent to the garbage collecting company from the mediating server.

(Medical Information Delivery Service)

If the mediating server receives information about a family member, the server searches the available hospitals based on the internal data base, or the outer data base accessed through the internet. The family member who is an information beneficiary can get the hospital information which is Open during the week-end, or the hospital can receive the medical data from the mediating server directly.

(Parking Space Information Delivering Service)

Suppose that an automobile is approaching the destination input by a car navigation system. The mediating server searches the available parking space near the destination through the network. If there is a parking spot for the car, then it makes a reservation in the car, and the server can send the reservation state.

There are many optimization theories in the prior arts, the detailed will be omitted. In short, the mediating server according to this invention can receive the sensing data from the sensor, and this sensing data is processed by a relatively high or low level, and the processed information is transmitted to the information beneficiary.

Secondary Use of Acquired Data

Figure 77:
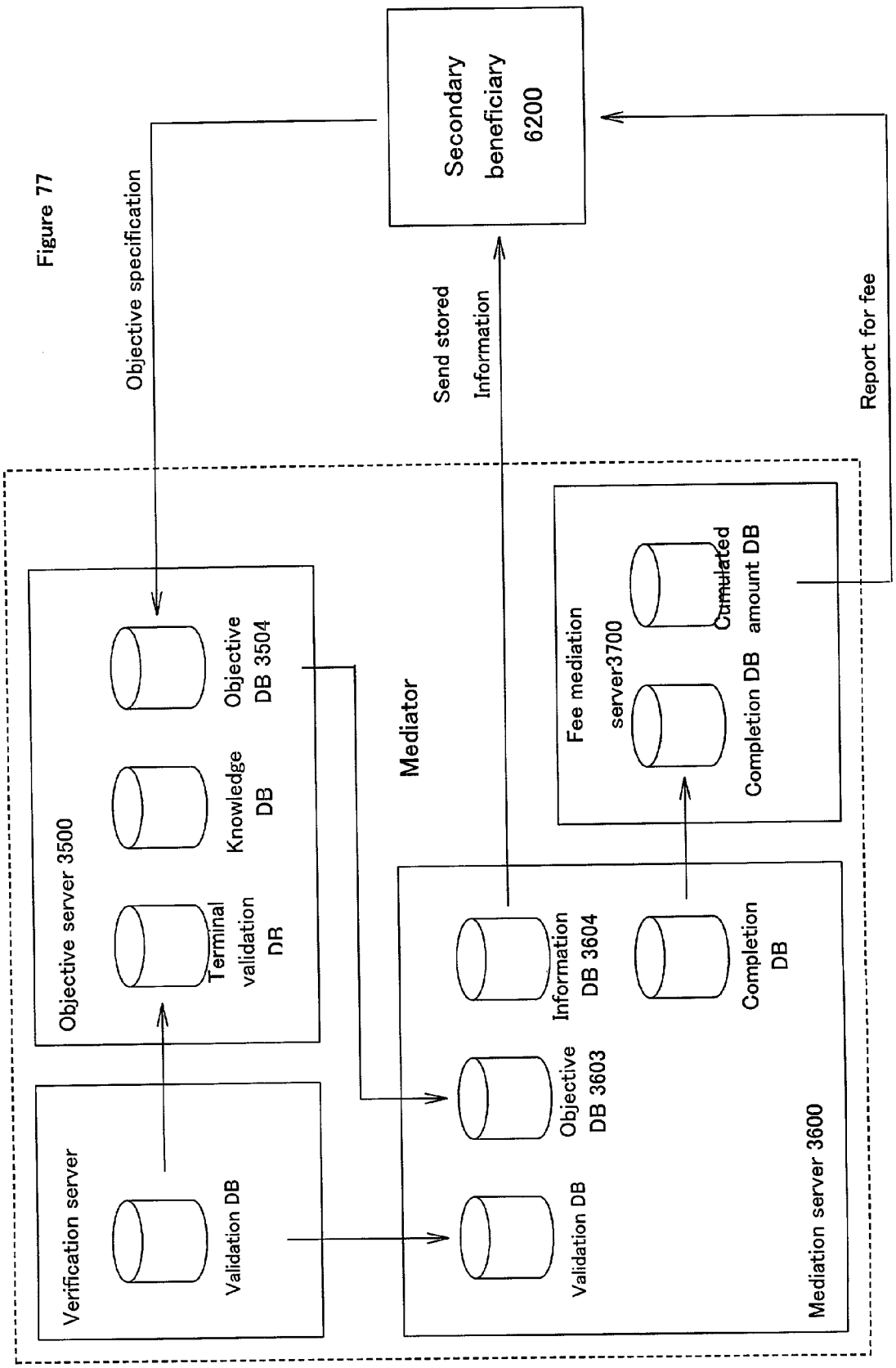
FIG. 77 is a block diagram illustrating how the data flows among the DBs.

FIG. 77 is a block diagram illustrating how the data flows among the DBs for the servers and the secondary beneficiaries when the acquired data have a secondary use. The primary use of data which we have been discussing thus far entails assigning the roles of provider and beneficiary when an objective is specified and transferring only information which has a value for the beneficiary. (See FIGS. 2 to 4 and 6.) The secondary use of data, which we shall now discuss, occurs when data obtained for a given objective and stored in the acquired data DB are used in response to a request from an external secondary beneficiary. In this case, since there was no way to know that there would be a beneficiary when the data were first acquired, they could not be assigned a value at that time. Thus these data must be assigned a value when they are used rather than when they are acquired.

This secondary use is illustrated in FIG. 77. In this embodiment, secondary beneficiary 6200 inputs an objective specification as a query to the objective DB of objective specification server 3500. The objective specification which was queried is modified and a query is sent to objective DB 3604 in information mediation server 3600 to find out if it exists in that DB. If there are data specifying that objective, data are taken from those accumulated in acquired DB 3604 and provided to secondary beneficiary 6200. A notification of charges is sent from the cumulated fee DB in fee mediation server 3700 to the secondary beneficiary, and the processing series is completed.

Figure 78:
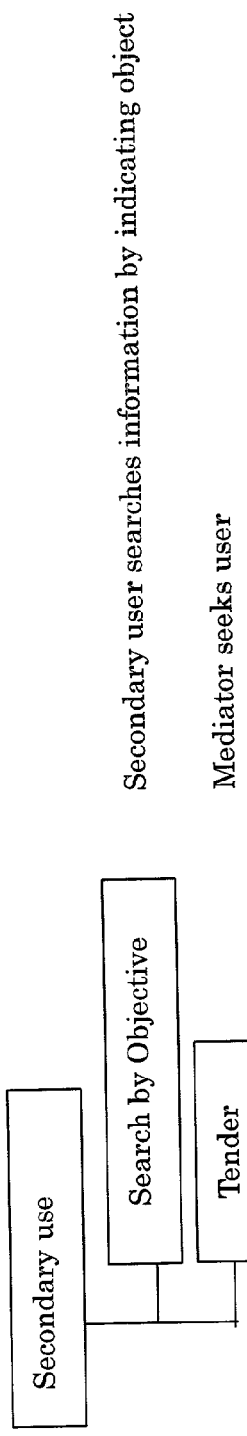
FIG. 78 shows an example of the secondary use of information.

FIG. 78 shows an example of the secondary use of information pictured in FIG. 77. There are two types of secondary use. The secondary beneficiary may initiate the use by specifying an objective, or the information mediator may initiate the use. When the potential beneficiary initiates the interaction, he queries the mediator as to whether the mediator has the desired information. When the mediator initiates, he looks for potential buyers for information he already has.

Figure 79:
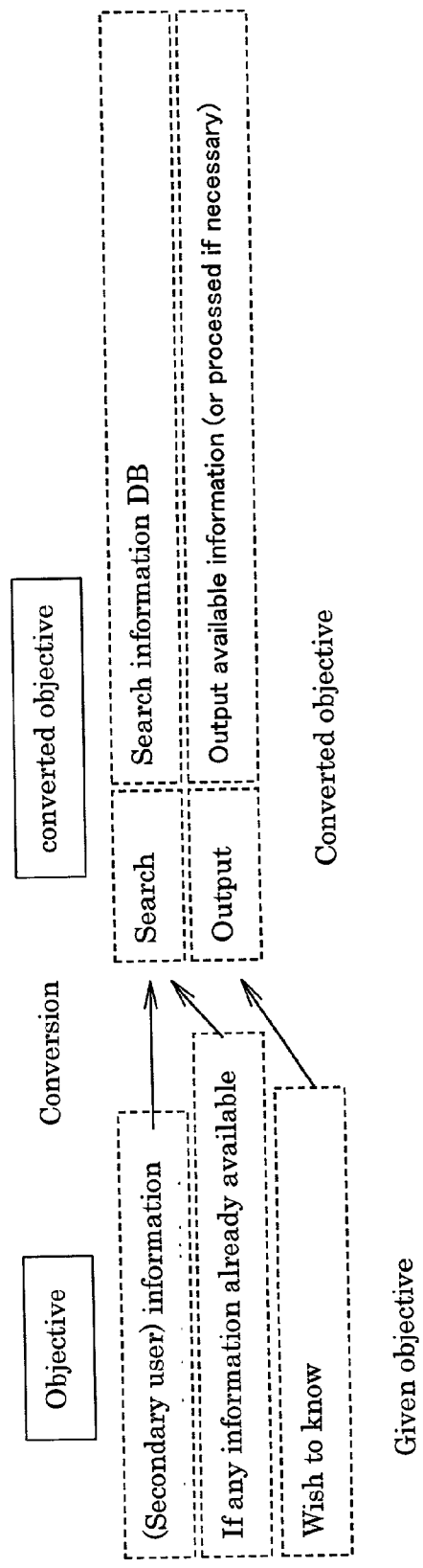
FIG. 79 is a block diagram of the processing executed to modify the objective specification in FIG. 78.

FIG. 79 is a block diagram of the processing executed to modify the objective specification in FIG. 78. Objective specification, as was discussed earlier, refers to giving the objective to the information mediator. Modifying the objective refers to breaking it down into conditions or criteria for a search. (Because we have used the same terminology as FIGS. 21, 23, 24, 25 and 26, we use the information mediation server here. In the embodiments from FIG. 33 on, the information mediator is the server group made up of the verification, objective specification, information mediation and fee mediation servers. This modification processing is the function of the objective specification server.)

Here, the first step is to determine whether the data requested by the potential secondary beneficiary are in the mediation server. To this end, the server searches its acquired data DB for data which conform to the modified objective. If it finds any, it outputs them.

Figure 80:
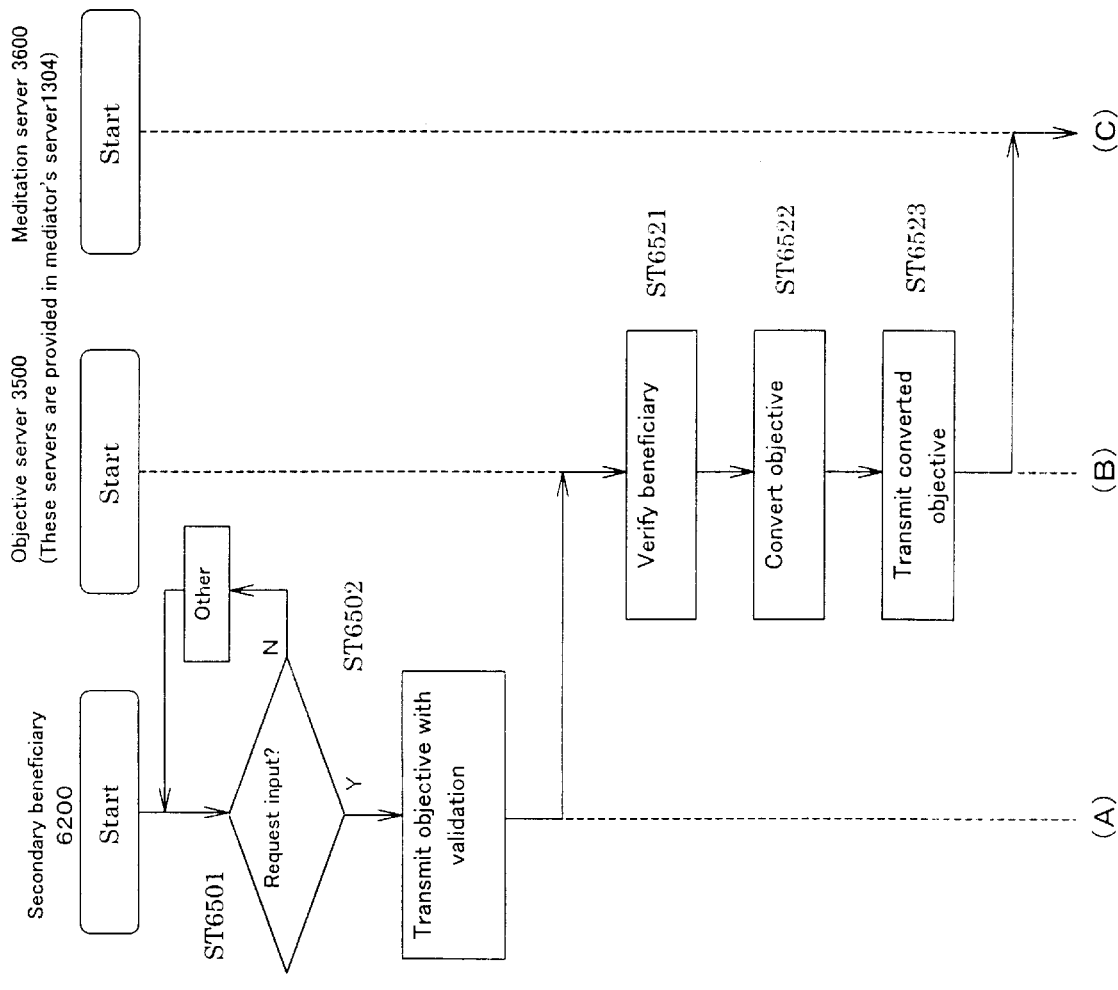
FIG. 80 is a flow chart of the processing executed when a potential beneficiary specifies an objective as in the aforesaid FIG. 78.
Figure 81:
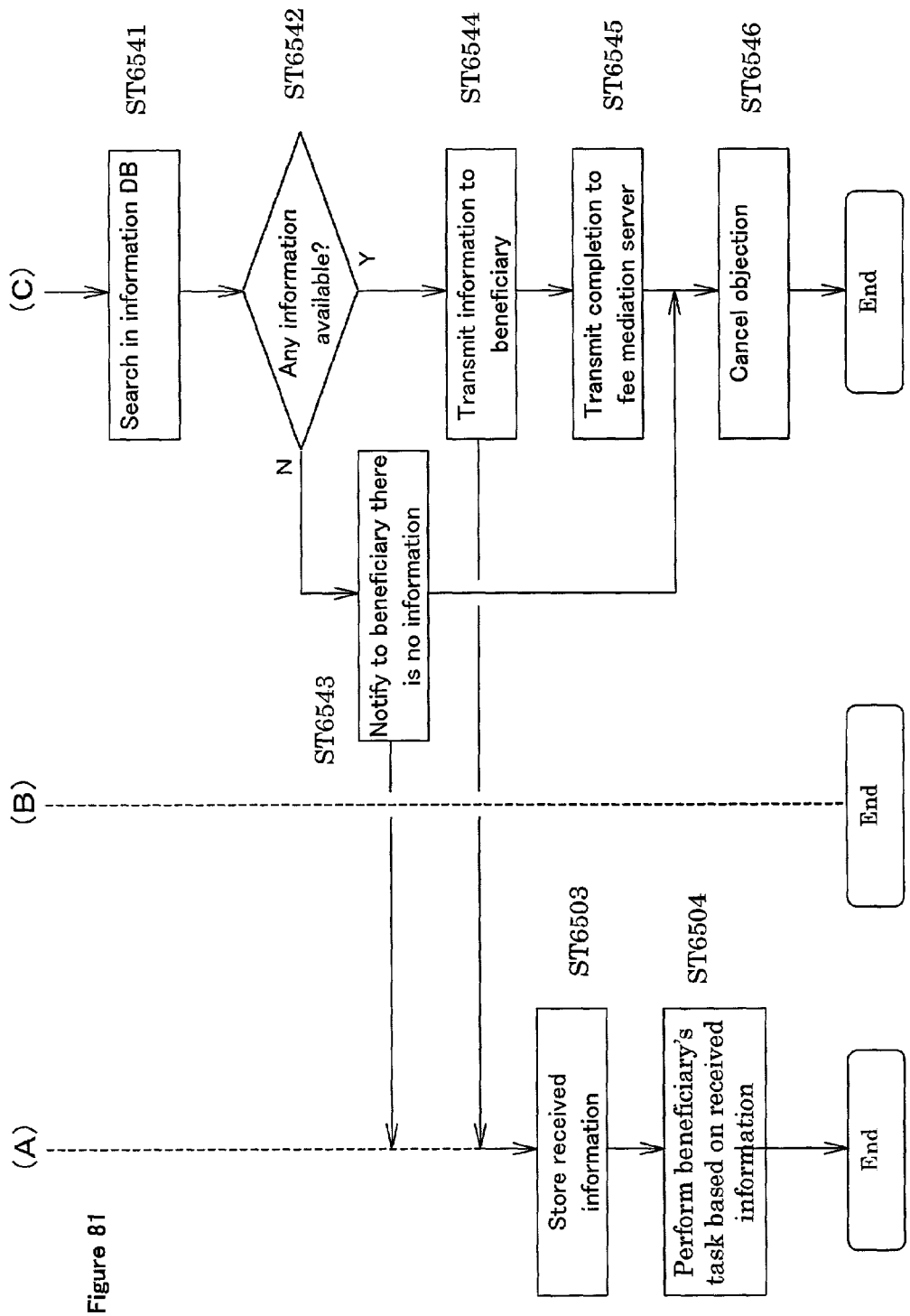
FIG. 81 is a flow chart of the processing executed when a potential beneficiary specifies an objective as in the aforesaid FIG. 78.

FIG. 80 and FIG. 81 are a flow chart of the processing executed when a potential beneficiary specifies an objective as in the aforesaid FIG. 78. The potential secondary beneficiary, in other words, specifies the objective of searching for some desired information. In this case the value of the information will be determined when it is used (i.e., when it is provided). The value will be determined according to the procedure shown in FIG. 10.

In Step 6501, potential secondary beneficiary 6200 checks whether someone has input an instruction to acquire data, i.e., whether someone has requested the secondary use of information. If someone has input an instruction, in Step 6502 the beneficiary makes the acquisition of the desired data its objective, appends validation data and sends the lot to the objective specification server. When it receives this data set, objective specification server 3500 in Step 6521 searches the validation DB for the beneficiary's validation and authenticates him as a secondary beneficiary. In Step 6522, the server modifies the objective it received using the knowledge DB and breaks it down into search criteria. In Step 6523, it transmits the modified objective to the information mediation server.

When information mediation server 3600 receives the modified objective, in Step 6541 it searches the acquired data DB based on the search criteria. Secondary use of data refers to the later use of existing data. In Step 6542, the server checks whether there are any data which meet the search criteria. If there are, in Step 6544 it transmits the data it has found to the secondary beneficiary. In Step 6545, it transmits the result and an "objective completed" message to the fee mediation server. In Step 6546 it cancels the objective, thus completing its processing. When the secondary beneficiary receives the data provided, in Step 6503 he stores them in his DB. In Step 6504 he fulfills his own objective using the data he has received. If in Step 6542 no data were found which met the search criteria, in Step 6543 the server would have sent the potential secondary beneficiary a "data not acquired" message.

Figure 82:
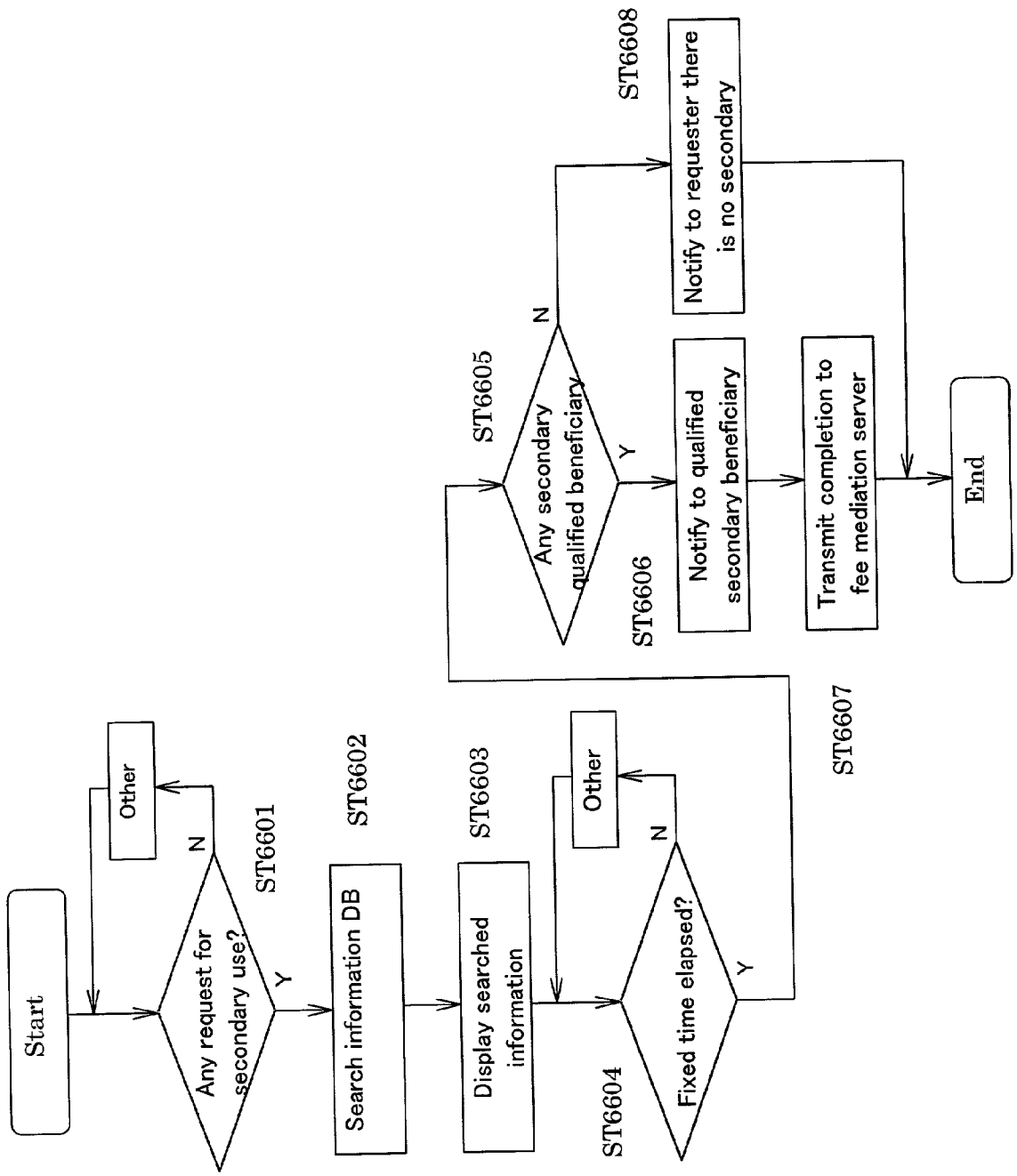
FIG. 82 is a flow chart of the processing executed when the mediator solicits potential secondary beneficiaries in FIG. 78.

FIG. 82 is a flow chart of the processing executed when the mediator solicits potential secondary beneficiaries in FIG. 78. In other words, the mediator actively seeks beneficiaries for the information it already possesses. This flow chart shows the activities performed by the operation device in the information mediation server. Here the value of the information will be decided by a bid system, with the bid standard determined ahead of time. The information mediation server may initiate secondary use of data whenever a suitable opportunity arises.

In Step 6601, the server checks whether it has received an instruction to try to reuse acquired data. In other words, it checks whether the provider and the potential customer desire that old data be used, i.e., whether they want to purchase secondary data. If they do, in Step 6602 the server searches the acquired data DB according to a previously established standard. In Step 6603 the server displays the extracted data which are the results of the search in a display area. The term "display area" refers to a location designated on the net which the secondary beneficiary can access. In Step 6603 (Sic. Should be 6604) the server checks whether a given period of time has elapsed. In Step 6604 (should be 6605) the server checks whether there are any potential secondary beneficiaries whose bids meet a previously established standard. The term "previously established standard" refers to the standard set by the provider (i.e., the price at which the provider agrees the information may be sold). In most cases, this standard will be determined by what the mediator would charge. If there are secondary beneficiaries whose bids are acceptable, in Step 6605 (really 6606) the server transmits the data to those secondary beneficiaries. To bill the beneficiaries, in Step 6606 (really 6607) the server transmits the results and an "objective completed" message to the fee mediation server. If no secondary beneficiaries show up, in Step 6607 (really 6608) the server informs the person who submitted the instruction that there are no secondary beneficiaries whose bids meet the conditions, and the processing is completed.

Effects of the Invention

With this invention, as has been explained in the disclosure above, the information mediation function consists of the following. For each objective which someone inputs to the information mediator in order to obtain specified data, terminals are selected from a large number of available terminals to serve as providers and beneficiaries. This scheme allows providers and beneficiaries to be assembled freely to fit the objective at hand. This system, in other words, encompasses many specialized prior art mediation systems, each of which could achieve a single objective. Because this information mediation system authenticates each terminal in a terminal group before it allows data to be transmitted or received, it guarantees the legitimacy of each terminal.

Any objective specified to the aforesaid information mediator is processed into a number of criteria which the mediator is able to understand. This allows the mediator to use the information provided in order to find the proper recipients.

In the information mediating system according to this invention, the optimized information is generated in the server based on the sensing data from the sensors. The optimized information is processed information using the internal data base and the external data base searched through the network. Because of this reason, the value-added information can be transmitted to the information beneficiary.

Numerous terminal groups are connected to the information mediator independently or through a number of networks. This enables many terminals connected to different networks to be information providers and beneficiaries.

The fee mediation function calculates the fee to be paid to the provider of the information based on the value it assigns to the specified objective, and it collects the fee from the beneficiaries. The mediator calculates a fee for each objective which is specified. It can then process a final charge for each participant by offsetting the payments they receive as a provider against the fees they pay as a beneficiary. The final statement for each terminal will normally be either a positive or a negative amount, which can be communicated as such to that terminal.

One of three methods is selected by which information will be transmitted from the provider to the mediator. Either the mediator will monitor the provider, the provider will transmit data spontaneously, or the provider will transmit data when a specific event has occurred. Which method will be used depends on what sort of objective has been specified. Data related to the aforesaid objective are transmitted to the information mediator according to the method chosen so as to attain the most practical form of data transmission.

The beneficiary requires both service and security-related information, so relying on the mediator to process relevant information for him can be a practical solution to crucial monitoring problems.

What is claimed is:

1. An information mediating system comprising:
    a plurality of terminals of information providers and information beneficiaries, which have both information sending and receiving functions for communicating with an information mediator device through a network, wherein each of said terminals of information providers and information beneficiaries comprises:
        an input means to input a particular objective to specify an information to be obtained from said information mediator device;
        an information sending means to send sensor information obtained from one or more sensor units installed near each of said terminals, and an identity information to specify position data for each said sensor units according to a predetermined data transmission timing selected by said particular objective, out of a monitoring timing for monitoring said specific terminal of information beneficiary, an independent transmission timing of voluntarily transmitting the sensor data from said specific terminal, and an event transmission timing which transmits data only when an unforeseen accident or breakdown occurred at said specific terminal, and said information sending means further to forward said input particular objective to said information mediator device each time when said particular objective is input; and
        an information receiving means to receive a mediated information from said information mediator device while providing said sensor information and identity information to said information mediator device, said mediated information to match with said input particular objective; and
    said information mediator device being operative to mediate the received information from said terminals of information providers and send back said mediated information to a specific terminal of information beneficiary through said network, wherein said information mediator device comprises:
an objective specification server to language-process said received particular objective from each of said terminals of information beneficiaries for converting into a plurality of language conditions which are to be matched with said received sensor information and identity information; and
an information mediation server to make matching said language-processed particular objective with said received sensor information and identity information, or the processed data of said information;
wherein said information mediation server groups a plurality of particular terminals of information providers for each particular objective in order to select a particular information, and send back said selected particular information to said particular terminal of information beneficiary which originally sent said particular objective.

2. An information mediating method for providing a particular information to an information beneficiary terminal having both information sending and receiving functions through a network, wherein said particular information is selected by an information mediator device to mediate a plurality of information received from a plurality of information provider terminals which are connected with said information mediator devices through said network, and said information beneficiary terminal is also one of said plurality of information provider terminals, said method comprising the steps of:
sending sensor information obtained from one or more sensor units installed near each of said information provider terminals, and an identity information to specify position data from each of said information provider terminals to said information mediator device, according to a predetermined data transmission timing selected by said particular objective, out of a monitoring timing for monitoring said specific terminal of information beneficiary, an independent transmission timing of voluntarily transmitting the sensor data from said specific terminal, and an event transmission timing which transmits data only when an unforeseen accident or breakdown occurred at said specific terminal;
sending a particular objective, during said step of sending sensor information, from said information beneficiary terminal to said information mediator device each time when said particular objective is input, wherein said particular objective specifies an information to be obtained from said information mediator device;
language-processing, in said information mediator device, said particular objective received from said terminals of information beneficiary for converting into a plurality of language conditions which are to be matched with said received sensor information and identity information;
matching, in said information mediator device, said language-processed particular objective with said received sensor information and identity information, or the processed data of said information in order to mediate said particular objective and said sensor information for said information beneficiary; and
sending said matched or mediated particular information to said information beneficiary which, originally sent said particular objective.

3. An information mediating system comprising:
a plurality of terminals of information providers and information beneficiaries, which have both information sending and receiving functions for communicating with an information mediation device through a network, wherein each of said terminals comprises:
an input means to input a particular objective to specify information to be obtained from said information mediator device;
an information sending means for sensing said particular objective each time said particular objective is inputted at said input means, and to send sensor information obtained from one or more sensor units installed near each of said terminals, wherein said sensor information includes identity information comprising position data for each sensor, said position data being generated either continuously or upon each of a predetermined time interval; and
an information receiving means to receive a mediated information from said information mediator device while providing said sensor information and identity information to said information mediator device, said mediated information to match with said input particular objective; and
said information mediator device being operative to mediate the information received from said terminals of information providers and send said mediated information to a specific terminal associated with said information beneficiary through said network, wherein said information mediator device comprises:
an objective specification server to language-process said received particular objective from each of said terminals of information beneficiaries for converting into a plurality of language conditions which are to be matched with said received sensor information and identity information; and
an information mediation server to make matching said language-processed particular objective with said received sensor information and identity information, or the processed data of said information;
wherein said information mediation system groups a plurality of particular terminals of information providers for each particular objective in order to select a particular information, and send said selected particular information to said particular terminal of information beneficiary which originally sent said particular objective.

4. The information mediating system according to claim 3, wherein said objective specification server language-processes, by an objective modification function, converts said received particular objective from each of said terminals of information beneficiaries into a plurality of language conditions which are to be matched with said received sensor information and identity information, and sends only a particular information out of said received sensor information and identity information or the processed data of said information, which matches with said received particular objective to said particular terminal of information beneficiary which originally sent said particular objective.

5. An information mediating method for providing a particular information to an information beneficiary terminal having both information sending and receiving functions through a network, wherein said particular information is selected by an information mediator device to mediate a plurality of information received from a plurality of information provider terminals which are connected with said information mediator devices through said network, and said information beneficiary terminal is also one of said plurality of information provider terminals, said method comprising the steps of:

sending sensor information obtained from one or more sensor units installed near each of said information provider terminals, and an identity information to position data of each sensor units either continuously or on each of a predetermined time interval, from each of said information provider terminals to said information mediator device;

sending a particular objective, during said step of sending sensor information, from said information beneficiary terminal to said information mediator device each time when said particular objective is input, wherein said particular objective specifies an information to be obtained from said information mediator device;

language-processing, in said information mediator device, said particular objective received from said terminals of information beneficiary for converting into a plurality of language conditions which are to be matched with said received sensor information and identity information;

matching, in said information mediator device, said language-processed particular objective with said received sensor information and identity information, or the processed data of said information in order to mediate said particular objective and said sensor information for said information beneficiary;

sending said matched or mediated particular information to said information beneficiary which, originally sent said particular objective; and paying a plus fee to said plurality of particular terminals of said information providers, and charging a minus fee to said particular terminal of information beneficiary, thereby the fee balance of each account of said plurality of terminals being always fluctuated by accumulating said plus and minus fees.

6. An information mediating system comprising:

a plurality of terminals of information providers and information beneficiaries, which have both information sending and receiving functions for communicating with an information mediation device through a network, wherein each of said terminals of information providers and information beneficiaries comprises:

an input means to input a particular objective to specify an information to be obtained from said information mediator device;

an information sending means to send sensor information, obtained from one or more sensor units installed near each of said terminals, and an identity information to specify for each sensor units a position data to said information mediator device, said position data being generated either continuously or upon each of a predetermined time interval, said information sending means further to forward said input particular objective to said information mediator device each time when said particular objective is input; and an information receiving means to receive a mediated information from said information mediator device while providing said sensor information and identity information to said information mediator device, said mediated information to match with said input particular objective; and said information mediator device is operative to mediate the received information from said terminals of information providers and send said mediated information to a specific terminal of information beneficiary through said network, wherein said information mediator device comprises:

an objective specification server to language-process said received particular objective from each of said terminals of information beneficiaries for converting into a plurality of language conditions which are to be matched with said received sensor information and identity information;

a fee mediation server;

an information mediation server to make matching said language-processed particular objective with said received sensor information and identity information, or the processed data of said information; and said fee mediation server is operative to pay a plus fee to said plurality of particular terminals of said information providers, and charge a minus fee to said particular terminal of information beneficiary, thereby the fee balance of each account of said plurality of terminals is always fluctuated by accumulating said plus and minus fees;

wherein said information mediation system groups a plurality of particular terminals of information providers for each particular objective in order to select a particular information, and send back said selected particular information to said particular terminal of information beneficiary which originally sent said particular objective.

7. The information mediating system according to claim 6, wherein said fee mediation function is provided with a compensation calculation function to calculate total compensation for each selected information provider.

8. The information mediating system according to claim 6, wherein said fee mediation function is provided with different fee tables depending on a specification of said particular objective.

9. The information mediating system according to claim 6, wherein said fee tables are fluctuated according to an economy.

10. The information mediating system according to claim 6, wherein said fee tables are fluctuated according to how many information providers and information beneficiaries are selected.

11. The information mediating system according to claim 6, wherein said fee tables are fluctuated according to an outer occurrence of events of the economy.

12. The information mediating system according to claim 6, wherein said fee tables are fluctuated according to a usage purpose of said specific information and a number of usage at said information beneficiary.

13. The information mediating system according to claim 6, wherein said fee tables are fluctuated according to a processing level of said specific information.

14. The information mediating system according to claim 6, wherein said fee tables are fluctuated according to a sales amount, a profit, and an expected growth of a business which is related to said specific information.

15. An information mediating method for providing a particular information to an information beneficiary terminal having both information sending and receiving functions through a network, wherein said particular information is selected by an information mediator device to mediate a plurality of information received from a plurality of information provider terminals which are connected with said information mediator devices through said network, and said information beneficiary terminal is also one of said plurality of information provider terminals, said method comprising the steps of:

sending sensor information obtained from one or more sensor units installed near each of said information provider terminals, and an identity information to specify position data of each sensor, either continuously or on each of a predetermined time interval, from each of said information provider terminals to said information mediator device;

sending a particular objective, during said step of sending sensor information, from said information beneficiary terminal to said information mediator device each time when said particular objective is input, wherein said particular objective specifies an information to be obtained from said information mediator device;

language-processing, in said information mediator device, said particular objective received from said terminals of information beneficiary for converting into a plurality of language conditions which are to be matched with said received sensor information and identity information;

matching, in said information mediator device, said language-processed particular objective with said received sensor information and identity information, or the processed data of said information in order to mediate said particular objective and said sensor information for said information beneficiary; and sending said matched or mediated particular information to said information beneficiary which, originally sent said particular objective.

* * * * *